US012724939B2

(12) United States Patent
Lackey et al.

(10) Patent No.: US 12,724,939 B2
(45) Date of Patent: Sep. 1, 2026

(54) REPRESENTATIVE SIMULATION RESULTS FOR CORRELATED VARIABLES

(71) Applicant: Microsoft Technology Licensing, LLC, Redmond, WA (US)

(72) Inventors: Bradley Curtis Lackey, Redmond, WA (US); Andrew John McGuinness, Thornhill (GB); Yakoub Hassanov Yakoubov, Reigate (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1020 days.

(21) Appl. No.: 17/810,257

(22) Filed: Jun. 30, 2022

(65) Prior Publication Data

US 2024/0005057 A1 Jan. 4, 2024

(51) Int. Cl.
*G06F 30/20* (2020.01)
*G06F 17/18* (2006.01)
*G06F 111/10* (2020.01)

(52) U.S. Cl.
CPC ............. *G06F 30/20* (2020.01); *G06F 17/18* (2013.01); *G06F 2111/10* (2020.01)

(58) Field of Classification Search
CPC ...... G06F 30/20; G06F 17/18; G06F 2111/10; G06Q 40/06; G06Q 40/08
See application file for complete search history.

(56) References Cited

U.S. PATENT DOCUMENTS 9,805,158 B1 10/2017 Liu
10,628,539 B2 4/2020 Cox
10,831,951 B1 11/2020 Kossow
10,867,249 B1 12/2020 Bosnjakovic
2008/0126024 A1* 5/2008 Gottsman .............. G06F 30/20 703/2

(Continued)

FOREIGN PATENT DOCUMENTS

EP 2565830 A1 3/2013
WO 2017134045 A1 8/2017

OTHER PUBLICATIONS

Packham, et al., “Latin Hypercube Sampling with Dependence and Applications in Finance”, In Journal of SSRN, Oct. 1, 2008, 29 Pages.

(Continued)

*Primary Examiner* — Chuen-Meei Gan
(74) *Attorney, Agent, or Firm* — Alleman Hall LLP

(57) ABSTRACT

A computing system comprises a processor configured to receive, for a plurality of correlated variables, a first predetermined number of simulations from a Monte-Carlo simulation sample, each simulation including a plurality of initial simulation results for the plurality of the variables. A unit interval of a cumulative distribution function (CDF) is segmented into a plurality of bins corresponding to a second predetermined number of strata. An initial discrepancy score is determined based upon a quantity of values in each bin, the first predetermined number, and second predetermined number. At least one of the initial simulation results is removed based upon an initial sum of the initial discrepancy scores. At least one other simulation is added and a plurality of representative simulations is output that represents the CDF across the strata based upon an updated sum of updated discrepancy scores.

20 Claims, 20 Drawing Sheets

(56) References Cited

U.S. PATENT DOCUMENTS

| | | | | |
|---|---|---|---|---|
| 2011/0054869 | A1 | 3/2011 | Li | |
| 2012/0173456 | A1 * | 7/2012 | Hirl | G06Q 50/16 706/46 |
| 2016/0283629 | A1 * | 9/2016 | Weckx | G06F 30/367 |
| 2017/0109323 | A9 | 4/2017 | Chen et al. | |
| 2019/0377774 | A1 | 12/2019 | Joshi | |
| 2021/0049242 | A1 * | 2/2021 | Halle | G06F 30/398 |
| 2021/0319158 | A1 | 10/2021 | Bhattacharyya | |
| 2024/0005056 | A1 | 1/2024 | McGuinness | |
| 2024/0005058 | A1 | 1/2024 | McGuinness | |

OTHER PUBLICATIONS

"International Search Report and Written Opinion Issued in PCT Application No. PCT/US23/022624", Mailed Date: Aug. 29, 2023, 10 Pages.

Scheingraber, et al., "Uncertainty Quantification for Seismic Risk Assessment Using Latin Hypercube Sampling and Quasi Monte Carlo Simulation", In Proceedings of 16th European Conference on Earthquake Engineering, Jun. 18, 2018, pp. 1-12.

Gui, et al., "Fitting the Erlang Mixture Model to Data via a GEM-CMM algorithm", In Journal of Computational and Applied Mathematics, vol. 343, Dec. 1, 2018, 26 Pages.

Arbenz, et al., "Copula based hierarchical risk aggregation through sample reordering", In Journal of Insurance: Mathematics and Economics, vol. 51, Issue 1, Mar. 19, 2012, pp. 122-133.

Bon, et al., "Accelerating sequential Monte Carlo with surrogate likelihoods", In Repository of arXiv:2009.03699v2, Jul. 20, 2021, 835 Pages.

Booth, et al., "Probabilistic analysis of a coal mine roadway including correlation control between model input parameters", In Journal of Computers and Geotechnics, vol. 74, Feb. 4, 2016, pp. 151-162.

Cabri, Alberto, "Quantum inspired approach for early classification of time series", In PhD Theses Series DIBRIS-TH-2019-21, Dec. 2019, 97 Pages.

Communication pursuant to Article 94(3) EPC received for EP Application No. 23741103.8, mailed on Nov. 26, 2025, 9 Pages.

Communication pursuant to Article 94(3) EPC received for EP Application No. 23741441.2, mailed on Nov. 26, 2025, 8 Pages.

International Search Report and Written Opinion received for PCT Application No. PCT/GB2023/051726, mailed on Sep. 21, 2023, 14 pages.

International Search Report and Written Opinion received for PCT Application No. PCT/GB2023/051736, mailed on Sep. 22, 2023, 15 pages.

Lee, et al., "Bayesian variable selection under the proportional hazards mixed-effects model", In Journal of Computational Statistics and Data Analysis, vol. 75, Jul. 2014, pp. 53-65.

Non-Final Office Action mailed on Aug. 20, 2025, in U.S. Appl. No. 17/810,276, 12 pages.

Non-Final Office Action mailed on Oct. 1, 2025, in U.S. Appl. No. 17/810,251, 19 pages.

Notice of Allowance mailed on May 11, 2026, in U.S. Appl. No. 17/810,251, 09 pages.

* cited by examiner

Figure 6A:
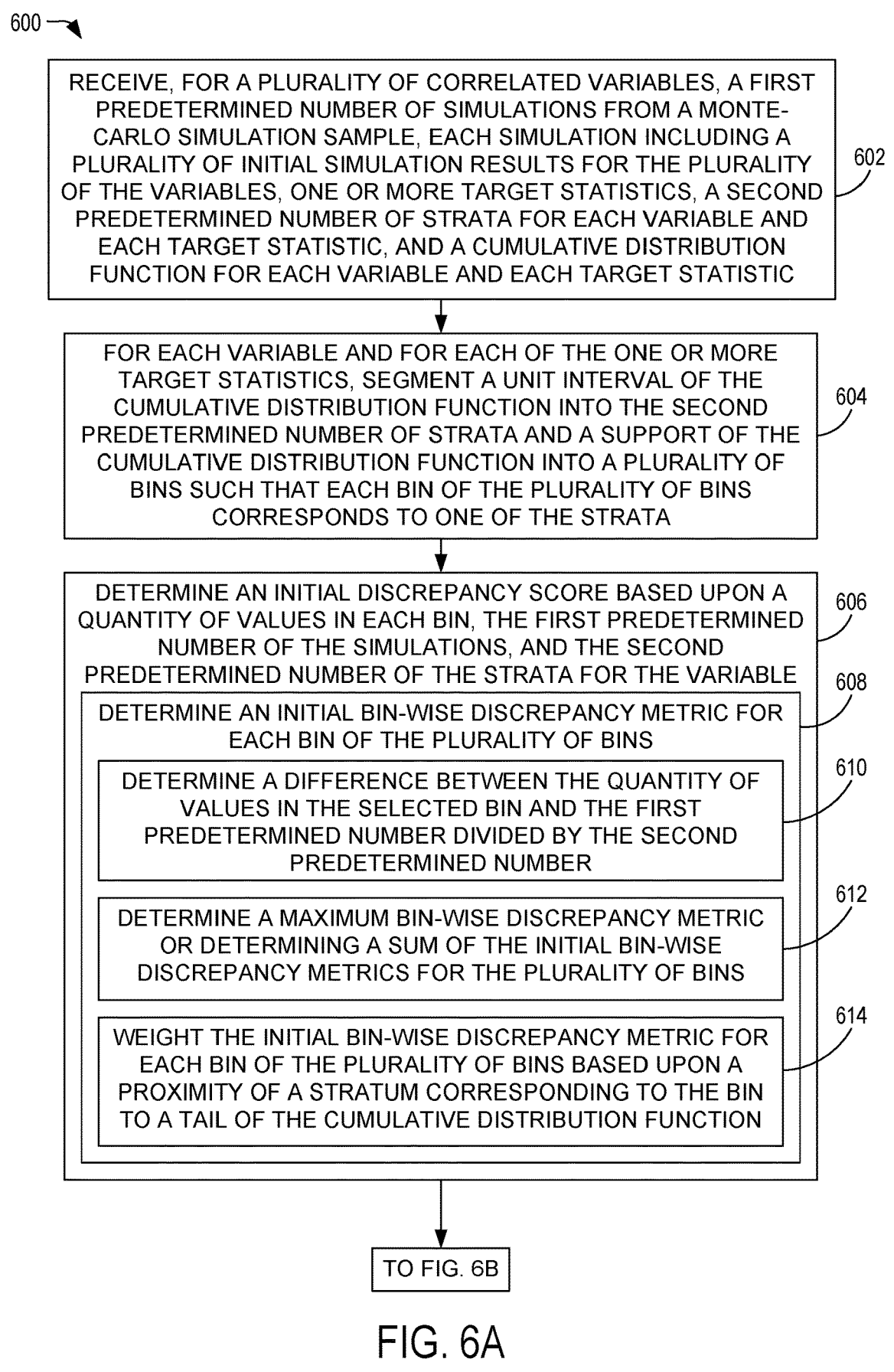

600

RECEIVE, FOR A PLURALITY OF CORRELATED VARIABLES, A FIRST PREDETERMINED NUMBER OF SIMULATIONS FROM A MONTE-CARLO SIMULATION SAMPLE, EACH SIMULATION INCLUDING A PLURALITY OF INITIAL SIMULATION RESULTS FOR THE PLURALITY OF THE VARIABLES, ONE OR MORE TARGET STATISTICS, A SECOND PREDETERMINED NUMBER OF STRATA FOR EACH VARIABLE AND EACH TARGET STATISTIC, AND A CUMULATIVE DISTRIBUTION FUNCTION FOR EACH VARIABLE AND EACH TARGET STATISTIC

602

FOR EACH VARIABLE AND FOR EACH OF THE ONE OR MORE TARGET STATISTICS, SEGMENT A UNIT INTERVAL OF THE CUMULATIVE DISTRIBUTION FUNCTION INTO THE SECOND PREDETERMINED NUMBER OF STRATA AND A SUPPORT OF THE CUMULATIVE DISTRIBUTION FUNCTION INTO A PLURALITY OF BINS SUCH THAT EACH BIN OF THE PLURALITY OF BINS CORRESPONDS TO ONE OF THE STRATA

604

DETERMINE AN INITIAL DISCREPANCY SCORE BASED UPON A QUANTITY OF VALUES IN EACH BIN, THE FIRST PREDETERMINED NUMBER OF THE SIMULATIONS, AND THE SECOND PREDETERMINED NUMBER OF THE STRATA FOR THE VARIABLE

606

DETERMINE AN INITIAL BIN-WISE DISCREPANCY METRIC FOR EACH BIN OF THE PLURALITY OF BINS

608

DETERMINE A DIFFERENCE BETWEEN THE QUANTITY OF VALUES IN THE SELECTED BIN AND THE FIRST PREDETERMINED NUMBER DIVIDED BY THE SECOND PREDETERMINED NUMBER

610

DETERMINE A MAXIMUM BIN-WISE DISCREPANCY METRIC OR DETERMINING A SUM OF THE INITIAL BIN-WISE DISCREPANCY METRICS FOR THE PLURALITY OF BINS

612

WEIGHT THE INITIAL BIN-WISE DISCREPANCY METRIC FOR EACH BIN OF THE PLURALITY OF BINS BASED UPON A PROXIMITY OF A STRATUM CORRESPONDING TO THE BIN TO A TAIL OF THE CUMULATIVE DISTRIBUTION FUNCTION

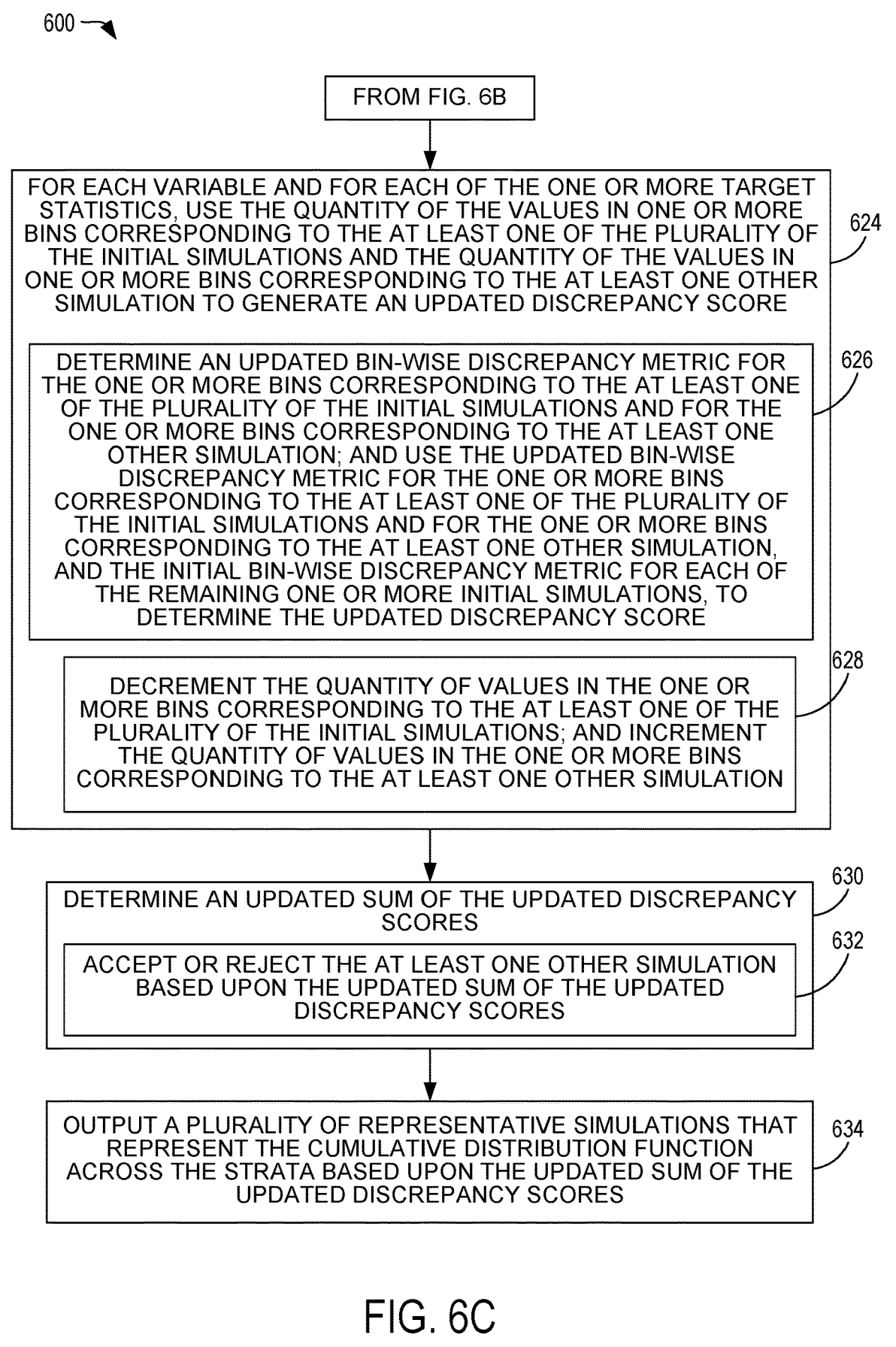

FROM FIG. 6B

FOR EACH VARIABLE AND FOR EACH OF THE ONE OR MORE TARGET STATISTICS, USE THE QUANTITY OF THE VALUES IN ONE OR MORE BINS CORRESPONDING TO THE AT LEAST ONE OF THE PLURALITY OF THE INITIAL SIMULATIONS AND THE QUANTITY OF THE VALUES IN ONE OR MORE BINS CORRESPONDING TO THE AT LEAST ONE OTHER SIMULATION TO GENERATE AN UPDATED DISCREPANCY SCORE 624

DETERMINE AN UPDATED BIN-WISE DISCREPANCY METRIC FOR THE ONE OR MORE BINS CORRESPONDING TO THE AT LEAST ONE OF THE PLURALITY OF THE INITIAL SIMULATIONS AND FOR THE ONE OR MORE BINS CORRESPONDING TO THE AT LEAST ONE OTHER SIMULATION; AND USE THE UPDATED BIN-WISE DISCREPANCY METRIC FOR THE ONE OR MORE BINS CORRESPONDING TO THE AT LEAST ONE OF THE PLURALITY OF THE INITIAL SIMULATIONS AND FOR THE ONE OR MORE BINS CORRESPONDING TO THE AT LEAST ONE OTHER SIMULATION, AND THE INITIAL BIN-WISE DISCREPANCY METRIC FOR EACH OF THE REMAINING ONE OR MORE INITIAL SIMULATIONS, TO DETERMINE THE UPDATED DISCREPANCY SCORE 626

DECREMENT THE QUANTITY OF VALUES IN THE ONE OR MORE BINS CORRESPONDING TO THE AT LEAST ONE OF THE PLURALITY OF THE INITIAL SIMULATIONS; AND INCREMENT THE QUANTITY OF VALUES IN THE ONE OR MORE BINS CORRESPONDING TO THE AT LEAST ONE OTHER SIMULATION 628

DETERMINE AN UPDATED SUM OF THE UPDATED DISCREPANCY SCORES 630

ACCEPT OR REJECT THE AT LEAST ONE OTHER SIMULATION BASED UPON THE UPDATED SUM OF THE UPDATED DISCREPANCY SCORES 632

OUTPUT A PLURALITY OF REPRESENTATIVE SIMULATIONS THAT REPRESENT THE CUMULATIVE DISTRIBUTION FUNCTION ACROSS THE STRATA BASED UPON THE UPDATED SUM OF THE UPDATED DISCREPANCY SCORES 634

FIG. 6C

SUBSET 722
SIMULATION 711
SIMULATION RESULT 712
DISCREPANCY SCORE 730
STRATUM 744
RANGE 746
SIMULATION RESULT 712
RESAMPLING ITERATION 748
RESAMPLED SIMULATION RESULT 731

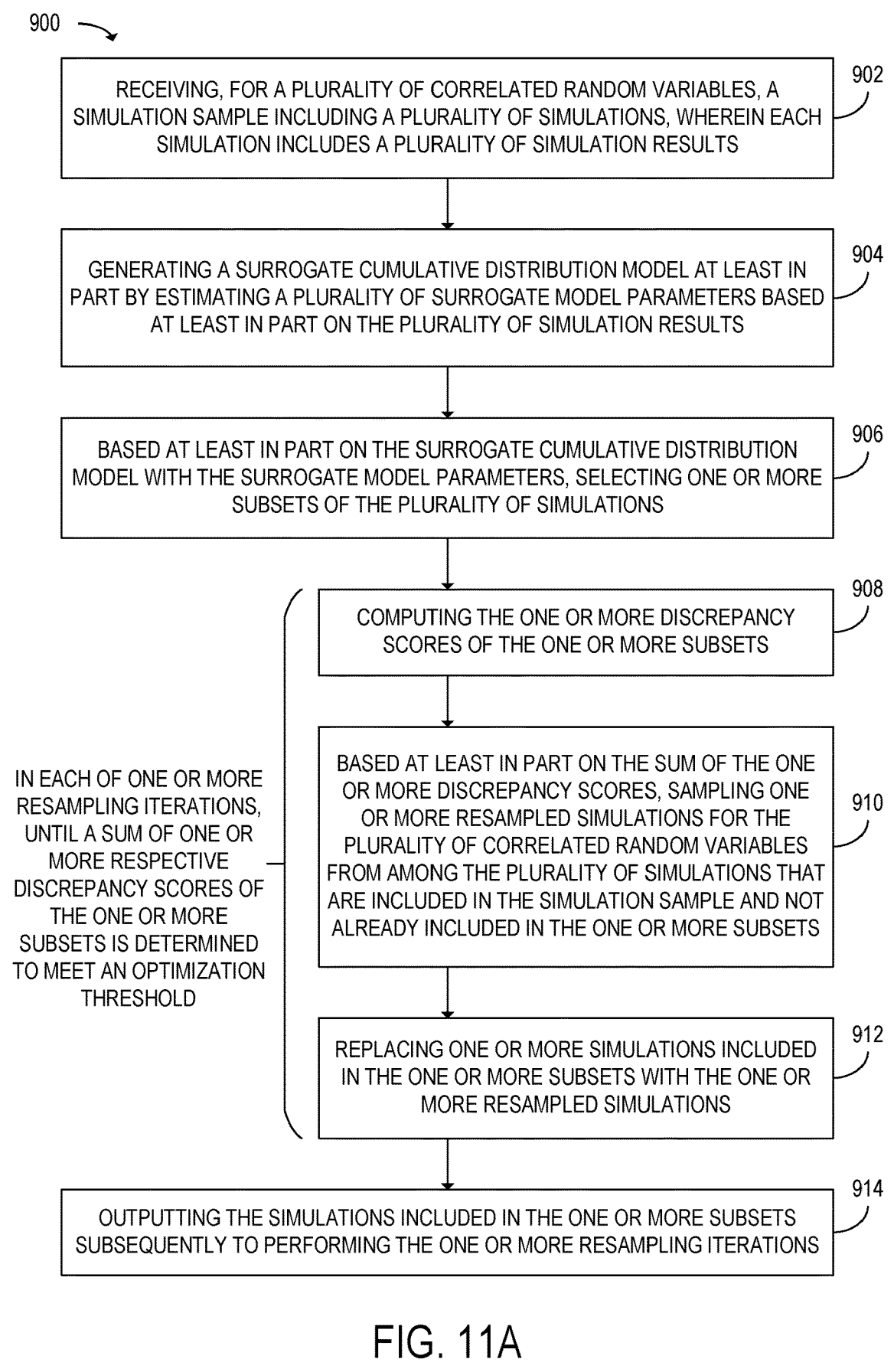

900

902: RECEIVING, FOR A PLURALITY OF CORRELATED RANDOM VARIABLES, A SIMULATION SAMPLE INCLUDING A PLURALITY OF SIMULATIONS, WHEREIN EACH SIMULATION INCLUDES A PLURALITY OF SIMULATION RESULTS

904: GENERATING A SURROGATE CUMULATIVE DISTRIBUTION MODEL AT LEAST IN PART BY ESTIMATING A PLURALITY OF SURROGATE MODEL PARAMETERS BASED AT LEAST IN PART ON THE PLURALITY OF SIMULATION RESULTS

906: BASED AT LEAST IN PART ON THE SURROGATE CUMULATIVE DISTRIBUTION MODEL WITH THE SURROGATE MODEL PARAMETERS, SELECTING ONE OR MORE SUBSETS OF THE PLURALITY OF SIMULATIONS

IN EACH OF ONE OR MORE RESAMPLING ITERATIONS, UNTIL A SUM OF ONE OR MORE RESPECTIVE DISCREPANCY SCORES OF THE ONE OR MORE SUBSETS IS DETERMINED TO MEET AN OPTIMIZATION THRESHOLD

908: COMPUTING THE ONE OR MORE DISCREPANCY SCORES OF THE ONE OR MORE SUBSETS

910: BASED AT LEAST IN PART ON THE SUM OF THE ONE OR MORE DISCREPANCY SCORES, SAMPLING ONE OR MORE RESAMPLED SIMULATIONS FOR THE PLURALITY OF CORRELATED RANDOM VARIABLES FROM AMONG THE PLURALITY OF SIMULATIONS THAT ARE INCLUDED IN THE SIMULATION SAMPLE AND NOT ALREADY INCLUDED IN THE ONE OR MORE SUBSETS

912: REPLACING ONE OR MORE SIMULATIONS INCLUDED IN THE ONE OR MORE SUBSETS WITH THE ONE OR MORE RESAMPLED SIMULATIONS

914: OUTPUTTING THE SIMULATIONS INCLUDED IN THE ONE OR MORE SUBSETS SUBSEQUENTLY TO PERFORMING THE ONE OR MORE RESAMPLING ITERATIONS

FIG. 11A

COMPUTING A PLURALITY OF STRATA OF THE SURROGATE CUMULATIVE DISTRIBUTION MODEL
916
SELECTING THE ONE OR MORE SUBSETS OF SIMULATIONS SUCH THAT THE SIMULATION RESULTS INCLUDED IN THE SIMULATIONS INCLUDED IN THE ONE OR MORE SUBSETS ARE DISTRIBUTED EQUALLY AMONG THE PLURALITY OF STRATA
918
FIG. 11B
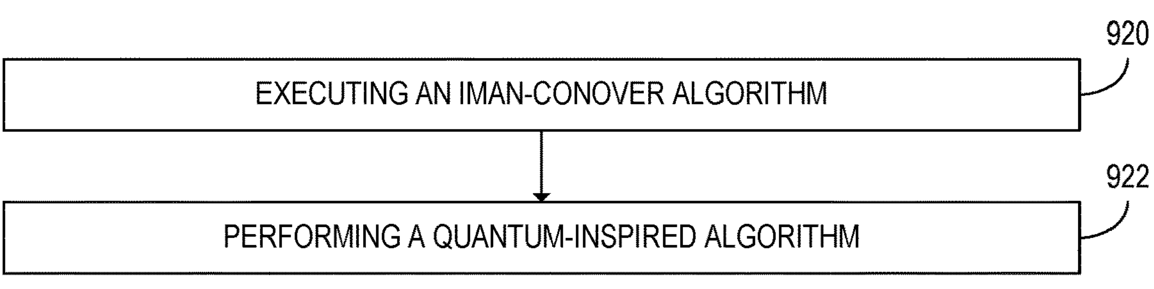
FIG. 11C
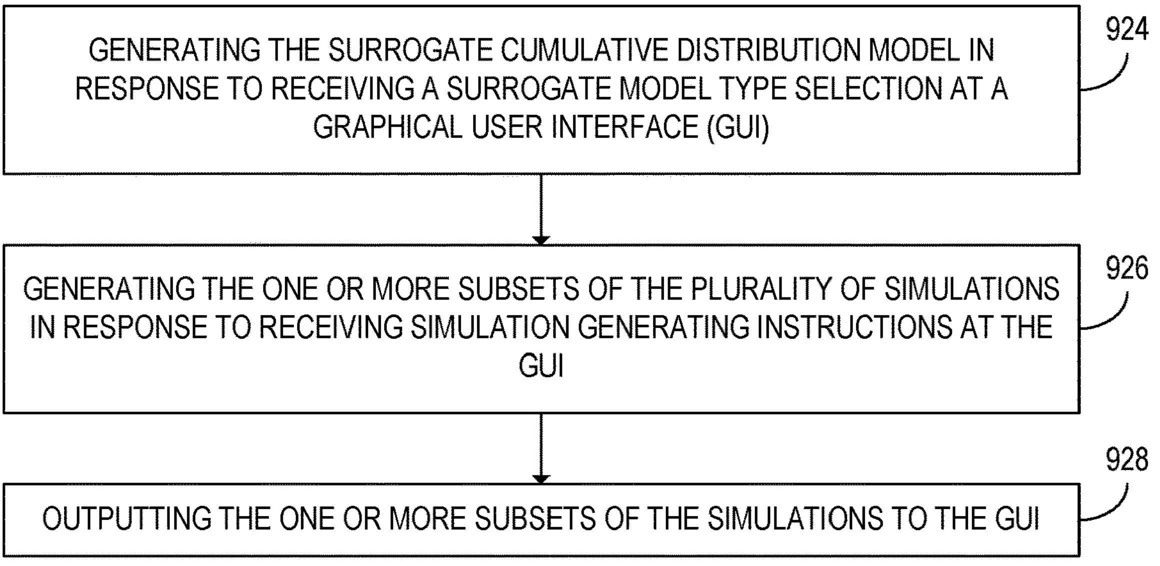
FIG. 11D

REPRESENTATIVE SIMULATION RESULTS FOR CORRELATED VARIABLES

TECHNICAL FIELD

This invention relates generally to modeling stochastic processes. Particularly, but not exclusively, the invention relates to modeling correlated distributions. The invention may allow processor hardware to select a representative sequence of simulations from a pool of Monte Carlo simulation data, and may accordingly allow the processor hardware to perform Monte Carlo modeling more efficiently.

BACKGROUND

Models of correlated stochastic processes are used in fields such as weather forecasting, electrical grid management, finance, supply chain management, and insurance. In some instances, these models are based on Monte Carlo simulations. For example, in energy-related applications, estimates of renewable energy outputs, such as availability of wind, solar, and hydroelectric power resources, drive scheduling of other power generation resources to meet demand. However, random variables representing availability of the renewable energy outputs may be correlated with weather events. Hence, Monte Carlo methods may be used to estimate aggregate power production.

As another example, estimates of insurance claims over time drive decisions made by insurance companies to hold capital. Claims from different sources may be correlated due to underlying events (e.g., severe weather). Monte Carlo methods may be used to estimate aggregate losses due to such events.

As yet another example, in retail applications, businesses set inventory levels for various products at regional distribution centers to meet estimated customer demand. However, customer demand is correlated between nearby localities due to social effects. For example, a baseball team in Chicago winning a championship game may result in above-average demand for baseball memorabilia across other cities and towns near Chicago. Monte Carlo methods may be used to determine ballpark estimates of how much baseball memorabilia will be sold.

Many models aim to predict an entire distribution of variables, rather than focusing primarily on so-called tail statistics of events that are relatively infrequent (e.g., financial losses due to multiple 500-year floods occurring in a single season). Such models may quantify the constituents of a risk profile that are driving a risk measure, a focus of capital allocation, or selected results near a center region of the distribution as well as near its tails. For example, in insurance-related applications, the distribution may be used to predict average financial losses due to weather, which may be modeled near the center region of the distribution. The distribution may also be used to allocate risk capital based on a likelihood of an above-average financial loss, which may be modeled at a tail end of the distribution.

However, technical challenges exist in developing such complex models. For example, performing a sufficient number of Monte Carlo simulations to develop an accurate model may demand extensive processor time and memory utilization. Reducing the number of simulations may accelerate model generation but may also sacrifice accuracy relative to models based on a greater number of simulations.

Aspects and embodiments of the invention have been devised with the foregoing in mind.

SUMMARY

To address these issues, computing systems and methods are provided for outputting a plurality of representative simulation results based on stratification. One example aspect provides a computing system comprising a processor configured to receive, for a plurality of correlated variables, a first predetermined number of simulations from a Monte-Carlo simulation sample, each simulation including a plurality of initial simulation results for the plurality of the variables, one or more target statistics, a second predetermined number of strata for each variable and each target statistic, and a cumulative distribution function for each variable and each target statistic. For each variable and for each of the one or more target statistics, a unit interval of the cumulative distribution function is segmented into the second predetermined number of strata and a support of the cumulative distribution function is segmented into a plurality of bins such that each bin of the plurality of bins corresponds to one of the strata. An initial discrepancy score is determined based upon a quantity of values in each bin, the first predetermined number of the simulations, and the second predetermined number of the strata for the variable. An initial sum of the initial discrepancy scores is determined. At least one of the plurality of the initial simulations is removed based upon a determination that the initial sum of the initial discrepancy scores is not within an optimization threshold. At least one other simulation is added to a remaining one or more initial simulations. For each variable and for each of the one or more target statistics, the quantity of the values in one or more bins corresponding to the at least one of the plurality of the initial simulation results and the quantity of the values in one or more bins corresponding to the at least one other simulation result are used to generate an updated discrepancy score. The computing system is further configured to determine an updated sum of the updated discrepancy scores, and to output a plurality of representative simulations that represent the cumulative distribution functions across the strata based upon the updated sum of the updated discrepancy scores.

According to another aspect of the present disclosure, a computing system is provided, including a processor configured to receive, for a plurality of correlated random variables, a simulation sample including a plurality of simulations. Each simulation may include a plurality of simulation results. The processor may be further configured to generate a surrogate cumulative distribution model at least in part by estimating a plurality of surrogate model parameters based at least in part on the plurality of simulation results. Based at least in part on the surrogate cumulative distribution model with the surrogate model parameters, the processor may be further configured to select one or more subsets of the plurality of simulations. In each of one or more resampling iterations, until a sum of one or more respective discrepancy scores of the one or more subsets is determined to meet an optimization threshold, the processor may be further configured to compute the one or more discrepancy scores of the one or more subsets. Based at least in part on the sum of the one or more discrepancy scores, the processor may be further configured to sample one or more resampled simulations for the plurality of correlated random variables from among the plurality of simulations that are included in the simulation sample and not already included in the one or more subsets. The processor may be further configured to replace one or more simulations included in the one or more subsets with the one or more resampled simulations. The processor may be further configured to output the simulations included in the one or more subsets subsequently to performing the one or more resampling iterations.

Another example aspect provides a computing system, comprising a processor configured to receive a plurality of simulations, a discrete distribution function, and one or more cumulative distribution models. Each simulation includes a plurality of simulation results. One or more conditional cumulative distribution models are generated based at least in part on the discrete distribution function and the one or more cumulative distribution models. A range of the one or more cumulative distribution models and one or more conditional cumulative distribution models is stratified into a number of strata. A sum of discrepancy scores is computed for the plurality of simulations based at least in part on the cumulative distribution models and conditional cumulative distribution models. One or more resampling iterations are performed until a sum of one or more respective discrepancy scores is determined to meet an optimization threshold. In each of the one or more resampling iterations, one or more resampled simulations are generated based at least in part on the one or more cumulative distribution models. An updated sum of discrepancy scores is generated for the plurality of simulations with the one or more simulations replaced by the one or more resampled simulations. One or more simulations are replaced with one or more resampled simulations based on a policy. The plurality of simulations are output subsequent to performing the one or more resampling iterations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A-6C show a flowchart of an example method for selecting a representative sequence of simulations based on stratification.

FIG. 11A show a flowchart of an example method for resampling a plurality of simulations, according to the example of FIG. 7.

FIGS. 11B-11D show additional steps of the method of FIG. 11A that may be performed in some examples.

DETAILED DESCRIPTION

Section 1. Introduction

As introduced above, technical challenges exist for the development and use of Monte-Carlo-based models for correlated stochastic processes. Generally, performing a larger number of Monte Carlo simulations results in more uniform sampling across a distribution than can be achieved with fewer simulations. This may result in a more accurate model. However, performing large numbers of Monte Carlo simulations may be computationally expensive, requiring both time and processing resources to perform, and reducing the number of simulations may result in a less accurate model. Opportunities exist to address these countervailing technical challenges and improve accuracy while decreasing processing time for performance.

To address these issues, systems and methods are disclosed herein that model correlated variables using quantum-based optimization routines to achieve both accurate and efficient performance. Outputs of the quantum-based optimization routines can be used to build a model based upon a relatively small number of Monte Carlo simulations while maintaining similar accuracy to a model based upon a larger number of simulations. The systems and methods disclosed herein potentially can achieve a similar accuracy using only $1/10$-$1/1000$ the number of simulations as compared to conventional approaches. Briefly, the systems and methods disclosed herein minimize a discrepancy metric on a sequence of simulations to within an optimization threshold. This increases the predictive power of the simulations by decreasing sampling error. As a result, a full distribution may be obtained with up to several orders of magnitude fewer simulations.

Figure 1A:
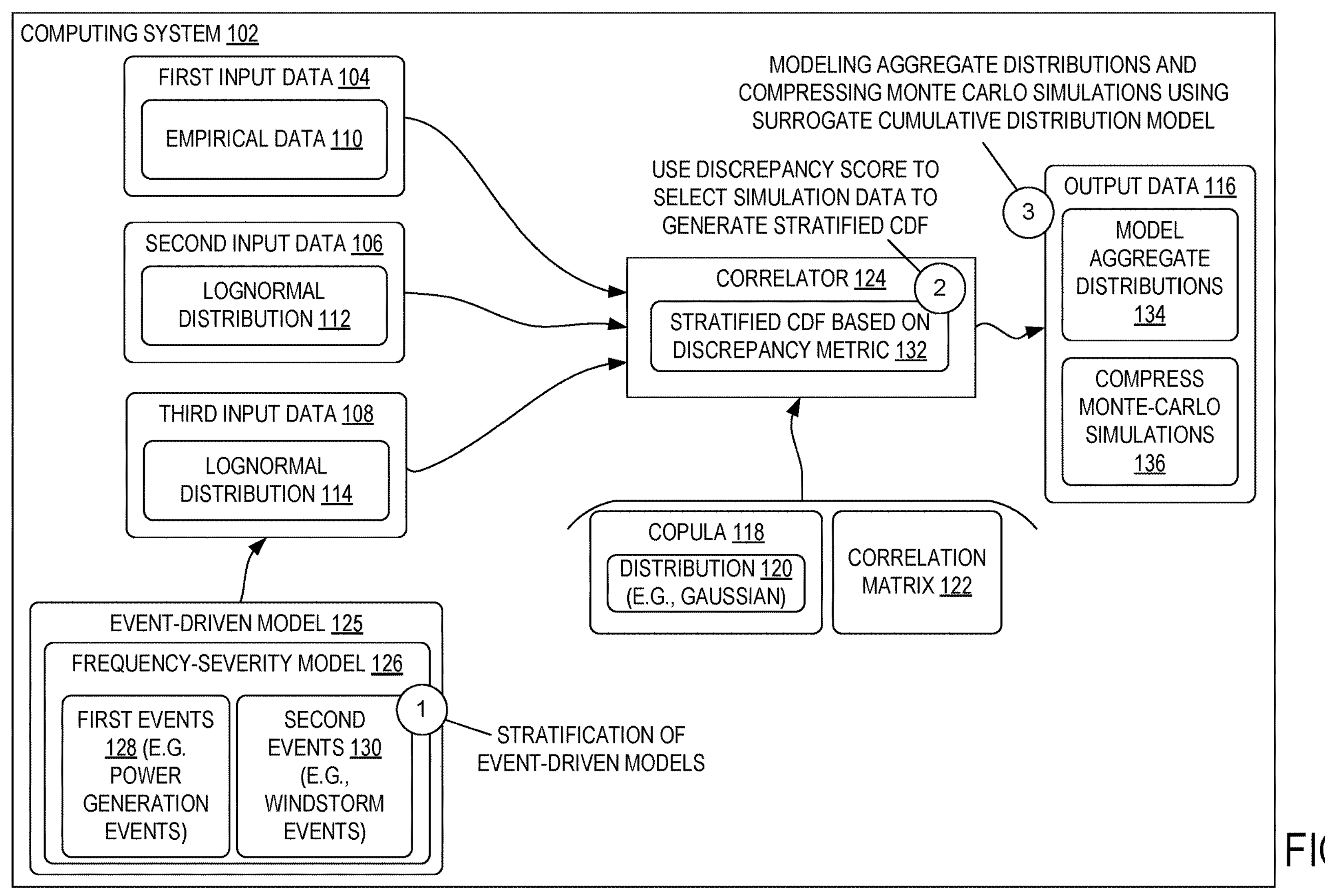
FIG. 1A shows an example of a computing system for modeling correlated variables according to an example embodiment of the subject disclosure.

At a high level, FIG. 1A shows a computing system 102 that is configured to implement a modified Iman Conover algorithm to simulate multivariate data with known distributions, accurately and efficiently. The computing system 102 takes as input a number of marginal distributions that represent incoming data, correlates the marginal distributions using a copula, generates a user-specified number of simulation results, and generates a low discrepancy sequence of a dependent variable, using techniques to estimate the aggregate distribution of the dependent variable in order to generate the low discrepancy sample. The reasons for the efficiency relate generally to three different techniques, namely (1) stratifying event-driven models generating the input simulations, (2) generating discrepancy metrics based on stratification to select simulation data with reduced discrepancies, and (3) producing a low discrepancy sequence while at the same time capturing the cumulative distribution function of the dependent variable, such as the aggregate, minimum, maximum, or other target statistic desired to be computed using the dependent variable, as labeled (1)-(3) in FIG. 1A. Each of these contributions is discussed in detail in the following sections.

FIG. 1A shows an example of a computing system 102 for modeling correlated variables. In some examples, the computing system 102 comprises a server computing system (e.g., a cloud-based server or a plurality of distributed cloud servers). In other examples, the computing system 102 may include other suitable types of computing devices, such as desktop computers, laptop, computers, etc. Additional aspects of the computing system 102 are described in more detail below with reference to FIG. 16.

The computing system 102 is configured to receive, as input marginal distributions, data representing a plurality of correlated variables. Some examples of suitable variables include, but are not limited to, sales of one or more predefined stock-keeping units (SKUs) in a geographic region, insurance losses in one or more business lines, and power generated at one or more power plants. These three specific examples are provided to aid the understanding of the invention; however, it will be appreciated that the data types are not so limited. In the example depicted in FIG. 1A, the computing system 102 is configured to receive first input data 104, second input data 106, and third input data 108. In some examples, the first input data 104 includes empirical data 110, the second input data 106 includes a first log-normal distribution 112, and the third input data 108 includes an aggregate 114 of an event-driven model 125. The first input data 104, second input data 106, and third input data 108 represent independent, correlated variables that are used by the computing system 102 to model output data 116.

In some examples, the event-driven model 125 comprises a frequency-severity model 126. The event-driven model 125 may include uncertainty in a number of events that occur and uncertainty in a value associated with each event. A dependent variable, such as the total of the values associated with each event (e.g., a collective risk model), is often of interest. The values associated with each event may additionally or alternatively be considered when developing models of insurance claim values, models of flood defense breaches, models of power surges, models of equity prices over time, models of operational risks, etc. The frequency severity model 126 relates the frequency with which an event occurs with the severity of a value associated with the event. As an illustrative example, the frequency severity model may be for weather events. For example, the frequency-severity model 126 may model first events 128 such as empirical measurements of the total output of wind power production over a period of time (e.g., a calendar year), given a discrete number of second events 130, such as windstorm events occurring during the year. As described in more detail below, in some examples, the systems and methods disclosed herein are configured to apply a policy to stratify event-driven model 125, such as the frequency-severity model 126, into a plurality of strata, which are subgroups of the data that form a collectively exhaustive and mutually exclusive partition of the input data. Stratifying the input data in this manner results in lower sampling error than the use of a random sample of the same number of Monte-Carlo simulations that are not well stratified. It will be appreciated that the conditional cumulative distribution for each of the plurality of dependent variables may be conditional upon a predetermined quantity of the correlated events occurring. For example, in the above wind power example, consider a Monte-Carlo simulation that produces simulation results that are not well stratified, for example, because they contain few or no examples for power produced in years when fewer than three wind storms a year occurred. A model generated based on such simulation results will be more likely to not properly reflect the correlations for one or more target statistics that are conditional upon fewer than three windstorms occurring, even though the model may be fairly accurately reflect correlations in other strata or for an aggregate of all events in the frequency-severity model 126 (e.g., average power produced by all storms occurring in any year). In addition, the computing system 102 can achieve more uniform sampling across the distribution with fewer simulations. This in turn reduces processor and memory utilization, as a larger number of randomly selected simulations may be required to achieve similar accuracy. The stratification of the event-driven models is described in more detail below with reference to FIGS. 12-15.

The computing system 102 is further configured to receive a copula 118. The copula 118 describes the correlation between the first input data 104, the second input data 106, and the third input data 108. Copula 118 may have a distribution 120 of various forms. For example, the copula may be a Gaussian copula with a Gaussian distribution, or an Archimedean copula such as the Clayton copula or Gumbel copula. In addition, the copula 118 may have an associated a correlation matrix 122.

The output data 116 represents a dependent variable that is a function of the first input data 104, the second input data 106, and the third input data 108. In some examples, the output data 116 represents an aggregate of the first input data 104, the second input data 106, and the third input data 108. Some examples of suitable aggregates include, but are not limited to, aggregate sales, aggregate insurance losses, or aggregate power generation. For example, the first input data 104 may represent power generated at a solar array, the second input data 106 may represent power generated at a wind farm by relatively steady, low-intensity wind, and the third input data 108 may represent power generated by relatively infrequent but more severe wind events than those reflected in the second input data 106. In these examples, the output data 116 represents aggregate power generation as a function of the first input data 104, the second input data 106, and the third input data 108. In other examples, the output data 116 may comprise any other suitable output produced based upon the first input data 104, the second input data 106, and the third input data 108. For example, the output data 116 may comprise disaggregated data.

The output data 116 is generated by a correlator 124, for example using an Iman-Conover method to generate correlated samples. The following paragraphs describe examples of systems and methods for reducing discrepancy of a sample of simulations to within an optimization threshold of a distribution. As described in more detail below with reference to FIGS. 2-6, the computing system 102 may stratify a cumulative distribution function (CDF) based on a discrepancy metric as indicated at 132. In some examples, the CDF is an aggregate distribution function for the first input data 104, the second input data 106, and the third input data 108. The discrepancy metric is computed for a plurality of initial Monte Carlo simulation results based on the CDF. The computing system 102 further determines whether replacing one or more samples reduces the discrepancy metric. These aspects of the below-described systems and methods increase the predictive power of models based upon a relatively small pool of representative simulations by decreasing sampling error relative to the initial Monte Carlo simulation results, while maintaining similar accuracy to a model based upon a larger number of simulations.

The computing system 102 is additionally configured to model aggregate distributions as indicated at 134 and/or to compress Monte-Carlo simulations as indicated at 136. This enables the computing system 102 to produce a representative sequence of simulations at the output stage that accurately resembles the CDF of the aggregate distribution without requiring additional simulations. These aspects are described in more detail below with reference to FIGS. 7-11.

Figure 1B:
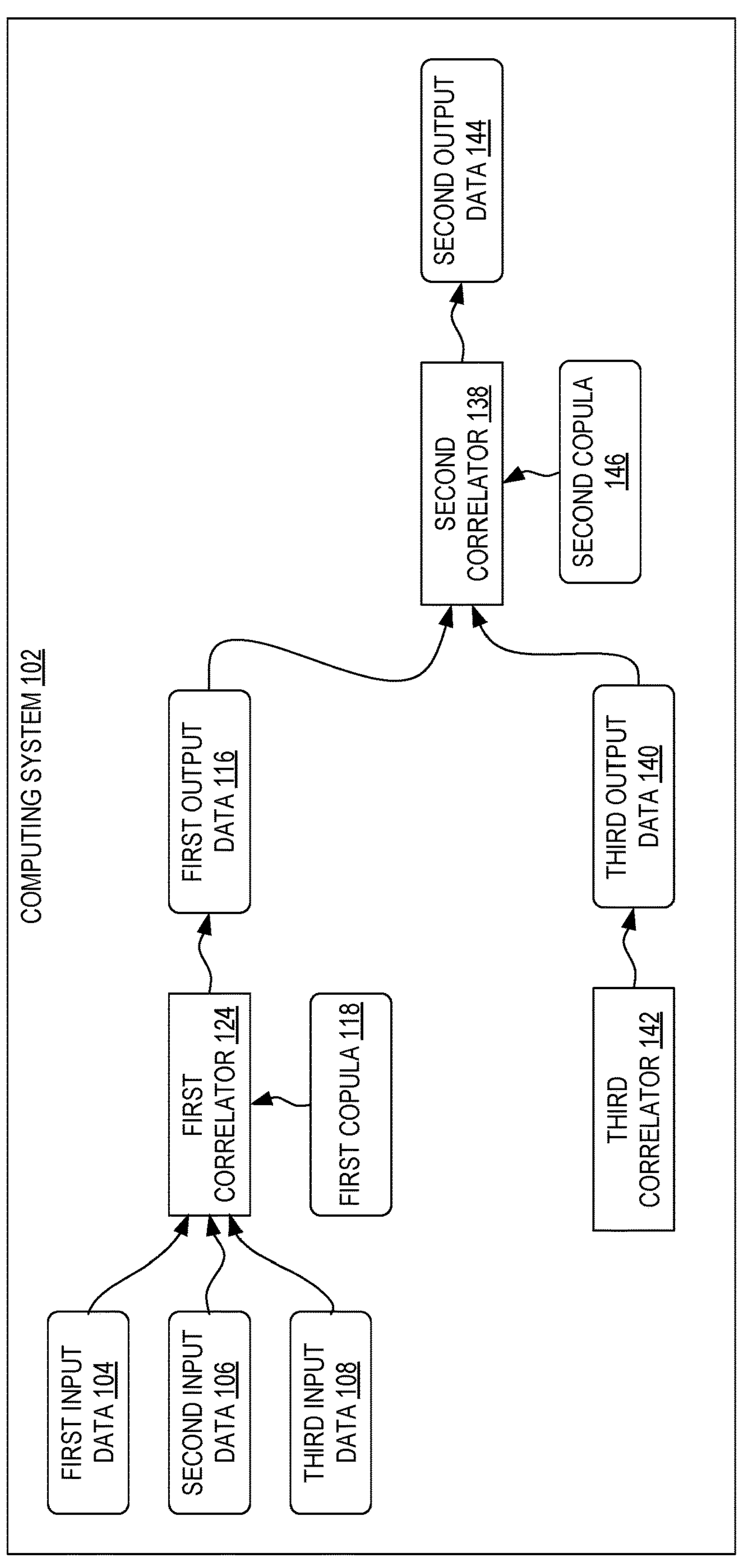
FIG. 1B shows another example configuration of the computing system of FIG. 1A.

In some examples, and with reference now to FIG. 1B, the output data 116 is first output data that serves as an input to at least a second correlator 138. In this manner, the correlated and stratified nature of the first output data 116 can be combined with other models. For example, the second correlator 138 is further configured to receive, as input, third output data 140 from a third correlator 142. The second correlator 138 generates second output data 144 based upon the first output data 116, the third output data 140, and a second copula 146. In some examples, the first output data 116 represents aggregate power generation in the Mid-Atlantic region of the United States and the third output data 140 represents aggregate power generation in the Southeastern United States. The second output data 144 output by the second correlator 138 represents aggregate power generation in the Eastern United States.

Section 2. Stratification Based on Discrepancy Scores

Figure 2:
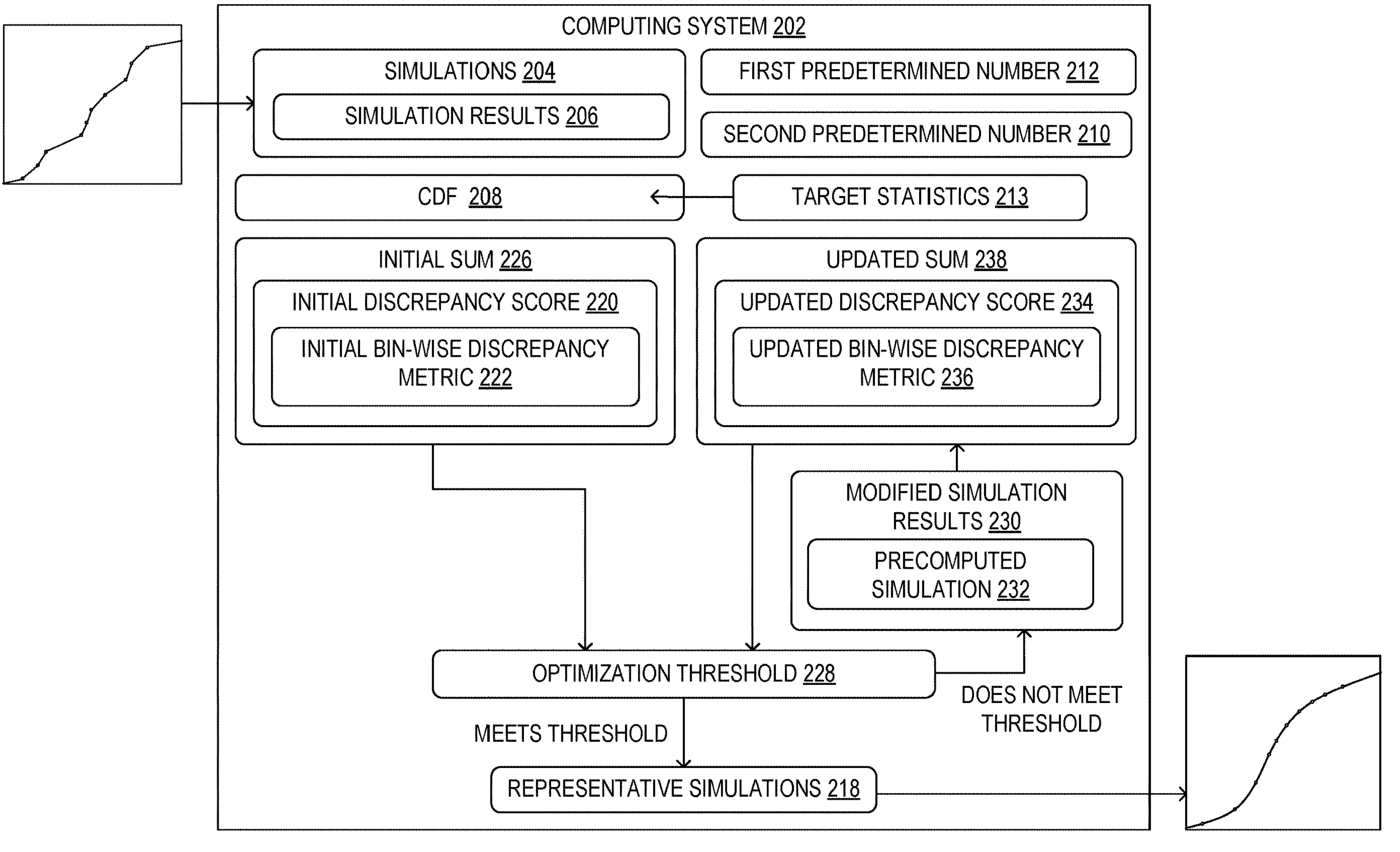
FIG. 2 shows an example of a computing system for outputting a plurality of representative simulation results based on stratification according to an example embodiment of the subject disclosure.

Referring first to FIG. 2, examples are disclosed that relate to outputting a plurality of representative simulations based on stratification. As introduced above, in some examples, a sequence of Monte Carlo simulations $$x_1^{(j)}, \ldots, x_n^{(j)}$$

is used to approximate a model for one or more quantities of interest:

$$\int A(x_1, \ldots, x_n) d\mu(x_1, \ldots, x_n) \approx \frac{1}{N} \sum_{j=1}^{N} A\left(\left(x_1^{(j)}, \ldots, x_n^{(j)}\right)\right) \quad (1)$$

Here, $A(x_1, \ldots, x_n)$ represents a quantity of interest (e.g., power transmitted, uninsured losses, or stock shortages), and $d\mu(x_1, \ldots, x_n)$ represents a likelihood of each factor or variable $$x_1, \ldots, x_n. \; A\left(x_1^{(j)}, \ldots, x_n^{(j)}\right)$$

is the quantity of interest as a function of the sequence of simulations $$x_1^{(j)}, \ldots, x_n^{(j)}.$$

In some instances, the initial Monte Carlo simulation data 206 is subject to simulation or sampling error. The Koksma-Hlawka inequality bounds error in estimating a statistic in terms of total variation of the statistic and a *-discrepancy of a sequence of samples. The *-discrepancy of samples $S=\{x_1, \ldots, x_N\}$ in $[0,1]^n$ dimensions is represented as:

$$D_N^*(S) = sup_{B \in \mathcal{J}} \left| \frac{\#(S \cap B)}{N} - \mu(B) \right| \quad (2)$$

Here, μ is an n-dimension Lebesgue measure and $\mathcal{J}$ is a collection of intervals of the form $[0, u_1] \times \ldots \times [0, u_n]$. However, this can be challenging to compute for large dimensions n (e.g., tens or hundreds of dimensions, or more).

In other instances, simplified forms of the *-discrepancy are used. For example, with n=1:

$$\tilde{D}_N^*(S) = sup_{u \in [0,1]} \left| \frac{\#(S \cap [0, u])}{N} - u \right| \quad (3)$$

In equation (3), the #term counts a number of elements in a selected sequence, which is compared to a total number of elements N. The first term $$\frac{\#(S \cap [0, u])}{N}$$

is discontinuous and jumps when u crosses a point in S. Thus, the simplified discrepancy metric of equation (3) does not require a continuous variable supremum. Instead, the discrepancy may be computed by restricting $$u = \frac{j}{N}$$

for j=1, . . . , N. A number of samples in each strata is counted and compared to a number of samples evenly distributed into each strata. However, it is technologically challenging to use the *-discrepancy (including the 1-dimension simplification and discretization described above) as a metric for selecting representative samples from a pool of Monte Carlo simulation results in an optimization process, as it is computationally expensive to recompute the discrepancy at each step of the optimization process.

To address these issues, examples are disclosed that relate to selecting a representative sequence of simulations based on stratification. Briefly, an initial discrepancy score is determined based upon a quantity of values in each bin, a first predetermined number of the simulations (e.g., a quantity of the simulations), and the second predetermined number (e.g., a quantity) of the strata for the factor or variable. As described in more detail below, this expression of the discrepancy score is computationally tractable. The representative sequence of simulations is selected in an iterative optimization process in which at least one simulation result value is removed from a set of initial simulation result values, and at least one other simulation result value is added to the set. An updated discrepancy score is determined using the quantity of the values in one or more bins corresponding to the removed simulation result value and the added simulation result value. As described in more detail below, computing the updated discrepancy score in this manner is less computationally expensive than recomputing the initial discrepancy scores for the entire set. This enables a computing system to select and output a plurality of representative simulation result values, which may be utilized for downstream processing (e.g., Iman-Conover-based analysis of correlated variables).

FIG. 2 shows one example of a computing system 202 for selecting a representative sequence of simulations based on stratification. In some examples, the computing system 202 embodies the computing system 102 of FIG. 1A. In other examples, the computing system 202 is a separate computing system.

The computing system 202 is configured to receive, for a plurality of correlated variables, a first predetermined number 212 of simulations 204 from a Monte Carlo simulation sample. Each simulation includes a plurality of initial simulation results 206 for the plurality of the variables (e.g., the initial simulation results include Monte Carlo simulation data for at least one dimension j). For simplicity, the initial simulation results 206 are described herein as one-dimensional. In other examples the initial simulation results 206 include two or more dimensions. In yet other examples, the initial simulation results 206 include 10 or more dimensions.

Figure 3:
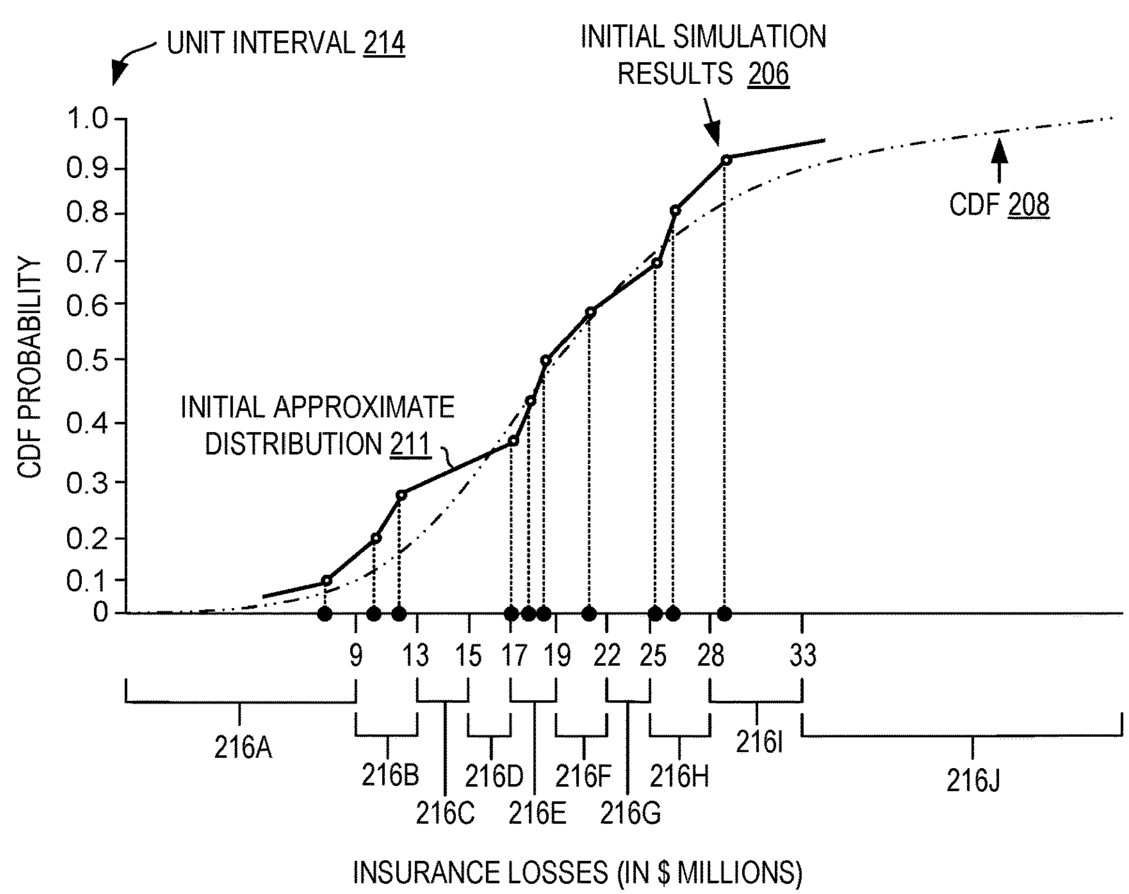
FIG. 3 is a plot of a plurality of initial simulation results in the form of Monte Carlo simulation data that can be received by the computing system of FIG. 2.

FIG. 3 shows a plot of the initial simulation results 206 in the form of Monte Carlo simulation data for a model of insurance losses. FIG. 3 also shows a CDF 208 for the initial Monte Carlo simulation data. In some examples, the CDF 208 is provided in the form of a function or includes synthetic data that is generated based on a function. It will also be appreciated that, in other examples, the CDF may take the form of a discrete table containing an empirical distribution. In some examples, the initial simulation results 206 are derived from 50,000-250,000 simulations. In other examples, and as described in more detail below, the initial simulation results 206 are derived from a smaller number of simulations (e.g., less than 50,000 simulations). Due to random sampling, a greater number of simulation results (e.g., 50,000-250,000) produces a closer approximation of the CDF 208 than a smaller number of simulation results. However, as introduced above, it can be computationally expensive to conduct such large numbers of simulations. In the simplified example depicted in FIG. 3, the plot includes 10 simulations. The 10 sample points form an initial approximate distribution 211 that is offset from the CDF 208 due to the small sample size.

The computing system 202 is further configured to receive the CDF 208 for each variable, and a second predetermined number 210 of strata for the variable. A unit interval of the CDF 208 is segmented into the second predetermined number of strata and a support of the CDF 208 (e.g., elements of a domain of the CDF 208 which are not mapped to zero) is segmented into a plurality of bins such that each bin corresponds to one of the strata. In this manner, the quantity 210 of strata governs accuracy of an estimated distribution resulting from one or more representative simulation result values 218 output by the computing system. The CDF 208 is also stratified for each of one or more target statistics 213. For example, the target statistics 213 may include one or more of: an aggregate outcome or dependent variable value, a minimum value, a maximum value, or any other target statistic desired to be computed based upon the dependent variable. Similarly, the unit interval of the CDF 208 for each target statistic is segmented according to the second predetermined number 210 of strata.

The quantity 210 of strata may be greater than or equal to the first predetermined number 212 of the sample points 204. The computing system 202 may attempt to place at least one simulation into each bin. Thus, a larger quantity 210 of strata results in the CDF 208 being segmented into a larger number of bins 216, which may result in a more even distribution of the representative simulation results 218 across the unit interval 214 than a smaller quantity 210 of strata. In some examples, the quantity 210 of strata is 10,000-50,000 strata. In other examples, the quantity 210 of strata is greater than 50,000 strata (e.g., 250,000 strata). In yet other examples, the quantity 210 of strata is less than 50,000 strata (e.g., 1,000 strata).

For example, the CDF 208 of FIG. 3 has a unit interval 214 of [0,1], which represents a probability that the insurance losses plotted in FIG. 3 evaluate to less than or equal to a selected dollar value on the x-axis. The unit interval is divided into 10 bins 216A-216J corresponding to deciles (0.1, 0.2, . . . , 1.0), each of which represents a range of insurance losses (in millions of dollars). For example, a first bin 216A, representing probability values in the range of 0-0.1, corresponds to losses of up to $9 million. A tenth bin 216J, representing probability values in the range of 0.9-1.0, corresponds to losses of greater than $33 million.

The computing system 202 is further configured to place a value x for each initial simulation 204 into one of the plurality of bins 216A-216J. To place each value x, the computing system 202 is configured to determine a value of the CDF $u=F(x)\in[0,1]$ of each value x. The value of the CDF u represents the cumulative likelihood, where the value x resides within the CDF. The computing system 202 then places the value x into one of the plurality of bins 216 based on the value of the CDF u according to equation (4):

$$\text{bin}(x)=\lfloor u\cdot M\rfloor \tag{4}$$

In equation (4), the value of the CDF u is multiplied by the quantity of strata (M). The product of the value of the CDF u and the quantity of strata M is truncated to a next lowest integer. This integer represents the bin in which the value x is placed. As a result of performing this procedure, the strata coincide with division of the unit interval of the CDF (e.g., [0,1]) into M quantiles. However, it will also be appreciated that this example is not meant to be limiting, and that each value x may be placed into a bin in any other suitable manner.

Referring again to FIG. 3, the first bin 216A includes one simulation. The second bin 216B includes two simulations. The fifth bin 216E includes three simulations. The sixth bin 216F includes one simulation. The eighth bin 216H includes two simulations. The ninth bin 216I includes one simulation.

The third bin 216C, the fourth bin 216D, the seventh bin 216G, and the tenth bin 216J do not include any of the initial simulations 204.

An initial discrepancy score 220 is determined based upon a quantity of values in each bin 216, the first predetermined number 212 of the simulations 204, and the second predetermined number 210 of the strata for the variable or target statistic. As described in more detail below, the initial discrepancy score measures deviation between the initial Monte Carlo simulation data and the CDF.

In some examples, determining the initial discrepancy score 220 includes determining an initial bin-wise discrepancy metric 222 for each bin 216. In some examples, the initial bin-wise discrepancy metric 222 for a selected bin includes a difference between the quantity of values in the selected bin ($b_k(s)$) and the first predetermined number 212 (N) of the simulations 204 divided by the second predetermined number 210 (M) of the strata for the variable:

$$b_k(s) - \frac{N}{M} \tag{5}$$

With reference again to FIG. 3, the initial Monte Carlo simulation data includes 10 values, and the unit interval of the CDF 208 is divided into 10 bins 216A-216J. In an even distribution, one simulation is placed into each bin $$\left(\frac{N}{M} = 1\right).$$

Thus, the initial bin-wise discrepancy metric 222 measures the homogeneity of the initial Monte Carlo simulation data across bins 216A-216J.

In some examples, the initial discrepancy score 220 comprises a maximum bin-wise discrepancy metric from the plurality of bins 216:

$$\max_{s=0, \ldots, M-1} \left| b_k(s) - \frac{N}{M} \right| \tag{6}$$

In this manner, the initial discrepancy score 220 represents the maximum discrepancy between the initial simulation results 206 and the CDF 208.

In other examples, the initial discrepancy score 220 comprises a sum of the initial bin-wise discrepancy metrics 222 for the plurality of bins 216:

$$\sum_{s=0}^{M-1} \left| b_k(s) - \frac{N}{M} \right| \tag{7}$$

In this manner, the initial discrepancy score 220 represents an aggregate discrepancy for the initial simulation results 206.

Some applications require accuracy at one or both tails of the CDF that is greater than or equal to the accuracy of the initial Monte Carlo simulation data at or near (e.g., within one standard deviation of) the mean. Accordingly, in some examples, the computing system 202 is configured to weight the initial bin-wise discrepancy metric for each bin of the plurality of bins based upon a proximity of a stratum corresponding to the bin to a tail of the CDF. For example, in FIG. 3, an initial bin-wise discrepancy metric for the tenth bin 216I may be assigned a greater weight (e.g., 0.99 in the range of [0-1]) than an initial bin-wise discrepancy metric for the bins 216A-216I. In this manner, the initial discrepancy score places greater emphasis on accuracy at the tail (e.g., the tenth bin 216I) than elsewhere in the distribution.

The computing system 202 is further configured to determine an initial sum 226 of the initial discrepancy scores 220. In some examples, the initial discrepancy scores 220 are summed for all variables (e.g., the dimension j and any other dimensions of the initial simulation results 204). As described in more detail below, the initial sum 226 serves as an optimization metric to select the representative simulation result values 218 for output.

The initial sum 226 of the initial discrepancy scores 220 is compared to an optimization threshold 228. As described in more detail below, if a set of simulation results meets the optimization threshold 228, the set of simulation results is output as the representative simulation results 218. In some examples, "meeting the optimization threshold" refers to the initial sum 226 of the initial discrepancy scores 220 being less than or equal to the optimization threshold 228. In this manner, the computing system 202 ensures that the representative simulation results 218 closely resemble the CDF 208.

In some examples, the optimization threshold 228 is derived from the parameters of the simulations and statistics. For example, the optimization threshold 228 may be a user-specified parameter that is based upon the first predetermined number 212 (N) and the second predetermined number 210 of the strata (M) described above. In some examples, the optimization threshold is in the range of 0.001 N/M-0.5 N/M, which represents a deviation of 0.1%-50% from a homogenous distribution. In other examples, the optimization threshold is in the range of 0.01 N/M-0.25 N/M. In yet other examples, the optimization threshold is in the range of 0.01 N/M-0.5 N/M. In this manner, optimization may be terminated upon the initial sum 226 of the initial discrepancy scores 220 being within a user-specified percentage of an optimal value (e.g., representing a homogenous distribution across the strata M).

It will also be appreciated that the optimization threshold 228 may be defined in any other suitable manner. Another suitable example of the optimization threshold 228 includes a user-specified discrepancy value. In this manner, optimization may be terminated upon the initial sum 226 of the initial discrepancy scores 220 being less than or equal to the user-specified discrepancy value.

In yet other examples, the optimization process is additionally or alternatively terminated based upon reaching or exceeding a user-specified runtime duration or a user-specified number of iterations. In such examples, the computing system 202 may proceed as if the optimization threshold 228 is met to output a current set of simulation results as the plurality of representative simulation result values 218. The computing system 202 may additionally or alternatively output a notification to the user that the user-specified runtime duration or the user-specified number of iterations is reached or exceeded.

Figure 4:
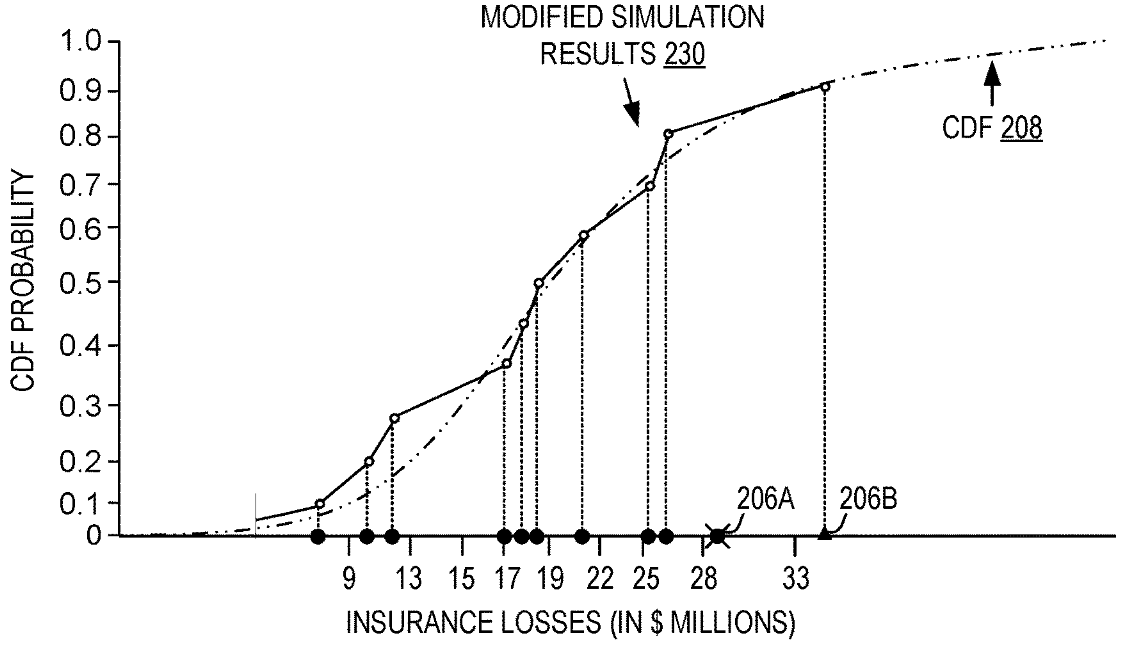
FIG. 4 shows the plot of FIG. 3 in which one value is removed and another value is added.

If the set of simulation results does not meet the optimization threshold, the set of simulation results is modified as indicated at 230. To generate the modified set of simulation results 230, the computing system 202 is configured to remove at least one of the plurality of the initial simulations 204 based upon a determination that the initial sum 226 of the initial discrepancy scores 220 is not within the optimization threshold 228. For example, FIG. 4 shows the plot of the initial Monte Carlo simulation data of FIG. 3, in which one of the initial Monte Carlo simulation data values 206A is removed. In some examples, the computing system 202 of FIG. 2 selects the value 206A to be removed at random. This may help to reduce simulation error through statistical effects achieved via random sampling. In other examples, the computing system 202 selects the value 206A to be removed based upon a determination that the value 206A is contributing to a discrepancy score that is greater than or equal to a threshold (e.g., the optimization threshold 228). In this manner, the process of modifying the set of the initial simulation results 204 is explicitly driven to reduce the initial discrepancy scores. In yet other examples, the removed value 206A is selected by a user, for example in response to receiving a prompt from the computing system 202 indicating that the optimization threshold 228 has not been met. Selectively removing data in this manner may result in the representative simulation results 218 meeting a user-specified goal (e.g., fitting a distribution pattern that is not defined by the computing system 202).

At least one other simulation result is added to a remaining one or more initial simulation results. It will be appreciated that "added" means that the at least one other simulation result is included in a set with the remaining one or more initial simulation results, rather than being numerically added to those results. For example, another simulated value 206B is added to the values that remain from the initial simulation results 206 after the value 206A is removed. In the example of FIGS. 3-4, one other value 206B is added for each value 206A that is removed. In this manner, the quantity 212 of the initial simulation results 204 is equal to a target number of representative simulation result values 218 for output. It will also be appreciated that, in other examples, the number of representative simulation result values 218 may be greater than or less than the first predetermined number 212. In this manner, the computing system 202 may increase or decrease the sample size, respectively, to generate a representative sample.

In some examples, the at least one other simulation result value 206B is derived from a precomputed Monte Carlo simulation 232. The precomputed simulation 232 may be selected from a pool of precomputed Monte Carlo simulation results that also includes the initial simulation results 206. Precomputing enables the computing system 202 to estimate the CDF 208 for an aggregate of all the precomputed simulation results (including the simulations that are selected as the representative simulations 218 and the simulations that are not selected) upfront. This enables the computing system 202 to compare the same CDF 208 to the initial simulation results 204 and to the modified simulation result values 230, rather than recomputing a new CDF 208 for the modified simulation result values 230.

Like the selection of the removed value 206A, in some examples, the computing system 202 generates or selects the at least one other simulation result value 206B via a randomized process. In this manner, the simulation result 206B may reduce simulation error in the modified data 230 via random sampling. In other examples, the simulation result value 206B is explicitly selected, either by the computing system 202 or a user, to drive the modified data 230 towards the optimization threshold 228.

As introduced above, the computing system 202 is configured to generate an updated discrepancy score 234 for each variable. The updated discrepancy score is generated using the quantity of the values in one or more bins from which one or more simulation results 206A are removed and the quantity of the values in one or more bins into which one or more other simulation result values 206B are added. As described in more detail below, this formulation of the updated discrepancy score 234 does not require the computing system 202 to recompute the initial bin-wise discrepancy metric 222 for each bin 216A-216J. Instead, the computing system 202 may reuse the initial bin-wise discrepancy metric 222 for bins that are not modified (e.g., bins 216A-216H), and an updated bin-wise discrepancy metric 236 is computed for bins in which one or more simulation results have been added or removed (e.g., bins 216J and 216I, respectively). This results in the discrepancy score 234 being updated more rapidly, while demanding less processor time and memory allocation, than recomputing the initial bin-wise discrepancy metric 222 for all of the bins 216A-216J each time a simulation result is added and/or removed.

For example, referring again to FIG. 4, the updated bin-wise discrepancy metric is determined for the bin 216I corresponding to the removed value 206A and for the bin 216J corresponding to the added value 206B. In some examples, determining the updated bin-wise discrepancy metric includes decrementing the quantity of values in the one or more bins (e.g., bin 216I) corresponding to removed simulation(s) (e.g., 206A) and incrementing the quantity of values in the one or more bins (e.g., bin 216J) corresponding to the added simulation(s) (e.g., 206B). For example, for a sample $$x_k^{(j)}$$

that is removed (e.g., 206A), the computing system 202 is configured to compute its cumulative probability (u) and bin $$\left(\text{bin}\left(x_k^{(j)}\right)\right)$$

as follows:

$$u = F_k\left(x_k^{(j)}\right) \tag{8}$$

$$\text{bin}\left(x_k^{(j)}\right) = \lfloor u \cdot M \rfloor \tag{9}$$

The computing system is further configured to decrement bin count $$b_k \text{ of } \text{bin}\left(x_k^{(j)}\right)$$

in dimension k by the number of simulation values removed (e.g., 1).

For a simulation value $$x_k^{(j')}$$

that is added (e.g., 206B), the computing system 202 is configured to compute its cumulative probability (u') and $$\text{bin}\left(\text{bin}\left(x_k^{(j')}\right)\right)$$

according to the following equations in the same manner as described above:

$$u' = F_k\left(x_k^{(j')}\right) \tag{10}$$

$$\text{bin}\left(x_k^{(j')}\right) = \lfloor u' \cdot M \rfloor \tag{11}$$

The computing system is further configured to increment bin count $$b'_k \text{ of bin } \left(x_k^{(j')}\right)$$

in dimension k by the number of simulation values added (e.g., 1). The updated quantities of values in each of the bins 216I and 216J are used to generate the updated bin-wise discrepancy metric using equation (5). As described above, the initial bin-wise discrepancy metrics 222 are re-used for bins 216A-216H. The computing system is configured to use this set of the updated bin-wise discrepancy metrics (for bins 216I and 216J) and the initial bin-wise discrepancy metrics 222 (for bins 216A-216H) to generate the updated discrepancy score 234.

In some examples, the updated discrepancy score 234 is determined using the same operation as the initial discrepancy score 220. For example, the updated discrepancy score 234 may be generated using equation (6) or (7). In this manner, the updated discrepancy score 234 may be comparable with the initial discrepancy score 220.

With reference again to FIG. 2, the computing system 202 is further configured to determine an updated sum 238 of the updated discrepancy scores 234. In this manner, the updated discrepancy scores 234 may be comparable with the optimization threshold 228. This comparison enables the computing system 202 to determine whether the modified simulation results 230 satisfy the optimization threshold 228 for output as the representative simulation result values 218, or whether to initiate an additional optimization loop (e.g., by further modification of the modified simulation results 230).

In some examples, the computing system 202 is configured to accept or reject the at least one other simulation result value 206B for potential inclusion in an event-based model based upon the updated sum 238 of the discrepancy scores 234. For example, the computing system 202 may reject the at least one other simulation result value 206B if the updated sum 238 of the discrepancy scores 234 is greater than the initial sum 226 of the initial discrepancy scores 220. The computing system 202 may additionally or alternatively reject the removal of the value 206A if the other simulation result value 206B is rejected. In this manner, the computing system 202 is configured to drive the selection of the representative simulation result values 218 towards the optimization threshold 228.

The computing system 202 is configured to output the plurality of representative simulation result values 218 that represent the CDF 208 across the strata based upon the updated sum 238 of the discrepancy scores 234. For example, if the modified simulation results 230 meet the optimization threshold 228, the modified simulation results 230 are output as the representative simulation results 218. If the modified simulation results 230 do not meet the optimization threshold 228, the computing system 202 is configured to iteratively modify the simulation results and update the sum of the discrepancy scores until the optimization threshold is met.

Figure 5:
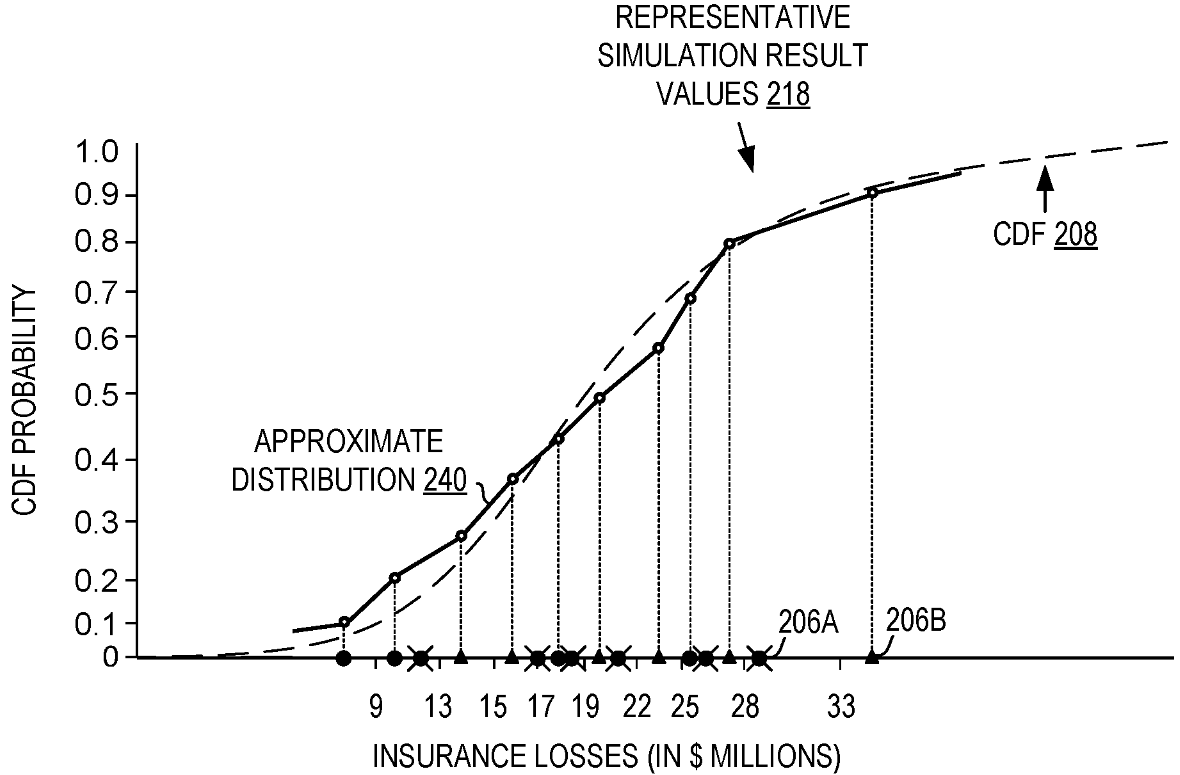
FIG. 5 is a plot of a plurality of representative simulation results that can be output by the computing system of FIG. 2.

FIG. 5 shows a plot of the representative simulation result values 218 resulting from at least six iterations of swapping simulation values. In each iteration, one simulation value is removed, and one simulation value is added. A resulting approximate distribution 240 formed by the representative simulation results 218 is closer to the CDF 208 than the initial simulation results 206 of FIG. 3. As a result, the representative simulation results 218 may serve as a more accurate model than the initial simulation results.

Figure 6B:
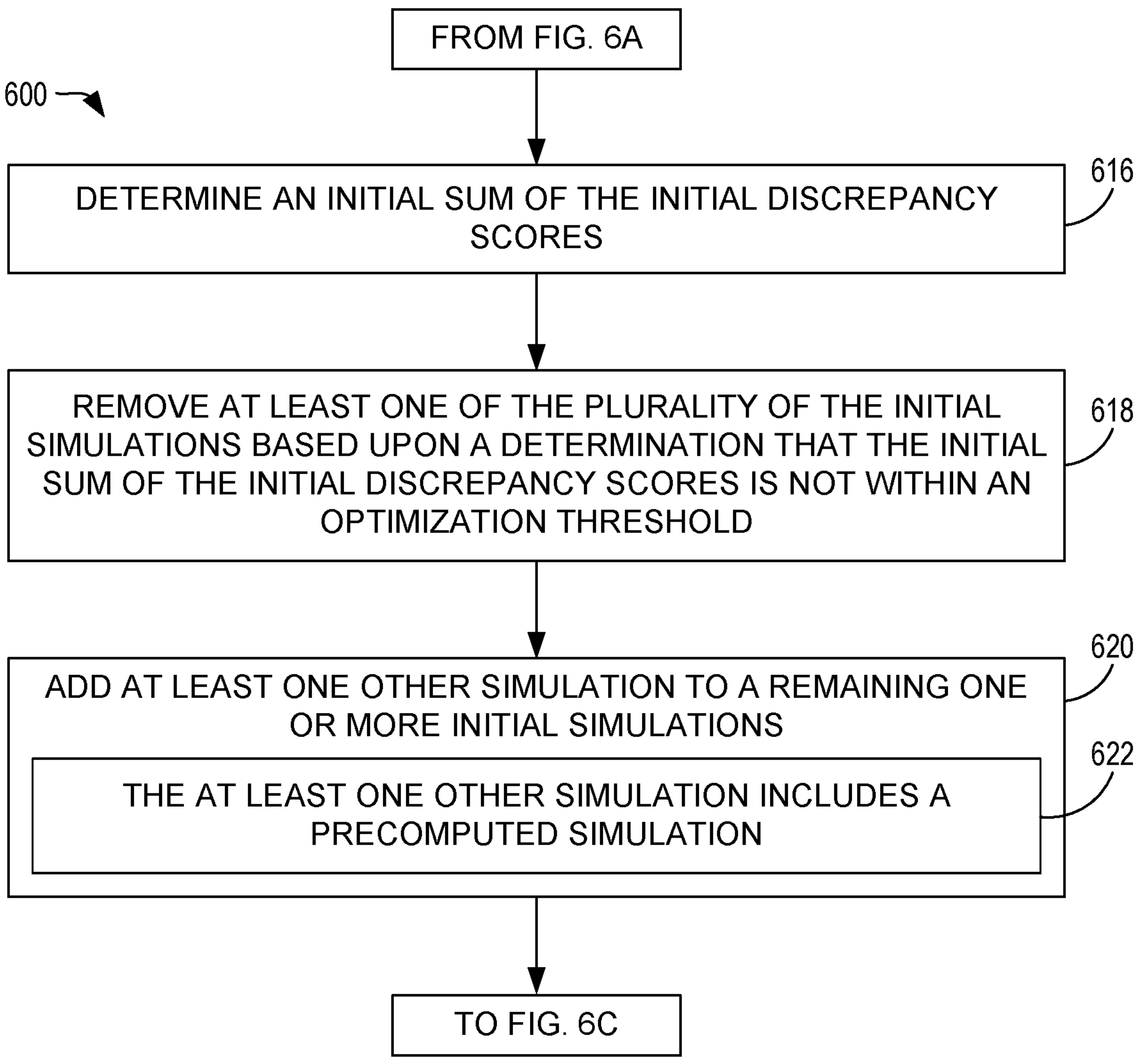

With reference now to FIGS. 6A-6C, a flowchart is illustrated depicting an example method 600 for selecting a representative sequence of simulations based on stratification. The following description of method 600 is provided with reference to the software and hardware components described above and shown in FIGS. 1-5 and 16, and the method steps in method 600 will be described with reference to corresponding portions of FIGS. 1-5 and 16 below. It will be appreciated that method 600 also may be performed in other contexts using other suitable hardware and software components.

It will be appreciated that the following description of method 600 is provided by way of example and is not meant to be limiting. It will be understood that various steps of method 600 can be omitted or performed in a different order than described, and that the method 600 can include additional and/or alternative steps relative to those illustrated in FIGS. 6A-6C without departing from the scope of this disclosure.

Referring first to FIG. 6A, at 602, the method 600 includes receiving, for a plurality of correlated variables, a first predetermined number of simulations from a Monte-Carlo simulation sample. Each simulation includes a plurality of initial simulation results for the plurality of the variables. The method 600 further includes receiving one or more target statistics 213 based on the correlated random variables. The method 600 further includes receiving a second predetermined number of strata for each variable and target statistic, and a cumulative distribution function for each variable and target statistic. For example, the computing system 202 of FIG. 2 receives the initial simulation results 206, the first predetermined number 212 of the simulations 204, the second predetermined number 210 of strata for each variable and target statistic, and the CDF 208. The first predetermined number 212 of the simulations, the second predetermined number 210 of strata, and the CDF 208 enable the computing device 202 to evaluate the initial simulation results 206 for selection error and output a plurality of representative simulations 218 that are within an optimization threshold of the CDF 208 across the strata.

At 604, the method 600 includes, for each variable and for each of one or more target statistics, segmenting a unit interval of the cumulative distribution function into the second predetermined number of strata and a support of the cumulative distribution function into a plurality of bins such that each bin of the plurality of bins corresponds to one of the strata. For example, FIG. 3 shows the CDF 208 segmented into 10 bins 216A-216J corresponding to cumulative probability deciles. Segmenting the CDF 208 enables the computing system 202 to evaluate the distribution of the initial simulation results 206. The CDF 208 is also stratified based on a target statistic (e.g., an aggregate, minimum, maximum, or other target statistic desired to be computed based upon a dependent variable).

The method 600 further includes, at 606, determining an initial discrepancy score based upon a quantity of values in each bin, the first predetermined number of the simulations, and the second predetermined number of the strata for the variable. For example, the computing system 202 is configured to determine the initial discrepancy score 220 based upon the quantity of values in each bin 216, the first predetermined number 212 of the simulations 204, and the second predetermined number 210 of the strata. As described above, the initial discrepancy score measures deviation between the initial Monte Carlo simulation data and the CDF.

In some examples, at 608, determining the initial discrepancy score includes determining an initial bin-wise discrepancy metric for each bin of the plurality of bins. For example, the computing system 202 is configured to determine the initial bin-wise discrepancy metric 222 for each bin 216. The initial bin-wise discrepancy metric indicates how evenly the initial simulation results 206 are distributed between bins 216A-216J.

At 610, in some examples, determining the initial bin-wise discrepancy metric for a selected bin includes determining a difference between the quantity of values in the selected bin and the first predetermined number of the simulations divided by the second predetermined number of the strata for the variable or target statistic. For example, the initial bin-wise discrepancy metric 222 may be represented in the form of equation (5) described above. In this manner, the initial bin-wise discrepancy metric 222 measures discrepancy between the number of values in each bin and the number of values if the initial simulations were distributed evenly across the bins.

In some examples, at 612, determining the initial bin-wise discrepancy metric for the selected bin includes determining a maximum bin-wise discrepancy metric or determining a sum of the initial bin-wise discrepancy metrics for the plurality of bins. For example, the initial discrepancy score 220 may comprise the maximum bin-wise discrepancy metric described in equation (6) or the sum of the initial bin-wise discrepancy metrics described in equation (7). In this manner, the initial discrepancy score represents the largest discrepancy between the initial Monte Carlo simulation data and the CDF, or an aggregate discrepancy for the initial Monte Carlo simulation data, respectively.

At 614, in some examples, determining the initial discrepancy score includes weighting the initial bin-wise discrepancy metric for each bin of the plurality of bins based upon a proximity of a stratum corresponding to the bin to a tail of the cumulative distribution function. For example, in FIG. 3, an initial bin-wise discrepancy metric for insurance losses of greater than or equal to $33 million may be assigned a greater weight (e.g., 0.99 in the range of [0-1]) than values in the range of [$15 million-$25 million) (e.g., 0.15 in the range of [0-1]). In this manner, the initial discrepancy score may be weighted to place greater emphasis on the tail of the CDF or any other suitable portion of the CDF (e.g., the mean of the CDF).

Referring now to 616 of FIG. 6B, the method 600 includes determining an initial sum of the initial discrepancy scores. For example, the computing system 202 determines the initial sum 226 of the initial discrepancy scores 220. As described above, the initial sum 226 serves as an optimization metric which is compared to the optimization threshold 228 to select the representative simulations 218.

For example, at 618, the method 600 includes removing at least one of the plurality of the initial simulations based upon a determination that the initial sum of the initial discrepancy scores is not within an optimization threshold. For example, one simulation result value 206A is removed from the plurality of the initial simulation result values in FIG. 4. Removal of at least one of the plurality of the initial simulation result values may help to reduce simulation error either via random sampling or via explicitly choosing to remove an outlier from the CDF.

At 620, the method 600 includes adding at least one other simulation to a remaining one or more initial simulations. For example, the simulation result value 206B is added to the values that remain after the value 206A is removed. Like the removal of the simulation result value 206A, adding the simulation result value 206B may reduce simulation error in the modified data 230 via random sampling or explicitly selecting a simulation value that is closer to the CDF than the removed value 206A. In addition, adding at least one other simulation result helps achieve or maintain a target number of representative simulation results for output.

In some examples, at 622, the at least one other simulation includes a precomputed simulation. For example, the computing system 202 is configured to precompute one or more Monte Carlo simulations 232. This enables the computing system 202 to estimate the CDF 208 upfront and enables re-use of the CDF 208 for the modified simulation result values 230, rather than recomputing a new CDF 208 at each step of the optimization process.

Referring now to 624 of FIG. 6C, the method 600 includes, for each variable and target statistic, using the quantity of the values in one or more bins corresponding to the at least one of the plurality of the initial simulation results and the quantity of the values in one or more bins corresponding to the at least one other simulation results to generate an updated discrepancy score. For example, the computing system 202 is configured to generate the updated discrepancy score 234 for each variable and target statistic. This updated discrepancy score 234 is compared to the optimization threshold 228 to determine whether the optimization threshold 228 is satisfied or whether to proceed through another round of removing and adding simulation values.

In some examples, at 626, generating the updated discrepancy score includes determining an updated bin-wise discrepancy metric for the one or more bins corresponding to the at least one of the plurality of the initial simulations and for the one or more bins corresponding to the at least one other simulation. The updated bin-wise discrepancy metric is used for the one or more bins corresponding to the at least one of the plurality of the initial simulations and for the one or more bins corresponding to the at least one other simulation. The initial bin-wise discrepancy metric is used for each of the remaining one or more initial simulations to generate the updated discrepancy score. For example, the computing system 202 may compute an updated bin-wise discrepancy metric 236 for $$\text{bin}\left(x_k^{(j)}\right)$$

from which sample $$x_k^{(j)}$$

is removed, and for $$\text{bin}\left(x_k^{(j')}\right)$$

to which a simulation value $$x_k^{(j')}$$

is added. The computing system 202 may re-use the initial bin-wise discrepancy metric 222 for any bins that are not modified. This results in the discrepancy score 234 being updated more rapidly and in a less computationally intensive manner than by recomputing the initial bin-wise discrepancy metric for each bin during the optimization process.

At 628, in some examples, generating the updated discrepancy score includes: decrementing the quantity of values in the one or more bins corresponding to the at least one of the plurality of the initial simulations; and incrementing the quantity of values in the one or more bins corresponding to the at least one other simulation. For example, the computing system is configured to decrement bin count $$b_k \text{ of } \mathrm{bin}\left(x_k^{(j)}\right)$$

in dimension k by the number of simulation values removed (e.g., 1). The computing system is further configured to increment bin count $$b'_k \text{ of bin } \left(x_k^{(j')}\right)$$

in dimension k by the number of simulation values added (e.g., 1). The updated quantities of values in each of the bins 216I and 216J are used to generate the updated bin-wise discrepancy metric.

The method 600 further includes, at 630, determining an updated sum of the updated discrepancy scores. For example, the computing system 202 is configured to calculate the updated sum 238. The updated sum serves as an aggregate discrepancy measure that can be compared to the same optimization threshold 228 as the initial sum 226. This comparison enables the computing system 202 to determine whether to initiate an additional optimization loop (e.g., by further modification of the modified simulation results 230) or whether the modified simulation results 230 satisfy the optimization threshold 228 for output as the representative simulation result values 218.

In some examples, at 632, the method 600 includes accepting or rejecting the at least one other simulation based upon the updated sum of the updated discrepancy scores. For example, the computing system 202 may reject the added simulation result value 206B if the updated sum 238 of the discrepancy scores 234 is greater than the initial sum 226 of the initial discrepancy scores 220. This may drive the modified simulation results 230 towards the optimization threshold 228.

At 634, the method 600 includes outputting a plurality of representative simulation results that represent the cumulative distribution function across the strata based upon the updated sum of the updated discrepancy scores. For example, the computing system 202 is configured to output the modified simulation results 230 as the representative simulation results 218 if the modified simulation results 230 meet the optimization threshold 228.

The above-described systems and methods may be used to select a representative sequence of simulations from a pool of Monte Carlo simulation data. At least one simulation is removed from a plurality of initial simulation based at least on an initial discrepancy score, and at least one other simulation is added to the values that remain. This may reduce the discrepancy of the selected sequence of simulations relative to the initial discrepancy score, either via statistical effects achieved via random sampling or by explicitly replacing an outlier from a CDF of the Monte Carlo simulation data values. In addition, adding at least one other simulation helps achieve or maintain a target number of simulations for output. An updated discrepancy score is generated and used to select a plurality of representative simulations for output. The updated discrepancy score is generated using an updated bin-wise discrepancy metric for any bins that are modified, and by re-using an initial bin-wise discrepancy metric for any bins that are not modified. This formulation of the updated discrepancy score may be updated more rapidly and in a less computationally expensive manner than by recomputing the initial bin-wise discrepancy metric for each bin. As a result, the above-described systems and methods increase the predictive power of models based upon a relatively small pool of representative samples by decreasing sampling error relative to the initial simulation results, while maintaining similar accuracy to a model based upon a larger number of samples.

As discussed above with reference to FIG. 2, when the computing system 202 receives the initial simulation results 204 and the respective CDF 208 of the variables and target statistics of the initial simulation results 204, the computing system 202 may further receive a quantity 210 of strata into which the CDF 208 may be divided. The CDF 208 may accordingly be divided into a number of bins 216 equal to the quantity 210. Categorizing the initial simulation results 204 into bins 216 may allow the computing system 202 to perform the stratified sampling techniques discussed above in order to generate representative simulation results 218 for the CDF 208 over the strata. The representative simulation results 218 may have a total discrepancy that is reduced compared to the initial simulation results, thereby reducing redundancy when the representative simulation results 218 are used as inputs to a Monte Carlo simulation.

When using the stratified sampling techniques discussed above, determining the locations of the boundaries between the bins 216 is one challenge that may arise. Depending upon the shape of the CDF 208, the locations within the unit interval of the boundaries between the bins 216 may vary between different sets of initial simulation results 204. In order to obtain a set of representative simulation results 218 with a reduced discrepancy relative to the initial simulation results 204, the computing system 202 may be configured to utilize a surrogate cumulative distribution model, as discussed in further detail below.

Section 3. Modeling Aggregate Distributions and Compressing Monte Carlo Simulations Using Surrogate Cumulative Distribution Model In addition to modeling the shape of the CDF 208, the surrogate cumulative distribution model discussed below may also be used when modeling the dependent variables of the initial simulation results 204. One such target statistic of particular interest in applications such as insurance, inventory management, and energy production is the aggregate over the correlated random variables. The aggregate may, for example, be an aggregate loss by an insurer, an aggregate volume of a product sold, or an aggregate quantity of energy generated. As discussed below, the surrogate cumulative distribution model may be used when generating a low-discrepancy sample of an aggregate distribution.

Figure 7:
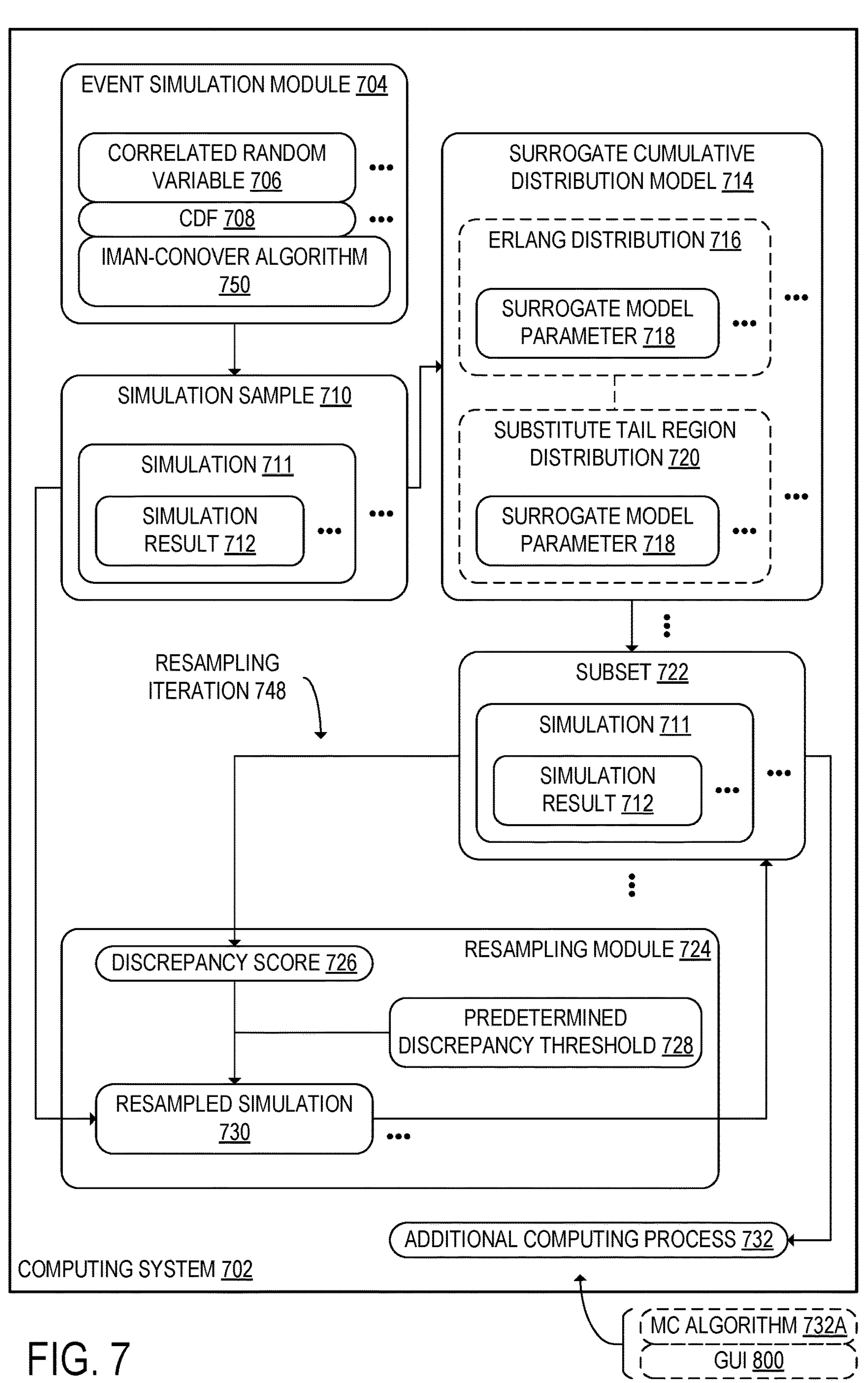
FIG. 7 shows an example computing system at which an event simulation model, a surrogate cumulative distribution model, and a resampling module are configured to be executed, according to an embodiment of the subject disclosure.

FIG. 7 shows an example computing system 702 at which an event simulation model 704, a surrogate cumulative distribution model 714, and a resampling module 724 are configured to be executed, according to one example. The computing system 702 may, for example, embody the computing system 102 of FIG. 1. Alternatively, the computing system 702 may be a separate computing system. The aggregate distribution modeling 134 and the Monte Carlo simulation compression 136 shown in FIG. 1 may be performed at the computing system 702.

The computing system 702 may be configured to receive a plurality of simulation results 712 for a plurality of correlated random variables 706. For example, as shown in FIG. 7, the plurality of simulation results 712 may be generated at the event simulation model 704 and may be included in a plurality of simulations 711. In some examples, the event simulation module 704 may be included in the correlator 124 of FIG. 1. When the computing system 702 executes the event simulation module 704, the computing system may be configured to generate a simulation sample 710 including a plurality of simulations 711, where each simulation 711 includes a plurality of simulation results 712. Each of the simulation results 712 may be a value of a correlated random variable 706, and each simulation 711 may include a respective simulation result 712 for each of the correlated random variables 706. Each of the simulations 711 may include the same number of simulation results 712. In some examples, the plurality of simulation results 712 may be included in the initial simulation results 204 shown in FIG. 2.

The plurality of simulation results 712 may, in some examples, include a plurality of aggregate values over the plurality of correlated random variables 706. In other examples, the plurality of simulation results 712 may include a plurality of minimum values or maximum values over the plurality of correlated random variables 706. Other target statistics of the correlated random variables 706 may additionally or alternatively be included among the plurality of simulation results 712.

In some examples, the computing system 702 may be configured to generate the plurality of simulation results 712 for the plurality of correlated random variables 706 at least in part by executing an Iman-Conover algorithm 750 at the event simulation model 704. When the Iman-Conover algorithm 750 is performed at the event simulation module 704, the computing system 702 may be configured to sample simulation results 712 for the plurality of correlated random variables 706 in a manner that preserves dependencies between those simulation results 712. Thus, the computing system 702 may be configured to generate the simulations 711. The dependencies between the correlated events 706 may be indicated by a copula 118 and/or a correlation matrix 122, as discussed above with reference to FIG. 1.

The event simulation module 704 may be configured to receive and/or compute a respective CDF 708 associated with a correlated random variable 706. The event simulation module 704 may be further configured to use the CDF 708 as input when computing the simulation results 712 included in the simulations 711. The CDF 708 may, for example, be the CDF 208 and may be estimated as shown in the example of FIGS. 2-5.

The computing system 702 may be further configured to generate a surrogate cumulative distribution model 714 configured to model the CDF 708. The surrogate cumulative distribution model 714 may, for example, be configured to model the CDF 708 of an aggregate value, a minimum value, or a maximum value of the plurality of variables, or some other statistic of the variables, which may be a user-defined custom function. As discussed below, the surrogate cumulative distribution model 714 may have a plurality of surrogate model parameters 718, and generating the surrogate cumulative distribution model 714 may include estimating the plurality of surrogate model parameters 718 based at least in part on the plurality of simulation results 712.

In some examples, the surrogate cumulative distribution model 714 may be a mixed Erlang model including a plurality of Erlang distributions 716. Thus, in such examples, the surrogate cumulative distribution model 714 may approximate the CDF 708 as a weighted sum of the plurality of Erlang distributions 716 in which each of the Erlang distributions 716 has a respective mixing weight included among the plurality of surrogate model parameters 718. Each of the plurality of Erlang distributions may be parameterized by parameters $k \in \mathbb{Z}^+$ and $\lambda \in \mathbb{R}^+$. The parameter k is the shape parameter of the Erlang distribution 716 and the parameter $\lambda$ is the rate parameter of the Erlang distribution 716. Alternatively, the Erlang distributions 716 may each be parameterized in terms of k and $\beta$, where $\beta = 1/\lambda$.

In some examples, the surrogate cumulative distribution model 714 may further include one or more substitute tail region distributions 720. The one or more substitute tail region distributions 720 may be configured to replace one or more respective tail regions of one or more of the plurality of Erlang distributions 716, and may differ from the one or more Erlang distributions 716 within the one or more respective tail regions. The one or more tail regions that are configured to be replaced with the one or more substitute tail region distributions 720 may include a lower tail of the mixed Erlang model and/or an upper tail of the mixed Erlang model. Thus, when the surrogate cumulative distribution model 714 includes one or more substitute tail region distributions 720, the surrogate cumulative distribution model 714 may be a piecewise function of the sum of the plurality of Erlang distributions 716 and the one or more substitute tail region distributions 720, with one or more respective threshold values that specify one or more cutoff points between the sum of the plurality of Erlang distributions 716 and the one or more substitute tail region distributions 720. In examples in which the surrogate cumulative distribution model 714 includes one or more substitute tail region distributions 720, the computing system 702 may be configured to normalize the surrogate cumulative distribution model 714 such that the integral of the surrogate cumulative distribution model 714 over the interval $[0, \infty)$ is equal to 1.

In some examples, the surrogate cumulative distribution model 714 may be an empirical model. In such examples, the computing system 702 may be configured to estimate the surrogate model parameters 718 based at least in part on empirical data included in the plurality of simulations 711. The plurality of simulations 711 may, in such examples, include both empirically collected data and programmatically generated synthetic data.

By modeling the CDF 708 with a surrogate cumulative distribution model 714 expressed as a sum of a plurality of Erlang distributions 716, the computing system 702 may flexibly model the shape of the CDF 708 while only using a small number of parameters. In addition, including one or more substitute tail region distributions 720 in the surrogate cumulative distribution model 714 may allow the computing system 702 to more accurately represent a light-tailed or heavy-tailed distribution. Since heavy-tailed distributions are of particular interest in risk modeling applications (e.g., insurance against extreme weather events), a mixed Erlang model with substitute tail regions may allow for more accurate modeling of regions of the distribution that are particularly likely to be relevant to the user's decision-making.

Figure 8:
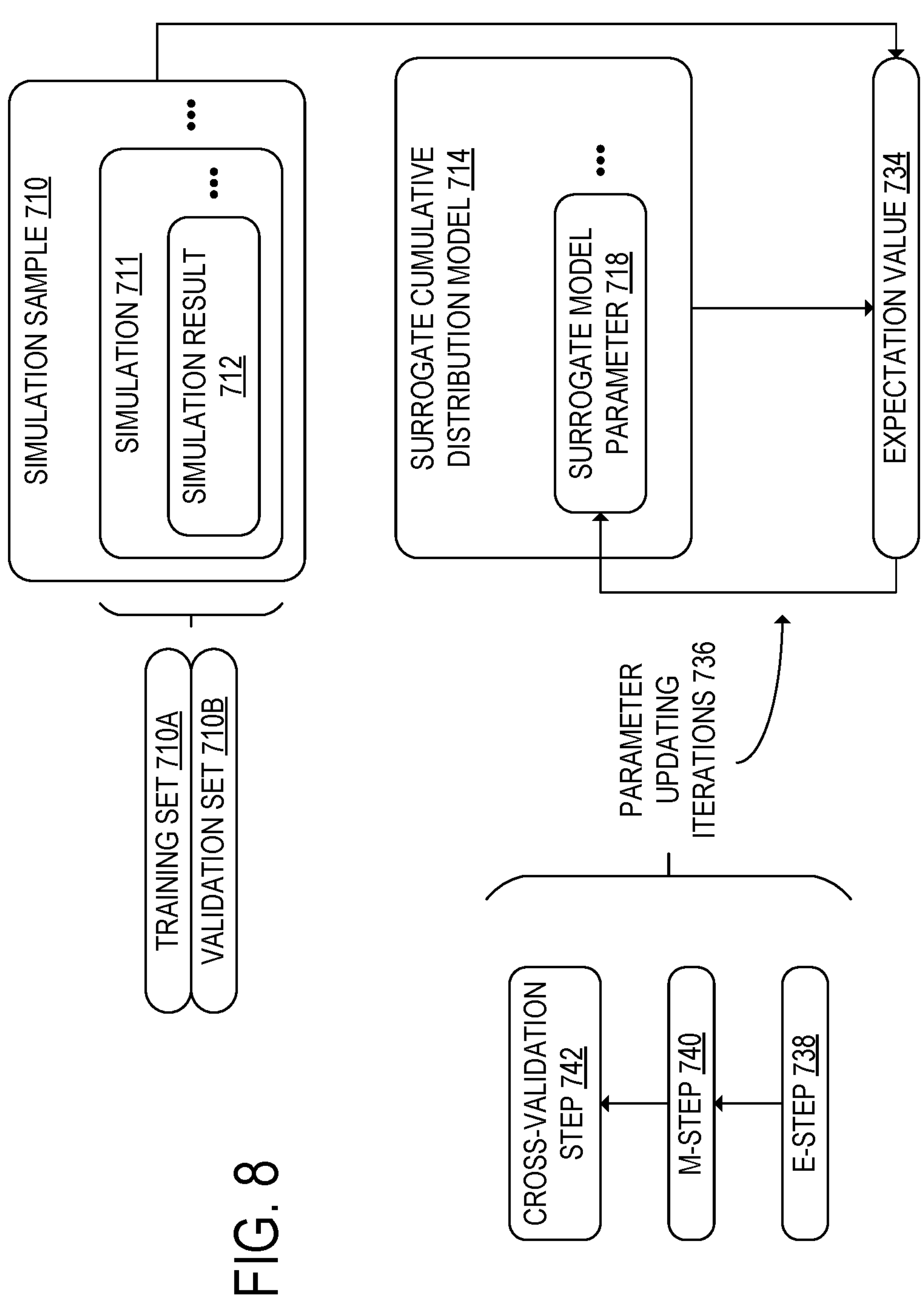
FIG. 8 shows an example process by which the computing system may be configured to estimate a plurality of surrogate model parameters included in the surrogate cumulative distribution model, according to the example of FIG. 7.

FIG. 8 shows an example process by which the computing system 702 may be configured to estimate the plurality of surrogate model parameters 718 when generating the surrogate cumulative distribution model 714. In the example of FIG. 8, the computing system 702 is configured to estimate the plurality of surrogate model parameters 718 at least in part by performing iterative expectation maximization. When the computing system 702 performs iterative expectation maximization, the computing system 702 may be configured to compute respective expectation values 734 of the surrogate cumulative distribution model 714 in each of a plurality of parameter updating iterations 736 when the simulation results 712 included in the simulation sample 710 are input into the surrogate cumulative distribution model 714.

In some examples, as shown in FIG. 8, the iterative expectation maximization may be performed using a generalized expectation maximization (GEM) algorithm in which the plurality of parameter updating iterations 736 includes an E-step 738, an M-step 740, and a cross-validation step 742. The E-step 738, the M-step 740, and the cross-validation step 742 may each include a respective plurality of iterative steps. During the E-step 738, the computing system 702 may be configured to compute the expectation value 734 as a conditional log-likelihood expectation. The expectation value 734 may be computed as a function of the simulation results 712 and the current values of the surrogate model parameters 718.

At the M-step 740, the computing system 702 may be further configured to compute an estimated argmax of the expectation value 734 as a function of the surrogate model parameters 718. In some examples, the argmax may be estimated at least in part by executing a stochastic search algorithm such as simulated annealing, simulated quantum annealing, population annealing, or parallel tempering. Additionally or alternatively, the computing system 702 may be configured to compute the argmax of the expectation value 734 at least in part by iteratively performing a 3-optimal algorithm to update the shape parameters k of the Erlang distributions 716 to the estimated argmax values.

At the cross-validation step 742, the computing system 702 may be further configured to select a reduced number of Erlang distributions 716 for inclusion in the surrogate cumulative distribution model 714 in order to avoid overfitting. Performing the cross-validation step 742 may include selecting a training set 710A and a validation set 710B that each include simulations 711 included in the simulation sample 710. The computing system 702 may use the simulations 711 included in the training set 710A as inputs when computing a fitted density function with the surrogate model parameters 718. The computing system 702 may be further configured to use the simulations 711 included in the validation set 710B as inputs, along with the fitted density function, when computing a cross-validation score. The computing system 702 may be further configured to compute respective cross-validation scores for different numbers of Erlang distributions 716 and select the number of Erlang distributions 716 that maximizes the cross-validation score. Accordingly, the computing system 702 may be configured to iteratively compute the parameters of a mixed Erlang model that accurately represents the CDF 708 while also including a small number of Erlang distributions 716.

Returning to the example of FIG. 7, based at least in part on the surrogate cumulative distribution model 714 with the surrogate model parameters 718, the computing system 702 may be further configured to select one or more subsets 722 of the plurality of simulations 711. In some examples, the computing system 702 may be configured to select the plurality of simulations 711 included in the subset 722 using a random or pseudorandom process.

The computing system 702 may be configured to stratify the image of the surrogate cumulative distribution model 714 into a number of strata. These strata may be quantiles. For example, a quantile may be a quintile, a decile, a percentile, or some other subset given by a partitioning of the range of the surrogate cumulative distribution model into equal-sized strata. The computing system 702 may be configured to estimate the locations of boundaries between the strata by computing the locations of boundaries between quantiles of the surrogate cumulative distribution model 714. In examples in which the locations of the boundaries are computed, the computing system may be further configured to select one or more subsets 722 of the plurality of simulations 711 so that the simulations results 712 included in the simulations 711 included in the one or more subsets 722 are equally distributed across the strata.

The computing system 702 may be further configured to perform one or more resampling iterations 748 at a resampling module 724. During each of the resampling iterations 748, the computing system 702 may be configured to compute respective discrepancy scores 726 of the one or more subsets 722. Each discrepancy score 726 may be computed as discussed above with reference to FIG. 2. In addition, the computing system 702 may be further configured to compute a sum of the one or more discrepancy scores 726. The one or more resampling iterations 748 may be iteratively performed until the sum of the discrepancy scores 726 of the one or more subsets 722 is determined to be below a predetermined discrepancy threshold 728. Alternatively, some other optimization threshold may be used as an endpoint of the one or more resampling iterations 748. The optimization threshold may, for example, be selected as discussed above with reference to FIG. 2.

During each of the one or more resampling iterations 748, based at least in part on the discrepancy score 726, the computing system 702 may be further configured to sample one or more resampled simulations 730 for the plurality of correlated random variables 706. The resampled simulations 730 may be sampled from among the plurality of simulations 711 that are included in the simulation sample 710 and not already included in the one or more subsets 722. Thus, the computing system 702 may be configured to pre-compute the plurality of simulations 711 and resample the simulations 711 included in the one or more subsets 722 without having to generate additional simulations 711 at the event simulation module 704. The resampling iterations 748 may accordingly be executed more quickly in examples in which the event simulation module 704 takes substantial amounts of time to compute the simulations 711.

Subsequently to generating the one or more resampled simulations 730 in each resampling iteration 748, the computing system 702 may be further configured to replace one or more simulations 711 included in the one or more subsets 722 with the one or more resampled simulations 730. When one or more of the plurality of simulations 711 included in the one or more subsets 722 are resampled, the computing system 702 may be configured to select one or more of the simulations 711 included in the simulation sample 710 that are not currently included in the subset 722. Thus, one or more simulations 711 used to estimate the surrogate distribution model 714 may be reused, thereby reducing the amount of computation performed when generating the one or more resampled simulations 730. Accordingly, if the resampling iteration 748 in which the one or more resampled simulations 730 are generated is followed by a subsequent resampling iteration 748, the computing system 702 may be configured to use the updated subset 722 including the one or more resampled simulations 730 in the subsequent resampling iteration 748 when computing the one or more discrepancy scores 726.

In some examples, the computing system 702 may be configured to replace the one or more simulations 711 with the one or more resampled simulations 730 at least in part by performing a quantum-inspired algorithm. The quantum-inspired algorithm may, for example, be a Markov chain Monte Carlo algorithm such as simulated annealing, simulated quantum annealing, population annealing, or parallel tempering. The sum of the discrepancy scores 726 may, in such examples, be used as a loss for which the resampling module 724 may be configured to estimate a minimum value.

In some examples, when one or more of the plurality of simulations 711 are resampled, the computing system 702 may be configured to sample the one or more resampled simulations 730 at least in part by executing the Iman-Conover algorithm 750. The computing system 702 may be configured to perform the Iman-Conover algorithm 750 at the resampling module 724, with the simulations 711 included in the simulation sample 710 as input.

Figure 9:
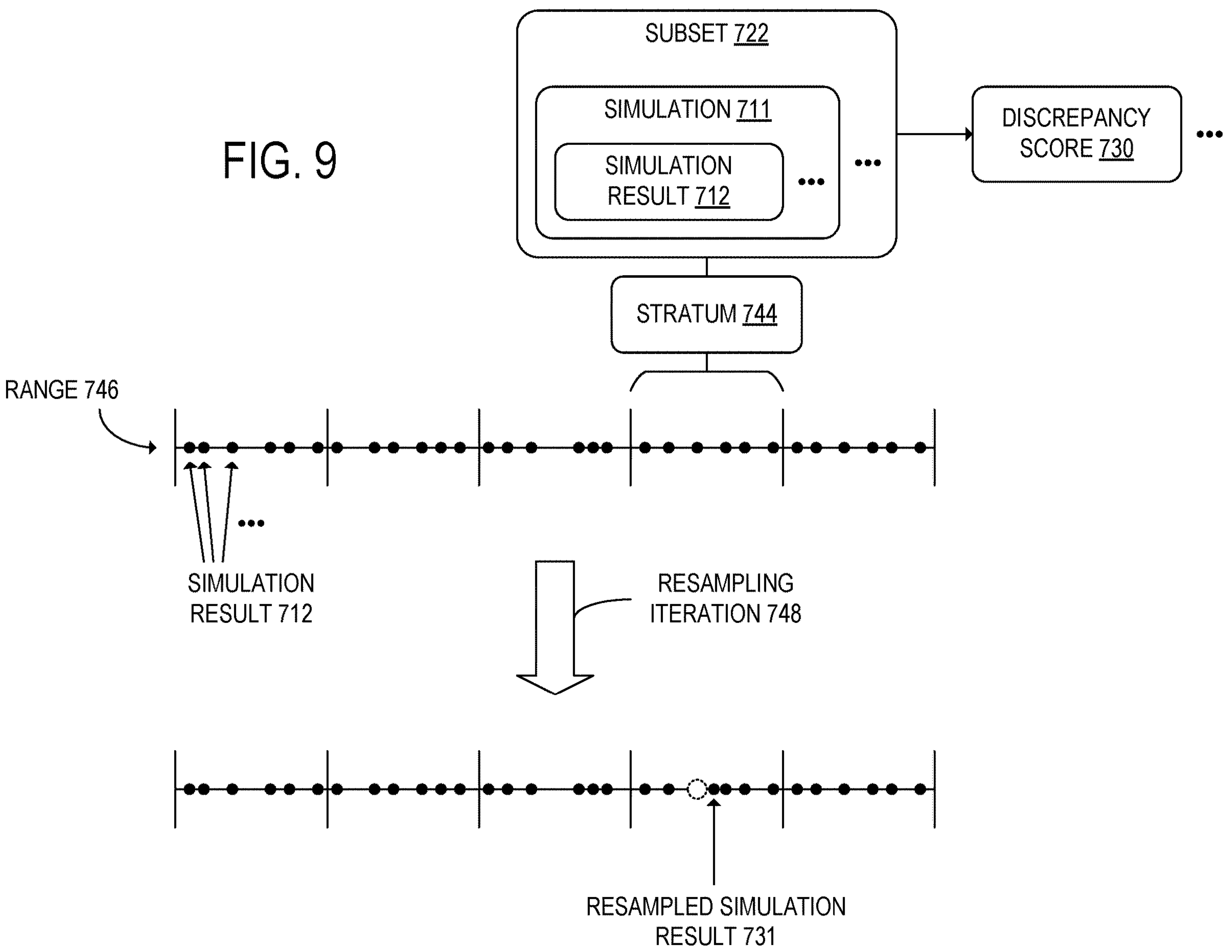
FIG. 9 shows a resampling iteration in an example in which the computing system is configured to divide a simulation sample into strata, according to the example of FIG. 7.

FIG. 9 shows an example resampling iteration 748. During the resampling iteration 748, the computing system 702 may, as shown in FIG. 9, be configured to compute a plurality of strata 744 of the surrogate cumulative distribution model 714 of a statistic of interest. The computing system 702 may be further configured to select the one or more subsets 722 such that the simulations 711 included in the one or more subsets 722 have the simulation results 712 associated with the statistic of interest distributed equally among the plurality of strata 744. The values of the statistic of interest for the plurality of simulation results 712 in the example of FIG. 9 have a range 746 that is divided into five quantiles 744.

When the resampling iteration 748 is performed, the computing system 702 may replace a simulation 711 with a resampled simulation 730. In this case, a simulation result 712 included in the simulation 711 is replaced with a resampled simulation result 731 included in the resampled simulation 730. This resampled simulation result 731 may be in the stratum 744 in which the simulation result 712 is located. Alternatively, the resampled simulation 730 may be in a different stratum from the stratum 744 in which simulation result 712 is located. The simulation results 712 included in other simulations 711 of the simulation sample 710 may remain unchanged. Although FIG. 9 shows the resampling of one simulation 711 during the resampling iteration 748, a plurality of simulations 711 may be resampled in a resampling iteration 748.

Returning to FIG. 7, subsequently to performing the one or more resampling iterations 748, the computing system 702 may be further configured to output the one or more subsets 722 of the simulations 711. The one or more subsets 722 may be output to an additional computing process 732 at which the simulations 711 included in the one or more subsets 722 may be used as inputs.

In some examples, the additional computing process 732 may be a Monte Carlo algorithm 732A. In such examples, the one or more subsets 722 may be used as one or more compressed inputs to the Monte Carlo algorithm 732A with which the computing system 702 may compute an estimated solution to an optimization problem. The Monte Carlo algorithm 732A may be configured to compute the estimated solution to the optimization problem with a smaller set of inputs relative to the full simulation sample 710. However, since the subset 722 is resampled to have a sum of one or more discrepancy scores 726 below the predetermined discrepancy threshold 728, the accuracy of the Monte Carlo simulation may be maintained while reducing the number of inputs. Thus, compressing the simulation sample 710 using the surrogate cumulative distribution model 714 may allow the Monte Carlo simulation to be performed more efficiently.

Figure 10:
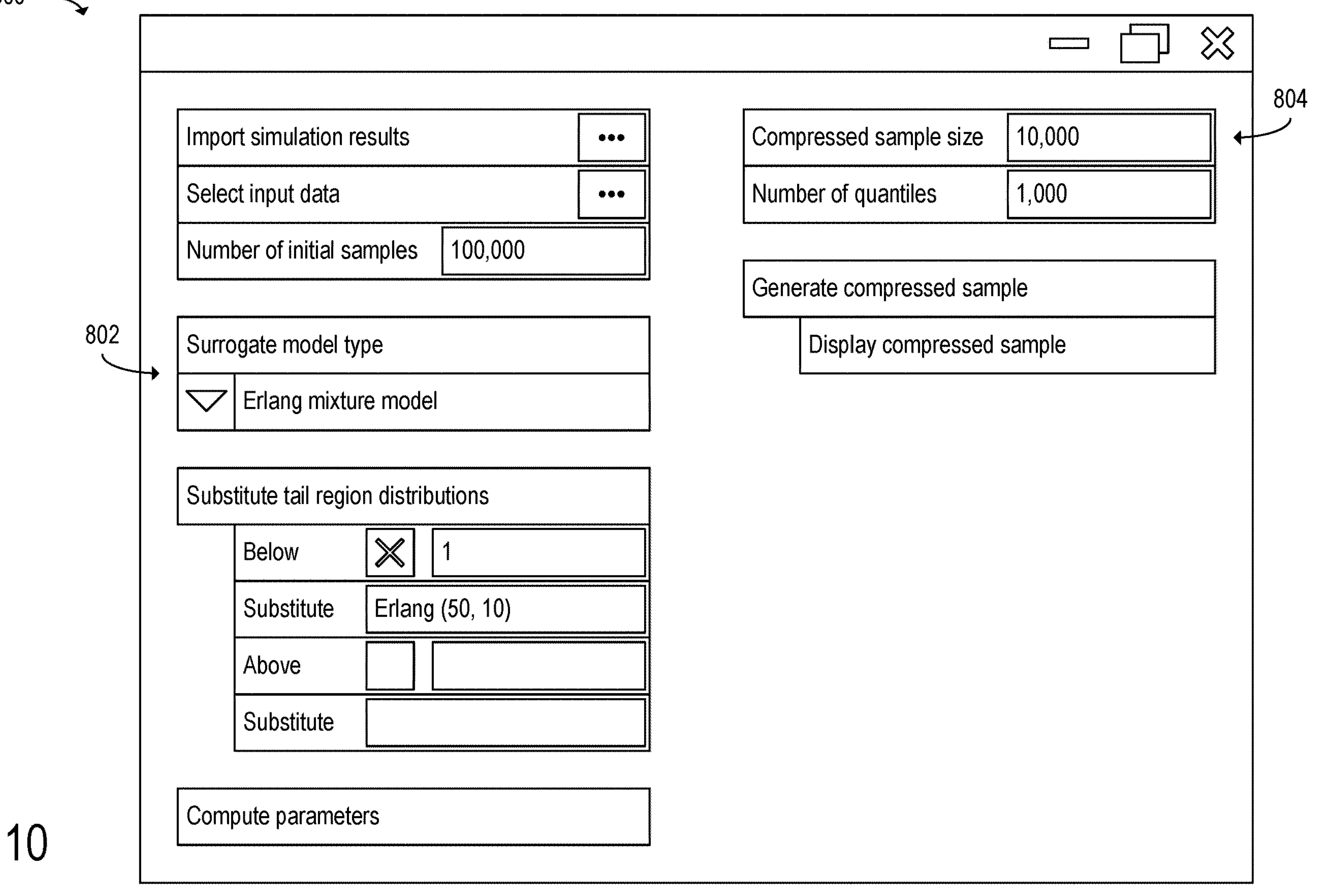
FIG. 10 shows a graphical user interface (GUI) configured to be implemented at the computing system of FIG. 7.

In some examples, as shown in FIG. 10, a graphical user interface (GUI) 800 may be implemented at the computing system 702. The GUI 800 may, for example, be displayed at a display device included in the computing system 702. At the GUI 800, the computing system 702 may be configured to receive an indication of the input data for which the surrogate cumulative distribution model 714 and the one or more subsets 722 are configured to be generated. The user may, for example, specify a number of simulations 711 to initially generate at the event simulation module 704.

At the GUI 800, the computing system 702 may be further configured to generate the surrogate cumulative distribution model 714 in response to receiving a surrogate model type selection 802 at the GUI 800. The surrogate model type selection 802 may include a selection of a type of function configured to be used as the surrogate cumulative distribution model 714. In the example of FIG. 10, an Erlang mixture model is selected. In addition, the surrogate model type selection 802 may include one or more specifications of the one or more substitute tail region distributions 720.

At the GUI 800, the computing system 702 may be further configured to generate the one or more subsets 722 of the plurality of simulations 711 in response to receiving simulation generating instructions 804 at the GUI 800. The simulation generating instructions 804 may, as shown in the example of FIG. 10, include a number of simulations 711 to include in total across the one or more subsets 722. Alternatively, the user may specify, in the simulation generating instructions 804, a number of simulations 711 to include in each subset 722. The simulation generating instructions 804 may further include a number of strata 744 into which to divide the range 746 of the simulation results 712 included in the simulations 711 of the simulation sample 710.

The computing system 702 may be further configured to output the one or more subsets 722 of the simulations 711 to the GUI 800. The example GUI 800 of FIG. 10 includes a "display compressed sample" option.

FIG. 11A shows a flowchart of a method 900 for use with a computing system. The method 900 may, for example, be performed at the computing system 702 of FIG. 7. At step 902, the method 900 may include receiving, for a plurality of correlated random variables 706, a simulation sample 710 including a plurality of simulations 711. Each simulation may include a plurality of simulation results 712, which may be sampled values of the correlated random variables 706. In some examples, the plurality of simulation results 712 may include a plurality of aggregate values over the plurality of correlated random variables 706. Alternatively, the plurality of simulation results 712 may be minimum values, maximum values, or values of some other function of the correlated random variables 706.

The plurality of simulations 711 may be received from an event simulation module 704. The event simulation module 704 may be configured to receive a CDF 708 as input. In some examples, the plurality of simulation results 712 may be computed using an Iman-Conover algorithm 750.

At step 904, the method 900 may further include generating a surrogate cumulative distribution model 714 for the plurality of correlated random variables 706. Generating the surrogate cumulative distribution model 714 may include estimating a plurality of surrogate model parameters 718 based at least in part on the plurality of simulation results 712. The plurality of surrogate model parameters 718 may, for example, be estimated at least in part by performing iterative expectation maximization. For example, a GEM algorithm may be used. In some examples, the surrogate cumulative distribution model 714 may be an empirical model for which the surrogate model parameters 718 are estimated based at least in part on empirical data included in the plurality of simulations 711.

In some examples, the surrogate cumulative distribution model 714 may be a mixed Erlang model including a plurality of Erlang distributions 716. The plurality of surrogate model parameters 718 may include parameters of the Erlang distributions 716 and mixing weights for the Erlang distributions 716 in such examples. The surrogate cumulative distribution model 714 may further include one or more substitute tail region distributions 720 configured to replace one or more respective tail regions of one or more of the plurality of Erlang distributions 716. The one or more substitute tail region distributions 720 may replace an upper tail and/or a lower tail of the mixed Erlang model and may differ from the one or more Erlang distributions 716 within the one or more respective tail regions.

At step 906, the method 900 may further include selecting one or more subsets 722 of the plurality of simulations 711 based at least in part on the surrogate cumulative distribution model 714 with the surrogate model parameters 718. In some examples, the one or more subsets may be selected to be of equal size. Alternatively, the plurality of subsets may have a plurality of different sizes.

Step 908, step 910, and step 912 of the method 900 may be performed in each of one or more resampling iterations 748. These steps may be performed until a sum of one or more respective discrepancy scores 726 of the one or more subsets 722 is determined to meet an optimization threshold. For example, the sum of the discrepancy scores 726 may meet the optimization threshold when the sum is below a predetermined discrepancy threshold 728. At step 908, the method 900 may include computing the one or more discrepancy scores 726 of the one or more subsets 722. At step 910, the method 900 may further include sampling one or more resampled simulations 730 for the plurality of correlated events 706 based at least in part on the sum of the one or more discrepancy scores 726. The one or more resampled simulations 730 may be sampled from among the plurality of simulations 711 that are included in the simulation sample 710 and not already included in the one or more subsets 722. At step 912, the method 900 may further include replacing one or more simulations 711 included in the one or more subsets 722 with the one or more resampled simulations 730. Thus, the sum of the one or more discrepancy scores 726 of the one or more subsets 722 may be reduced over the course of the plurality of resampling iterations 748.

At step 914, the method 900 may further include outputting the simulations 711 included in the one or more subsets 722 subsequently to performing the one or more resampling iterations 748. In some examples, the one or more subsets 722 may be output to a Monte Carlo algorithm 732A. The one or more subsets 722 may be one or more compressed subsets of inputs to the Monte Carlo algorithm 732A that have a reduced sum of one or more discrepancy scores 726 relative to the initial simulation sample 710. Thus, the Monte Carlo algorithm 732A may compute a solution to an optimization problem more efficiently by using the subset 722 as input.

FIGS. 11B-11D show additional steps of the method 900 that may be performed in some examples. At step 916 of FIG. 11B, the method 900 may further include computing a plurality of strata 744 of the surrogate cumulative distribution model 714. At step 918, the method 900 may further include selecting the one or more subsets 722 such that the simulations 711 included in the one or more subsets 722 include simulation results 712 that are distributed equally among the plurality of strata 744. Accordingly, the compressed sample may more accurately model the variable associated to the surrogate cumulative distribution model 714 in sparsely populated regions of the CDF 708 and avoid high levels of redundancy in densely populated regions.

FIG. 11C shows additional steps of the method 900 that may be performed when sampling the plurality of resampled simulations 730. At step 920, the method 900 may further include executing the Iman-Conover algorithm 750. The Iman-Conover algorithm may be performed when selecting the one or more resampled simulations 730 from the simulation sample 710. In some examples, the initial simulations 711 may-also be generated using the Iman-Conover algorithm 750. At step 922, the method 900 may further include performing a quantum-inspired algorithm. The quantum-inspired algorithm may, for example, be a Markov chain Monte Carlo algorithm, which may be simulated annealing, simulated quantum annealing, population annealing, or parallel tempering. For example, the Markov chain Monte Carlo algorithm may use the sum of the one or more discrepancy scores 726 as a loss function for which an estimated minimum is computed.

FIG. 11D shows additional steps of the method 900 that may be performed in examples in which a GUI 800 is displayed to a user. At step 924, the method 900 may include generating the surrogate cumulative distribution model in response to receiving a surrogate model type selection 802 at the GUI 800. The surrogate model type selection 802 may specify a type of function for which the plurality of surrogate model parameters 718 are computed in order to generate the surrogate cumulative distribution model 714. At step 926, the method 900 may further include generating the one or more subsets 722 of the plurality of simulations 711 in response to receiving simulation generating instructions 804 at the GUI 800. The simulation generating instructions 804 may, for example, indicate a number of simulations 711 to include in a compressed sample and a number of strata into which the range 746 of surrogate cumulative distribution models is configured to be divided. At step 928, the method 900 may further include outputting the one or more subsets 722 of the simulations 711 to the GUI 800 subsequently to performing the resampling.

Using the systems and methods discussed above, a compressed subset of Monte Carlo simulation inputs may be generated, thereby allowing a Monte Carlo simulation to be performed more efficiently without a large reduction in accuracy. For example, the variable indicated in the simulation results included in the compressed subset may be aggregate values of a dependent variable over multiple different types of events. The aggregate values may, for example, be values of an aggregate loss by an insurer, an aggregate amount of a product stocked, or an aggregate amount of energy generated. The systems and method discussed above may accordingly facilitate the use of Monte Carlo methods to compute estimates of such quantities.

Section 4. Stratifying Event-Driven Models

Figure 12:
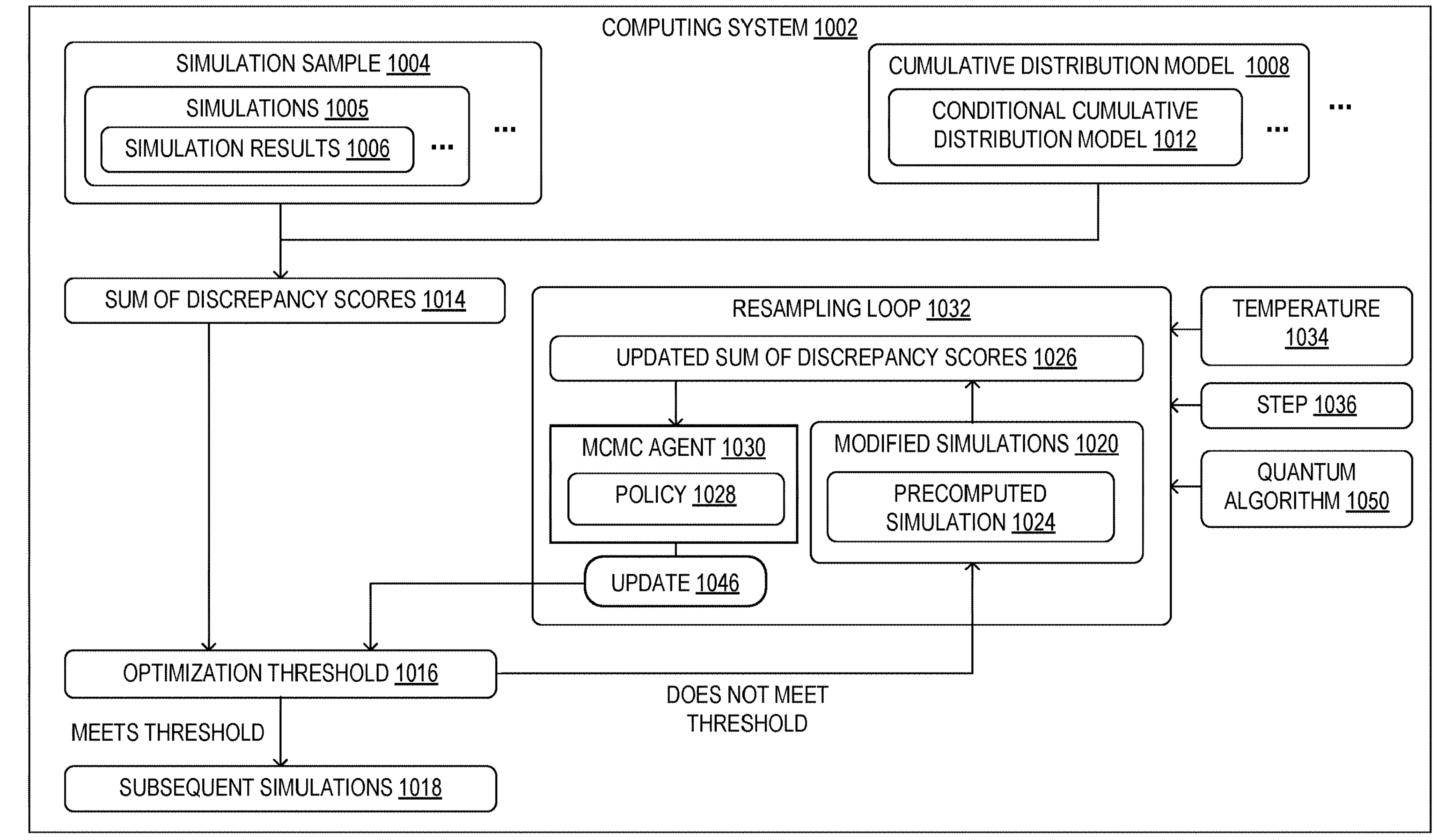
FIG. 12 shows an example of a computing system for stratifying event-driven models according to an example embodiment of the subject disclosure.

Referring now to FIG. 12, examples are disclosed that relate to stratifying event-driven models. Event-driven models may include a plurality of different statistics. For example, in an "individual excess-of-loss" reinsurance scenario, an insurer purchases insurance (referred to as "reinsurance") against individual claims or events, with coverage that pays out over a threshold (also known as an "attachment") and up to a limit, in what may be referred to as a "layer" of reinsurance. In this scenario, both the insurer and the reinsuring party ("the reinsurer") would be interested in statistics regarding claims within the layer; these could be used by the reinsurer to determine a price of the cover and by the insurer to assess the value and downside protection it provides (and may for example contrast that to the cost of holding additional capital itself to cover potential losses). In this setting, a model of individual claim amounts is required for analysis, as opposed to total losses accumulated over all claims. Other examples from reinsurance may involve various features which may, for example, limit aggregate amounts the reinsurer would be obliged to pay the insurer (these amounts being called "recoveries"), in addition to amounts deductible or limits on the individual recoveries, and a plurality of other contract features which in a model would result in highly nonlinear functions and may make it intractable to calculate the statistics of interest analytically, whence Monte Carlo simulation is frequently required. Furthermore, the layers may only be triggered by rare events (especially if the attachment is high), meaning Monte Carlo simulation is rather inefficient: even with large (and therefore computationally expensive) numbers of simulations for the underlying claims, many simulations will have zero recoveries in the reinsurance and the few that do exhibit recoveries may not provide a sample of sufficient size for stable computation of the statistics of interest. If the statistics of interest cannot be computed giving stable results, then incorrect or noisy decision making could result; for example, the market could select against an incorrect or haphazard price (resulting in lost or unprofitable business, and, ultimately, risks of insolvency or regulatory intervention).

In contrast to the case where there is a fixed known number of variables and given simulation results that require stratification, for a type of event-driven model called a frequency-severity model the number of variables within each simulation varies, according to a specified frequency distribution. Stratification therefore needs to be done conditionally on the number of variables and so we can use the information about the frequency distribution to determine additional statistics that will be stratified. This means multiple conditional cumulative distribution functions need to be considered, corresponding to the distribution conditional on a given number of events. In the constriction of the sum of discrepancy scores, terms are added for each of these conditional distributions.

The properties of the frequency distribution are used to determine how many terms are added (and this will typically include a cutoff since many frequency distributions do not have finite support, which may be based on a very low probability threshold, which may be configured to select one simulation from each stratum, so based on the number of simulations there will be a largest relevant number of events to condition on).

A term may also be added to the sum of the discrepancy scores to represent a dependent variable of simulation data, such as the aggregate amount under the frequency-severity model. The CDF of the dependent variable may be computed using techniques such as a Fast Fourier Transform (which may be done using tilting).

To address these issues, examples are disclosed that relate to stratifying event-driven models. Briefly, a conditional cumulative distribution model is approximated for a plurality of simulation results from a plurality of simulations. As described herein, the conditional cumulative distribution model refers to a distribution of a derived quantity for each simulation in an input dataset. The conditional cumulative distribution models are used to determine a sum of discrepancy scores for the plurality of simulations that satisfy the condition associated to the conditional cumulative distribution model. The plurality of simulation results within a selected simulation are replaced with another plurality of simulation results from a resampled simulation based upon a policy. An updated sum of discrepancy scores is generated for one or more remaining simulations and the resampled simulation. Accordingly, a result of one or more accepted simulations is more representative of the conditional cumulative distribution models. The result of the one or more accepted simulations can serve as an input to more general stratification and/or correlation methods (e.g., at the correlator 124 of FIG. 1A). As the result of the one or more accepted simulations is a more representative sample than the initial simulations, stratifying event-driven models may increase the accuracy for downstream processing (e.g., increasing the accuracy of the output data 116) without requiring a larger sample size.

FIG. 12 shows one example of a computing system 1002 for selecting a representative sequence of simulations based on stratification. In some examples, the computing system 1002 embodies the computing system 102 of FIG. 1A. In other examples, the computing system 1002 is a separate computing system.

The computing system 1002 is configured to receive a simulation sample 1004 containing a plurality of simulations 1005. Each simulation may contain simulation results 1006 and the quantity of simulation results in a simulation may vary between simulations. Simulation results may be correlated. Simulation results may represent dependent variables on other simulation results. For example, Table 1 shows an example of a plurality of simulations, in the form of wind storms, for which one simulation result, the total power generated by the wind farm, is the aggregate of the other simulation results, the power generated during individual storms.

In some examples, the computing system 1002 receives 50,000-250,000 samples resulting from Monte-Carlo simulations. In other examples, and as described in more detail below, the simulation sample 1004 include a smaller number of simulations (e.g., less than 50,000 simulations). As introduced above, a greater number of simulation results (e.g., 50,000-250,000) results in greater accuracy than a smaller number of simulation results. However, it can be computationally expensive to conduct such large numbers of simulations.

With continued reference to FIG. 12, each simulation 1005 includes a plurality of simulation results 1006. Table 1 shows a simplified example of 10 simulations of wind power (in MWh) generated by storms.

TABLE 1

| # of Events | Total Power | Event 1 | Event 2 | Event 3 | Event 4 | Event 5 |
|---|---|---|---|---|---|---|
| 0 | 0 | | | | | |
| 0 | 0 | | | | | |
| 1 | 355.86 | 355.86 | | | | |
| 1 | 105.13 | 105.13 | | | | |
| 1 | 300.23 | 300.23 | | | | |
| 2 | 2369.00 | 662.07 | 1706.93 | | | |
| 2 | 443.74 | 56.24 | 386.50 | | | |
| 3 | 203.64 | 154.74 | 1.46 | 47.43 | | |
| 4 | 6943.51 | 2927.93 | 222.87 | 1734.28 | 2058.44 | |
| 5 | 8715.80 | 50.81 | 932.63 | 4355.40 | 3273.3 | 103.67 |

Each row in Table 1 represents a simulation. Each simulation is tagged with a quantity of events that occur in that simulation, which is represented in the "# of Events" column in Table 1. The quantity of events follows a discrete distribution function (e.g., a Poisson distribution). The wind power is distributed according to a log-normal, pareto, or beta distribution. An aggregate over all events is shown in the "Total Power" column. However, for each scenario in which one event is modeled in total, the power produced by that event is relatively low compared to the maximum power produced by a single storm in Table 1 (e.g., 4355.40 MWh), and is not representative of an overall distribution of wind power.

In other examples, at least a portion of the simulations 1005 include empirical data (e.g., measured wind power produced by real-world storms). This may result in a more realistic starting point for the optimization of the simulation results, as a set of initial simulation results generated at random may include data that is unrealistically high (e.g., 10 GWh for 1 event) or low (e.g., 1 kwh for 5 events). As a result, the use of at least some empirical data may result in achieving a more representative sample of simulation results in fewer iterations of the optimization process than the use of randomly selected Monte Carlo simulations.

The computing system 1002 is further configured to receive one or more cumulative distribution models 1008. These cumulative distribution models may be for independent variables, such as the power produced in an individual wind storm given in Table 1. In some examples, the cumulative distribution model 1008 is based upon statistics, such as the "Total Power" given in Table 1. In this example, the cumulative distribution model 1008 may be computed based on the values of the variables from the simulation results in Table 1.

Other simulation results 1006 may be introduced leading to additional cumulative distribution models 1008. For example, in supply chain applications, stock levels of local sports paraphernalia are adjusted to account for demand spikes around sporting events. For example, sales of local sports paraphernalia are tied to wins as introduced above. If a number of wins rises above a threshold or a team enters post-season play, previously projected stock levels may no longer be accurate. Here, the number of wins may also represent a simulation result in addition to or as an alternative to aggregate sales.

The computing system 1002 is configured to approximate a conditional cumulative distribution model 1012 associated to the cumulative distribution model 1008 for the plurality of the simulation results 1006 in the plurality of simulations. In some examples, the conditional cumulative distribution models 1012 for each of the plurality of cumulative distribution models 1008 is conditional upon a predetermined quantity of the events occurring. In this manner, the conditional cumulative distribution models 1012 reflects simulation results 1006 that are based upon the predetermined quantity of the correlated events (e.g., mean power produced when at least 3 storms occur in Table 1).

In some examples, the conditional cumulative distribution model 1012 is approximated using a Fourier transform. The approximation of the conditional cumulative distribution model 1012 may additionally or alternatively include numerical techniques such as tilting. This allows the computing system 1002 to rapidly compute accurate conditional cumulative distribution models for target statistics.

In other examples, the conditional cumulative distribution model 1012 is approximated using a Monte Carlo method. In yet other examples, the conditional cumulative distribution model 1012 is approximated using a Fourier transform based upon Monte Carlo simulation data. For example, Monte Carlo methods may be used to provide boundaries that estimate how the cumulative distribution model 1008 supports the conditional cumulative distribution model 1012, while the conditional cumulative distribution model 1012 itself is computed using the Fourier transform. Although the use of Monte Carlo methods makes the approximation of the conditional cumulative distribution model 1012 non-deterministic, the use of Monte-Carlo-based support data may enable the computing system 1002 to compute the conditional cumulative distribution model 1012 more rapidly and with a similar or greater level of accuracy than via deterministic methods alone.

Accordingly, in some examples, the cumulative distribution models 1008 and the conditional cumulative distribution models 1012 are stratified into a number of strata. For example, the simulation results 1006 may include values over all events that occur which is reflected by a cumulative distribution model 1008. The conditional cumulative distribution models 1012 may reflect the probability of values conditional upon a predetermined number of events occurring, values conditional upon at least a predetermined number of events occurring, or values conditional upon at most a predetermined number of events occurring. As described in more detail below, stratifying each of the cumulative distribution model 1008 and the conditional cumulative distribution models 1012 by the quantity of these events enables the computing system 1002 to optimize the simulation results to serve as a representative sample that accurately reflects a number of events and values associated with those events.

The one or more cumulative distribution models and one or more conditional cumulative distribution models 1012 associated to each are used to compute a sum of discrepancy scores 1014 for the plurality of the simulation results 1006 for each simulation 1004. For example, the sum of the discrepancy scores 1014 may be determined as described above with reference to FIGS. 2-6. The discrepancy scores measure deviation between the simulation results 1006 and the conditional cumulative distribution model 1012.

As described in more detail below, the computing system 1002 is operatively configured to perform one or more resampling iterations until the sum of one or more respective discrepancy scores is determined to meet an optimization threshold 1016. As described in more detail below, if a set of simulations meets the optimization threshold 1016, the computing system 1002 is configured to output an event-driven model including the accepted simulations as indicated at 1018. In some examples, "meeting the optimization threshold" refers to the sum of the discrepancy scores 1014 being less than or equal to the optimization threshold 1016. In this manner, the computing system 1002 ensures that the set of simulations closely approximates the conditional cumulative distribution models 1012.

Figure 13:
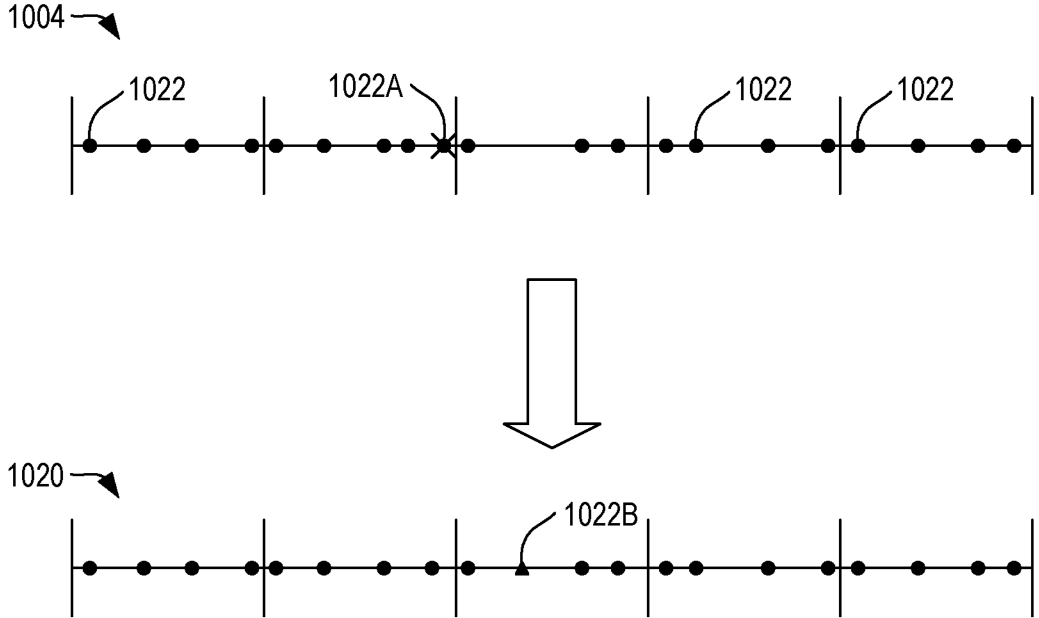
FIG. 13 shows is a plot of a plurality of initial simulation results in the form of Monte Carlo simulation data that can be received by the computing system of FIG. 12, and a plurality of modified simulation results that can be generated by the computing system of FIG. 12.

If the sum of the discrepancy scores 1014 does not meet the optimization threshold, the set of simulations is modified as indicated at 1020. To generate the modified set of simulations 1020, the computing system 1002 is configured to replace one of the simulations 1004 with one or more resampled simulations. For example, FIG. 13 shows a plot of the simulation results 1004 associated to one marginal cumulative distribution model and the modified set of simulation results 1020 in the form of one-dimensional Monte-Carlo simulation values 1022. It will also be appreciated that, in other examples, the Monte-Carlo simulation values 1022 have any other dimensionality (e.g., 10 or more dimensions) to represent any suitable number of marginal cumulative distribution models. For the sake of simplicity, the set of simulation results 1004 and the modified set of simulation results 1020 depicted in the example of FIG. 13 each include 20 simulation results 1022.

In the example depicted in FIG. 13, one of the simulation results 1022A is removed. In some examples, the computing system 1002 of FIG. 12 selects a simulation to be removed at random. This may help to reduce simulation error through statistical effects achieved via random sampling. In other examples, the computing system 1002 selects a simulation to remove based determination its contained simulation result 1022A is contributing to the sum of the discrepancy scores 1014 being greater than or equal to a threshold (e.g., the optimization threshold 1016). In this manner, the process of modifying the set of the simulations 1004 is explicitly driven to reduce the sum of the discrepancy scores 1014. In yet other examples, the removed simulation is selected by a user, for example in response to receiving a prompt from the computing system 1002 indicating that the optimization threshold 1016 has not been met, to achieve a user-specified goal (e.g., fitting a distribution pattern that is not defined by the computing system 1002).

At least one resampled simulation result 1022B is added to the values that remain from the initial simulation results 1006 after the simulation result 1022A is removed. In the example of FIG. 13, one resample simulation result 1022B is added for each simulation 1022A that is removed. It will also be appreciated that, in other examples, any other suitable number of simulation results may be added or removed. In this manner, the computing system 1002 may increase or decrease the sample size, respectively, to generate a representative sample.

In some examples, the resampled simulation result 1022B is contained in a precomputed simulation 1024. For example, the precomputed simulation 1024 may be selected from a pool of precomputed Monte Carlo simulations that also includes the simulations 1004. As described above, precomputing enables the computing system 1002 to estimate the cumulative distribution model 1008 for an aggregate of all the all the simulation results upfront.

Like the selection of the removed simulation result 1022A, in some examples, the computing system 1002 generates or selects the resampled simulation via a randomized process. In this manner, the other simulation result 1022B may reduce simulation error in the modified data 1020 via random sampling. In other examples, the other simulation result 1022B is explicitly selected, either by the computing system 1002 or a user, to drive the modified data 1020 towards the optimization threshold 1016.

The computing system 1002 is further configured to generate an updated sum of discrepancy scores 1026 for one or more remaining simulations and the resampled simulation 1022B. In some examples, the updated sum of the discrepancy scores 1026 is generated as described above with reference to FIGS. 2-6. For a target statistic that is conditional upon a predetermined quantity of events, each simulation result corresponding to that number of events is replaced and a new sum of discrepancy scores is computed based upon the simulation result(s) that are added and/or removed. The updated sum of the discrepancy scores is used to determine how the modified simulation 1020 deviate from the conditional marginal distribution 1012.

As described in more detail below, the computing system 1002 is configured to apply a policy 1028 to accept or reject the resampled simulation 1022B based upon the updated sum of the discrepancy scores 1026. For example, the computing system 1002 may reject the resampled simulation 1022B if the updated sum of the discrepancy scores 1026 is greater than the initial sum of the discrepancy scores 1014. The computing system 1002 may additionally or alternatively reject the removal of a simulation if the resampled simulation is rejected. In this manner, the computing system 1022 is configured to drive the discrepancy scores towards the optimization threshold 1016.

Figure 14:
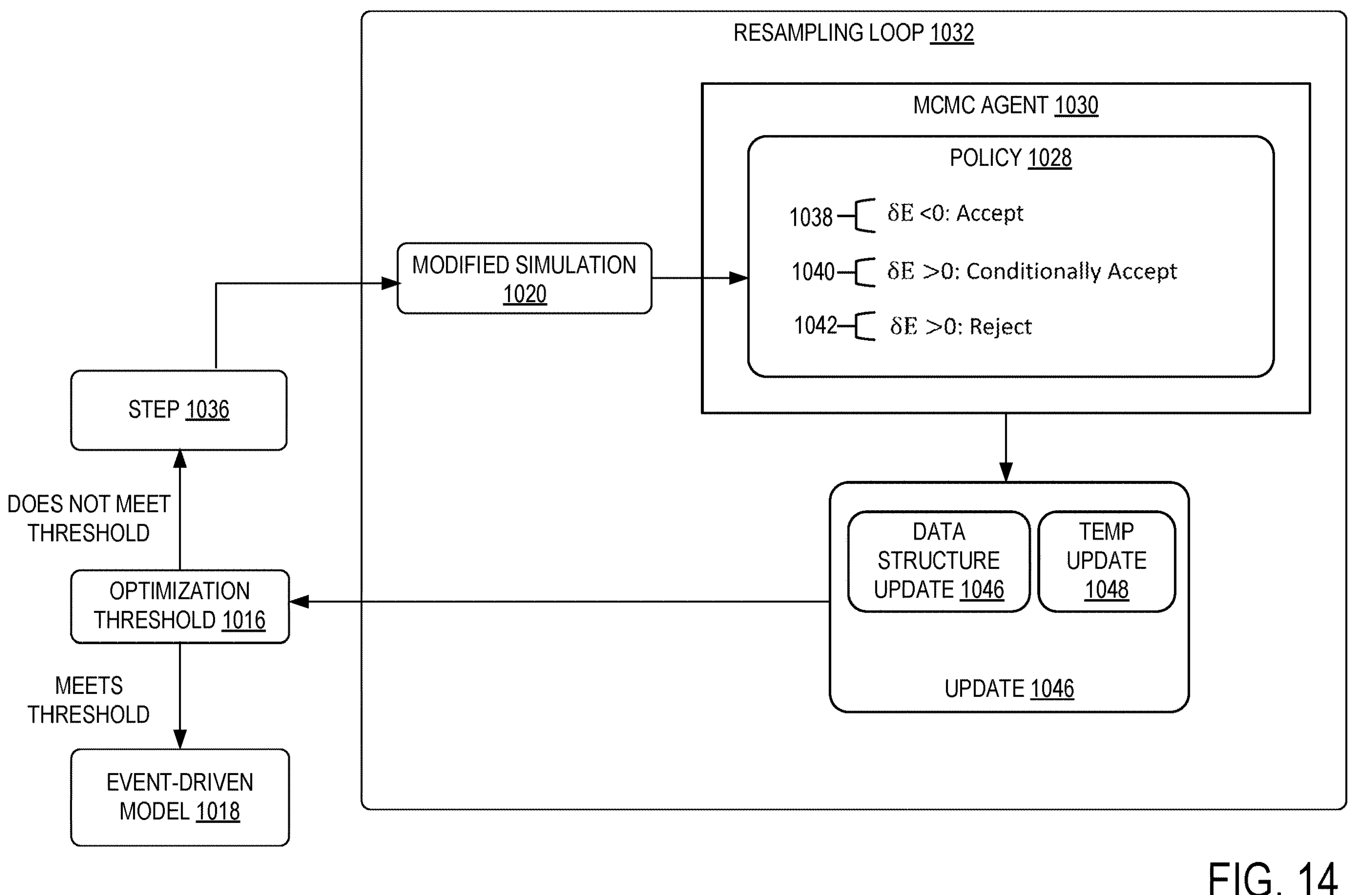
FIG. 14 shows a schematic view of a Markov Chain Monte Carlo (MCMC) agent that can be implemented by the computing system of FIG. 12 to evaluate a selected set of simulation results based on a policy.

In some examples, the policy 1028 is implemented at a Markov Chain Monte Carlo (MCMC) agent 1030. FIG. 14 shows a schematic view of an example MCMC agent 1030 configured to evaluate the modified simulation results 1020 based on the policy 1028. The policy 1028 is used to evaluate an energy parameter for a set of simulations (e.g., the modified simulations 1020) at a temperature 1034 for an iteration of resampling loop 1032. Updates to the simulation results (e.g., in the form of the removed simulation results 1022A and/or the added simulation result 1022B) are accepted or rejected based on the temperature 1034 (e.g., using a Metropolis-Hastings method). A higher temperature 1034 allows the policy 1028 of the MCMC agent 1030 to explore more of a solution surface, while a lower temperature 1034 constrains the policy 1028 to accept modified simulations 1020 that reduce the updated sum 1026 of the discrepancy scores, as explained in more detail below.

During the one or more iterations of the resampling loop 1032, the MCMC agent 1030 is configured to conditionally accept a set of modified simulations 1020 with a higher evaluated cost than a previous pass through the resampling loop 1032 more readily at higher temperatures 1034 and less readily at lower temperatures 1034.

In some examples, the computing system 1002 is configured to reduce the temperature parameter 1034 over a series of steps 1036. As the temperature 1034 is lowered on successive passes through the resampling loop 1032, the policy 1028 is further constrained to seek lower cost solutions, eventually trending toward a local minimum on the solution surface. This results in minimizing the updated sum 1026 of the discrepancy scores.

The MCMC agent 1030 is used to iteratively evaluate the modified simulations 1020 (including the one or more remaining simulations), and to adjust the temperature parameter 1034, when a simulation is replaced. FIG. 14 shows an example formulation of the policy 1028, in which the modified simulations are accepted when $\delta E<0$ as shown at 1038. The modified simulations may be conditionally accepted by the MCMC agent 1030 when $\delta E>0$ as shown at 1040. In other examples, the modified simulations 1020 are rejected by the MCMC agent 1028 when $\delta E>0$ as shown at 1042. For example, a set of modified simulations that is conditionally accepted at a higher temperature may be rejected at a lower temperature. As a result, the MCMC agent 1030 outputs a corresponding status update 1044 to the computing system 1002. The update 1044 including a simulation data structure update 1046 that indicates whether the modified simulations 1020 are accepted or rejected, and an annealing temperature update 1048. In this manner, the computing system 1002 may advance to either complete the optimization process (e.g., if the optimization threshold 1016 is satisfied) or to step through another iteration of the resampling loop 1032.

For each step 1036 through the resampling loop 1032, a value for the temperature parameter 1034 is determined by the MCMC agent 1030 according to a temperature function that trends lower over time (e.g., a temperature function for a quantum-inspired algorithm, as described in more detail below). In this example, the value for the temperature (K) of a first step I through the optimization loop is set to 5, the value (K) for a second step II is set to 3, the value (K) for a third step III is set to 2, and the value (K) for a fourth step IV is set to 1. The selected set of modified resampled simulations 1020 from the computing system 1002 are conditionally accepted by the MCMC agent 1030 at the value for the temperature parameter for each optimization loop. For instance, in the first step I through the optimization loop, the modified simulations 1020 are unconditionally accepted until reaching a local minimum, as the updated sum of the discrepancy scores 1026 decreases. On the other hand, the modified simulations 1020 are conditionally accepted after the local minima according to the value (K=5) for the temperature, as the updated sum of the discrepancy scores 1026 increases. In the second step II, the updated sum of the discrepancy scores 1026 decreases to a local minimum and then increases at the value (K=3) for the temperature. However, the increase in the updated sum of the discrepancy scores 1026 in the second step II is less than the increase in the updated sum of the discrepancy scores 1026 in the first step I since the value (K) for the temperature decreases from 5 to 3. In the same manner, the increase in the third step III is less than that of the second step II and the increase in the fourth step IV is less than that of the third step III. At the end of the fourth step IV, an estimate of a solution, which is the lowest point of the updated sum of the discrepancy scores 1026, is determined. In this manner, an optimized solution for a set of modified simulations 1020 having the lowest updated sum of the discrepancy scores 1026 can be computed with reasonable accuracy in an efficient number of optimization steps.

In some examples, the policy 1028 is tuned according to a temperature parameter of a quantum-inspired algorithm 1050 to transition from a first optimization threshold to a second, updated optimization threshold. As used herein, the term "quantum-inspired algorithm" refers to an algorithm run on traditional computing hardware that emulates one or more features of quantum mechanics for a computational advantage. In particular quantum-inspired optimization algorithms emulate quantum tunneling, an effect that provides an advantage to the adiabatic quantum optimization algorithm that runs on a quantum computer. It is common to including annealing algorithms among quantum-inspired algorithms as additional randomness, whose strength is governed by a temperature that decreases over the course of the algorithm, provides additional computational advantage and is regularly exploited by practitioners in the field. Some examples of quantum-inspired algorithms include, but are not limited to, Quantum Monte Carlo, Substochastic Monte Carlo, Population Annealing, and Parallel Tempering. In some examples, the quantum-inspired algorithm 1050 is at least partially implemented at a classical computing device that simulates quantum behavior. In other examples, the quantum-inspired algorithm 1050 is implemented at least partially at a quantum computer. Quantum-inspired algorithms offer the ability to break out of local minima on the solution surface through tunneling-like effects. Thus, the quantum-inspired algorithm may enable the computing system 1002 to explore the solution surface more efficiently than through classical annealing and may prevent the modified simulations 1020 from becoming trapped in a local minimum.

The computing system 1002 is further configured to output the event-driven model 1018 including the accepted simulation results. Table 2 shows an example output of the computing system 1002 for the scenario presented earlier with reference to Table 1. Table 2 shows 10 accepted simulations for wind power (in MWh) generated by storms. Compared to Table 1, the values output in Table 2 are more representative of an overall distribution of wind power that can be produced by the given number of storms.

TABLE 2

| # of Events | Total Power | Event 1 | Event 2 | Event 3 | Event 4 | Event 5 | Event 6 |
|---|---|---|---|---|---|---|---|
| 0 | 0 | | | | | | |
| 1 | 1870.60 | 1870.60 | | | | | |
| 2 | 2153.85 | 854.74 | 1299.11 | | | | |
| 2 | 2880.49 | 1564.54 | 1315.95 | | | | |
| 2 | 3702.01 | 2229.80 | 1472.21 | | | | |
| 3 | 2534.45 | 542.52 | 1073.24 | 918.69 | | | |
| 3 | 5115.37 | 458.09 | 3697.79 | 959.49 | | | |
| 4 | 4439.28 | 1239.38 | 836.60 | 1286.55 | 1076.76 | | |
| 5 | 5335.91 | 1419.05 | 838.35 | 719.67 | 909.56 | 1449.28 | |
| 6 | 6372.58 | 648.83 | 830.41 | 590.40 | 2377.00 | 648.70 | 1277.23 |

As introduced above, in some examples, the computing system 1002 is configured to output the event-driven model 1018 (e.g., Table 2) to the correlator 124 of FIG. 1A. For example, the output result can serve as the first input data 104, the second input data 106, and/or the third input data 108 of FIG. 1A. As the output result 1018 is a more representative sample of the correlated events than the initial simulation data 1004, using the output result 1018 as an input to the correlator 124 may increase the accuracy of the output data 116 without requiring a larger sample size.

Figure 15A:
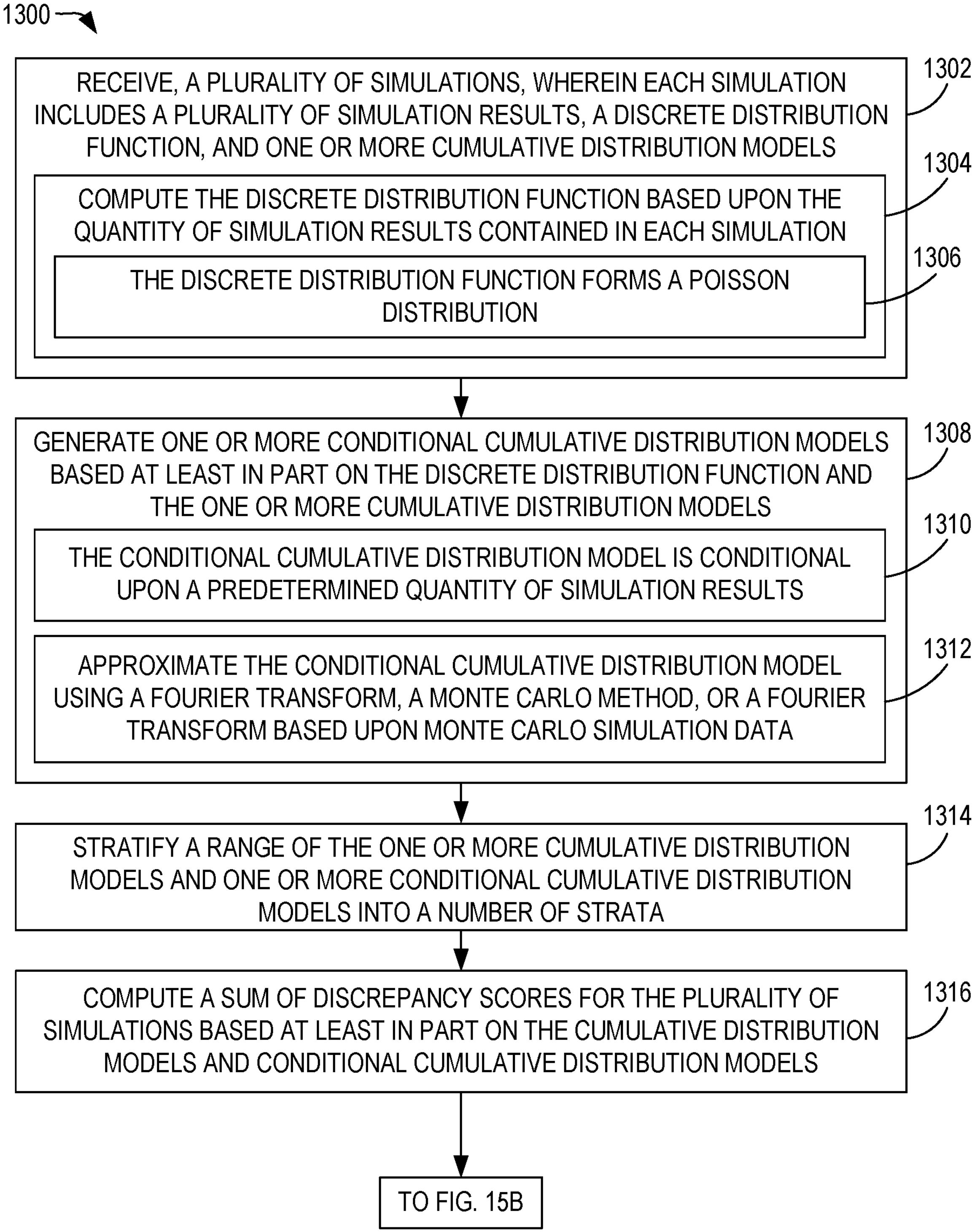
FIGS. 15A-15B show a flowchart of an example method for stratifying event-driven models.
Figure 15B:
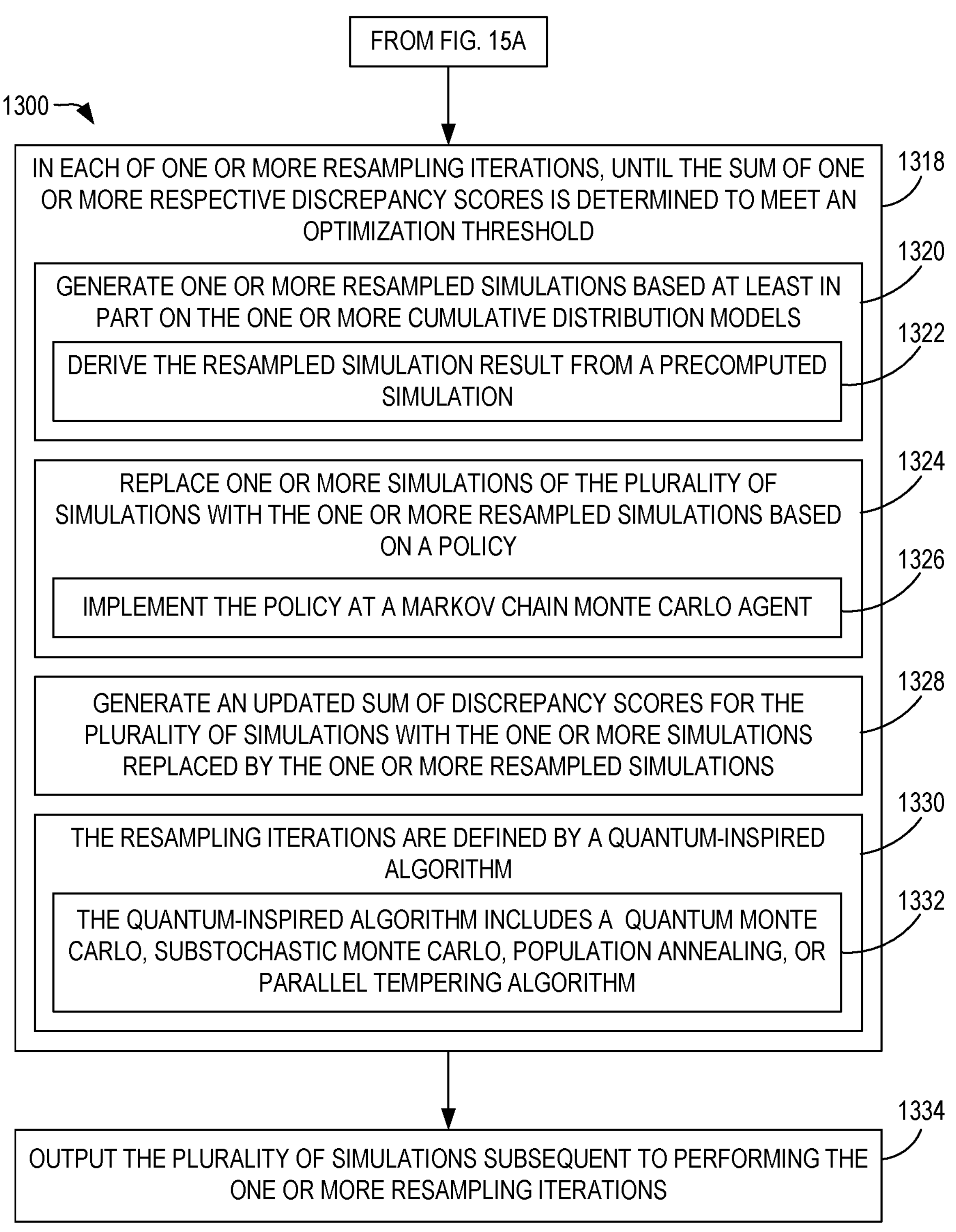

With reference now to FIGS. 15A-15B a flowchart is illustrated depicting an example method 1300 for stratifying event-driven models. The following description of method 1300 is provided with reference to the software and hardware components described above and shown in FIGS. 1-14 and 16, and the method steps in method 1300 will be described with reference to corresponding portions of FIGS. 1-14 and 16 below. It will be appreciated that method 1300 also may be performed in other contexts using other suitable hardware and software components.

It will be appreciated that the following description of method 1300 is provided by way of example and is not meant to be limiting. It will be understood that various steps of method 1300 can be omitted or performed in a different order than described, and that the method 1300 can include additional and/or alternative steps relative to those illustrated in FIGS. 15A-15B without departing from the scope of this disclosure.

With reference first to FIG. 15A, at 1302, the method 1300 includes receiving a plurality of simulations. Each simulation includes a plurality of simulation results. The method 1300 also includes receiving a discrete distribution function and one or more cumulative distribution models. For example, the computing system 1002 is configured to receive the simulation sample 1004 containing the plurality of simulations 1005, and the one or more cumulative distribution models 1008.

In some examples, at 1304, the method 1300 includes computing the discrete distribution function based upon the quantity of simulation results contained in each simulation. For example, the computing system 1002 may compute the discrete distribution function for a range of numbers of storms as specified in Tables 1 and 2. For example, at 1306, the discrete distribution function may form a Poisson distribution. Stratifying the CDF by the quantity of these events enables the computing system to optimize the simulation results to serve as a representative sample for the target statistic.

At 1308, the method 1300 includes generating one or more conditional cumulative distribution models based at least in part on the discrete distribution function and the one or more cumulative distribution models. For example, the computing system 1002 is configured to generate the one or more conditional cumulative distribution models 1012. Approximating the conditional marginal distribution enables the computing device to generate a representative sample of simulation result values to fit that distribution.

In some examples, at 1310, the conditional cumulative distribution model is conditional upon a predetermined quantity of simulation results. For example, the conditional cumulative distribution models 1012 may reflect simulation results 1006 that are based upon the predetermined quantity of the correlated events (e.g., mean power produced when at least 3 storms occur in Table 1).

At 1312, in some examples, approximating the conditional cumulative distribution model includes using one or more of a Fourier transform, a Monte Carlo method, or a Fourier transform based upon Monte Carlo simulation data. For example, Monte Carlo methods may be used to provide boundaries that estimate how the cumulative distribution model 1008 supports the conditional cumulative distribution model 1012, while the conditional cumulative distribution model 1012 itself is computed using the Fourier transform. Although Monte Carlo methods are not deterministic, the use of Monte-Carlo-based support data may enable the computing system 1002 to compute the conditional cumulative distribution model 1012 more rapidly and with a similar or greater level of accuracy than via deterministic methods alone.

The method 1300 further includes, at 1314, stratifying a range of the one or more cumulative distribution models and one or more conditional cumulative distribution models into a number of strata. For example, the computing system 1002 is configured to stratify the cumulative distribution models 1008 and the conditional cumulative distribution models 1012. This enables the computing system to optimize the simulations to generate a representative sample for the target statistics, which may increase the accuracy of the target statistics for downstream processing.

At 1316, the method 1300 includes computing a sum of discrepancy scores for the plurality of simulations based at least in part on the cumulative distribution models and conditional cumulative distribution models. For example, the computing system 1002 is configured to determine the sum of discrepancy scores 1014 for the simulation results 1006 using the cumulative distribution models 1008 and the conditional cumulative distribution models 1012. As described above, the discrepancy scores measure deviation between the simulation results 1006 and the conditional cumulative distribution models 1012.

The method 1300 further includes, at 1318, one or more resampling iterations. Each of the one or more resampling iterations may be performed until the sum of one or more respective discrepancy scores (e.g., the sum of the discrepancy scores 1014 or the updated sum of the discrepancy scores 1026) is determined to meet an optimization threshold (e.g., the optimization threshold 1016).

In each of the one or more resampling iterations, the method 1300 includes, at 1320, generating one or more resampled simulations based at least in part on the one or more cumulative distribution models. For example, at 1322, the resampled simulation may be derived from a precomputed simulation.

Each of the one or more resampling iterations further includes, at 1324, replacing one or more simulations of the plurality of simulations with the one or more resampled simulations based on a policy. For example, FIG. 13 shows an example of one simulation result 1022A that is replaced with resampled simulation result 1022B to generate the set of modified simulation results 1020. This may help to reduce simulation error either via random sampling or via explicitly choosing to remove outlier(s).

In some examples, at 1326, the policy is implemented at a Markov Chain Monte Carlo (MCMC) agent. For example, the policy 1028 of FIG. 12 is implemented by the MCMC agent 1030. The MCMC agent 1030 is configured to enforce the policy and accept or reject the resampled simulation result based upon an energy parameter for the modified set of simulation results. This enables the computing system to optimize the updated sum of the discrepancy scores.

At 1328, each of the one or more resampling iterations further includes generating an updated sum of discrepancy scores for the plurality of simulations with the one or more simulations replaced by the one or more resampled simulations. For example, the computing system 1002 is configured to generate the updated sum of discrepancy scores 1026 for the modified simulation results 1020. This updated sum of discrepancy scores is compared to the optimization threshold to determine whether to proceed through another resampling iteration.

In some examples, at 1330, the resampling iterations are defined by a quantum-inspired algorithm. For example, at 1332, the quantum-inspired algorithm may include a Quantum Monte Carlo, Substochastic Monte Carlo, Population Annealing, or Parallel Tempering algorithm. These quantum-inspired algorithms may prevent the modified simulation results from becoming trapped in local minima of a solution surface and enable the computing system to explore solutions more efficiently than through other algorithms, such as classical annealing.

At 1334, the method 1300 includes outputting the plurality of simulations subsequent to performing the one or more resampling iterations. For example, the computing system 1002 is configured to output the plurality of simulations 1018 based upon the modified simulation results 1020 meeting the optimization threshold 1016. As the output result is based upon the optimized set of modified simulation results, the output event-driven model may have at least similar accuracy to a result produced using a substantially larger (e.g., at least 10-100 times larger) set of Monte Carlo simulations.

The above-described systems and methods may be used to stratify event-driven models. For example, a range of the one or more cumulative distribution models and one or more conditional cumulative distribution models are stratified. Stratifying the one or more cumulative distribution models and the one or more conditional cumulative distribution models enables the computing system to generate a representative sample of simulations. During an iterative resampling process, one or more simulations are replaced with one or more resampled simulations based on a policy. The policy enables a computing system to optimize the modified simulation results (e.g., by minimizing a discrepancy score), such that an event-driven model based upon one or more accepted simulation result values is more representative of the cumulative distribution models and conditional cumulative distribution models than an event-driven model based upon the initial simulation results. In some examples, the resampling iterations are defined by a quantum-inspired algorithm. This enables a computing system to explore the solution surface more efficiently than other algorithms, such as classical annealing, while also preventing the modified simulation results from becoming trapped in local minima of the solution surface. The computing system is configured to output the plurality of simulations subsequent to performing the one or more resampling iterations. As a result of the above-described system and methods, the output simulations may be a more representative sample than the initial simulations result values. This may also increase the accuracy of downstream processing (e.g., at the correlator 124) without requiring a larger sample of Monte Carlo simulations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
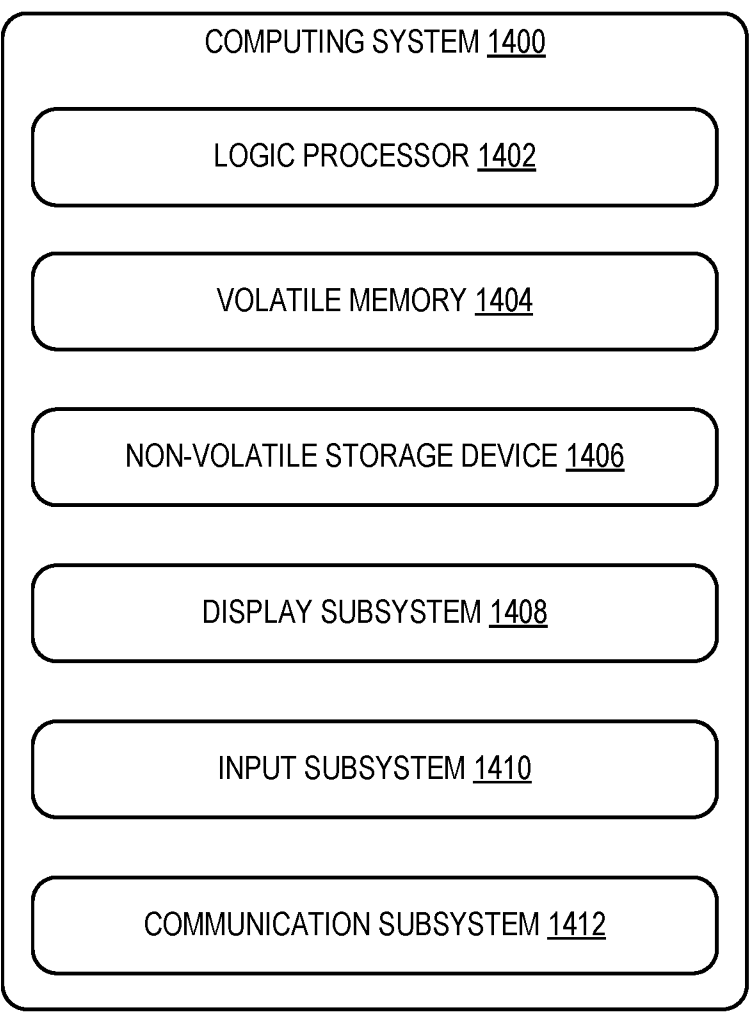
FIG. 16 is a schematic diagram illustrating an exemplary computing system that may be used to implement the computing system of FIG. 1A.

FIG. 16 schematically shows a non-limiting embodiment of a computing system 1400 that can enact one or more of the methods and processes described above. Computing system 1400 is shown in simplified form. Computing system 1400 may embody the computing system 102 described above and illustrated in FIG. 1. Components of the computing system 1400 may be instantiated in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 1400 includes a logic processor 1402 volatile memory 1404, and a non-volatile storage device 1406. Computing system 1400 may optionally include a display subsystem 1408, input subsystem 1410, communication subsystem 1412, and/or other components not shown in FIG. 16.

Logic processor 1402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1404 may include physical devices that include random access memory. Volatile memory 1404 is typically utilized by logic processor 1402 to temporarily store information during processing of software instructions. It will be appreciated that volatile memory 1404 typically does not continue to store instructions when power is cut to the volatile memory 1404.

Non-volatile storage device 1406 includes one or more physical devices configured to hold instructions executable by the logic processors to implement the methods and processes described herein. When such methods and processes are implemented, the state of non-volatile storage device 1406 may be transformed—e.g., to hold different data.

Non-volatile storage device 1406 may include physical devices that are removable and/or built-in. Non-volatile storage device 1406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1406 may include nonvolatile, dynamic, static, read/write, read-only, sequential-access, location-addressable, file-addressable, and/or content-addressable devices. It will be appreciated that non-volatile storage device 1406 is configured to hold instructions even when power is cut to the non-volatile storage device 1406.

Aspects of logic processor 1402, volatile memory 1404, and non-volatile storage device 1406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1400 typically implemented in software by a processor to perform a particular function using portions of volatile memory, which function involves transformative processing that specially configures the processor to perform the function. Thus, a module, program, or engine may be instantiated via logic processor 1402 executing instructions held by non-volatile storage device 1406, using portions of volatile memory 1404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1408 may be used to present a visual representation of data held by non-volatile storage device 1406. The visual representation may take the form of a graphical user interface (GUI). As the herein described methods and processes change the data held by the non-volatile storage device, and thus transform the state of the non-volatile storage device, the state of display subsystem 1408 may likewise be transformed to visually represent changes in the underlying data. Display subsystem 1408 may include one or more display devices utilizing virtually any type of technology. Such display devices may be combined with logic processor 1402, volatile memory 1404, and/or non-volatile storage device 1406 in a shared enclosure, or such display devices may be peripheral display devices.

When included, input subsystem 1410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1412 may be configured to communicatively couple various computing devices described herein with each other, and with other devices. Communication subsystem 1412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1400 to send and/or receive messages to and/or from other devices via a network such as the Internet.

The following paragraphs discuss several aspects of the present disclosure. One aspect provides a computing system, comprising: a processor configured to receive, for a plurality of correlated variables, a first predetermined number of simulations from a Monte-Carlo simulation sample, each simulation including a plurality of initial simulation results for the plurality of the variables; one or more target statistics, a second predetermined number of strata for each variable and each target statistic, and a cumulative distribution function for each variable and each target statistic; for each variable and for each of the one or more target statistics, segment a unit interval of the cumulative distribution function into the second predetermined number of strata and a support of the cumulative distribution function into a plurality of bins such that each bin of the plurality of bins corresponds to one of the strata, determine an initial discrepancy score based upon a quantity of values in each bin, the first predetermined number of the simulations, and the second predetermined number of the strata for the variable; determine an initial sum of the initial discrepancy scores; remove at least one of the plurality of the initial simulations based upon a determination that the initial sum of the initial discrepancy scores is not within an optimization threshold; add at least one other simulation to a remaining one or more initial simulations; for each variable and for each of the one or more target statistics, use the quantity of the values in one or more bins corresponding to the at least one of the plurality of the initial simulations and the quantity of the values in one or more bins corresponding to the at least one other simulation to generate an updated discrepancy score; determine an updated sum of the updated discrepancy scores; and output a plurality of representative simulations that represent the cumulative distribution function across the strata based upon the updated sum of the updated discrepancy scores. A potential technical advantage of such a configuration is that a representative sequence of simulations are selected from a pool of Monte Carlo simulation data.

Further to this aspect, in some examples, the processor is additionally or alternatively configured to accept or reject the at least one other simulation based upon the updated sum of the updated discrepancy scores. A potential technical advantage of such a configuration is that the selection of the representative simulations is driven towards the optimization threshold.

Further to this aspect, in some examples, the processor is additionally or alternatively configured to, for each variable and for each of the one or more target statistics, determine a stratum of a value for each initial simulation result and place the value into one of the plurality of bins based upon stratum. A potential technical advantage of such a configuration is that the computing system identifies the bin in which the value is placed.

Further to this aspect, in some examples, the at least one other simulation additionally or alternatively includes a precomputed simulation. A potential technical advantage of such a configuration is that the CDF for an aggregate of all the precomputed simulations may be estimated upfront.

Further to this aspect, in some examples, the processor is additionally or alternatively configured to determine an initial bin-wise discrepancy metric for each bin of the plurality of bins. A potential technical advantage of such a configuration is that the computing system measures the homogeneity of the initial simulation results across the plurality of bins.

Further to this aspect, in some examples, the initial bin-wise discrepancy metric for a selected bin additionally or alternatively includes a difference between the quantity of values in the selected bin and the first predetermined number of the simulations divided by the second predetermined number of the strata for the variable or target statistic. A potential technical advantage of such a configuration is that the initial bin-wise discrepancy metric may be computed using arithmetic operations.

Further to this aspect, in some examples, the initial discrepancy score additionally or alternatively includes a maximum bin-wise discrepancy metric or a sum of the initial bin-wise discrepancy metrics for the plurality of bins. A potential technical advantage of such a configuration is that the initial discrepancy score represents the maximum discrepancy between the initial Monte Carlo simulation data and the CDF or an aggregate discrepancy for the initial Monte Carlo simulation data.

Further to this aspect, in some examples, the processor is additionally or alternatively configured to weight the initial bin-wise discrepancy metric for each bin of the plurality of bins based upon a proximity of a stratum corresponding to the bin to a tail of the cumulative distribution function. A potential technical advantage of such a configuration is that the initial discrepancy score places greater emphasis on accuracy at the tail than elsewhere in the distribution.

Further to this aspect, in some examples, the processor is additionally or alternatively configured to: determine an updated bin-wise discrepancy metric for the one or more bins corresponding to the at least one of the plurality of the initial simulations and for the one or more bins corresponding to the at least one other simulation; and use the updated bin-wise discrepancy metric for the one or more bins corresponding to the at least one of the plurality of the initial simulations and for the one or more bins corresponding to the at least one other simulation, and the initial bin-wise discrepancy metric for each of the remaining one or more initial simulations, to determine the updated discrepancy score. A potential technical advantage of such a configuration is that this formulation of the updated discrepancy score does not require the computing system to recompute the initial bin-wise discrepancy metric for each bin.

Further to this aspect, in some examples, the processor is additionally or alternatively configured to, for each variable and target statistic: decrement the quantity of values in the one or more bins corresponding to the at least one of the plurality of the initial simulations; and increment the quantity of values in the one or more bins corresponding to the at least one other simulation. A potential technical advantage of such a configuration is that the updated discrepancy score may be determined using the same operations as the initial discrepancy score.

Another aspect provides, at a computing device, a method comprising: receiving, for a plurality of correlated variables, a first predetermined number of simulations from a Monte-Carlo simulation sample, each simulation including a plurality of initial simulation results for the plurality of the variables, one or more target statistics, a second predetermined number of strata for each variable and each target statistic, and a cumulative distribution function for each variable and each target statistic; for each variable and for each of the one or more target statistics, segmenting a unit interval of the cumulative distribution function into the second predetermined number of the strata and a support of the cumulative distribution function into a plurality of bins such that each bin of the plurality of bins corresponds to one of the strata, determining an initial discrepancy score based upon a quantity of values in each bin, the first predetermined number of the simulations, and the second predetermined number of the strata for the variable, determining an initial sum of the initial discrepancy scores; removing at least one of the plurality of the initial simulations based upon a determination that the initial sum of the initial discrepancy scores is not within an optimization threshold; adding at least one other simulation to a remaining one or more initial simulation; for each variable and for each of the one or more target statistics, using the quantity of the values in one or more bins corresponding to the at least one of the plurality of the initial simulation results and the quantity of the values in one or more bins corresponding to the at least one other simulation result to generate an updated discrepancy score; determining an updated sum of the updated discrepancy scores; and outputting a plurality of representative simulations that represent the cumulative distribution function across the strata based upon the updated sum of the updated discrepancy scores. A potential technical advantage of such a configuration is that a representative sequence of simulation results are selected from a pool of Monte Carlo simulation data.

Further to this aspect, in some examples, the method additionally or alternatively includes accepting or rejecting the at least one other simulation based upon the updated sum of the updated discrepancy scores. A potential technical advantage of such a configuration is that the selection of the representative simulation results is driven towards the optimization threshold.

Further to this aspect, in some examples, the at least one other simulation additionally or alternatively includes a precomputed simulation. A potential technical advantage of such a configuration is that the CDF for an aggregate of all the precomputed simulation results may be estimated upfront.

Further to this aspect, in some examples, determining the initial discrepancy score additionally or alternatively includes determining an initial bin-wise discrepancy metric for each bin of the plurality of bins. A potential technical advantage of such a configuration is that the initial bin-wise discrepancy metrics measure the homogeneity of the initial simulation results across the plurality of bins.

Further to this aspect, in some examples, determining the initial bin-wise discrepancy metric for a selected bin additionally or alternatively includes determining a difference between the quantity of values in the selected bin and the first predetermined number of the simulations divided by the second predetermined number of the strata for the variable or target statistic. A potential technical advantage of such a configuration is that the initial bin-wise discrepancy metric may be computed using arithmetic operations.

Further to this aspect, in some examples, determining the initial bin-wise discrepancy metric for the selected bin additionally or alternatively includes determining a maximum bin-wise discrepancy metric or determining a sum of the initial bin-wise discrepancy metrics for the plurality of bins. A potential technical advantage of such a configuration is that the initial discrepancy score represents the maximum discrepancy between the initial Monte Carlo simulation data and the CDF or an aggregate discrepancy for the initial Monte Carlo simulation data.

Further to this aspect, in some examples, determining the initial discrepancy score additionally or alternatively includes weighting the initial bin-wise discrepancy metric for each bin of the plurality of bins based upon a proximity of a stratum corresponding to the bin to a tail of the cumulative distribution function. A potential technical advantage of such a configuration is that the initial discrepancy score places greater emphasis on accuracy at the tail than elsewhere in the distribution.

Further to this aspect, in some examples, generating the updated discrepancy score additionally or alternatively includes determining an updated bin-wise discrepancy metric for the one or more bins corresponding to the at least one of the plurality of the initial simulation results and for the one or more bins corresponding to the at least one other simulation; and using the updated bin-wise discrepancy metric for the one or more bins corresponding to the at least one of the plurality of the initial simulation results and for the one or more bins corresponding to the at least one other simulation result, and the initial bin-wise discrepancy metric for each of the remaining one or more initial simulation results, to determine the updated discrepancy score. A potential technical advantage of such a configuration is that this formulation of the updated discrepancy score does not require the initial bin-wise discrepancy metric to be recomputed for each bin.

Further to this aspect, in some examples, generating the updated discrepancy score additionally or alternatively includes decrementing the quantity of values in the one or more bins corresponding to the at least one of the plurality of the initial simulations; and incrementing the quantity of values in the one or more bins corresponding to the at least one other simulation. A potential technical advantage of such a configuration is that the updated discrepancy score may be determined using the same operations as the initial discrepancy score.

Another aspect provides a computing system, comprising: a processor configured to, receive, for a plurality of correlated variables, a first predetermined number of simulations from a Monte-Carlo simulation sample, each simulation including a plurality of initial simulation results for the plurality of the variables; one or more target statistics, a second predetermined number of strata for each variable and each target statistic; and a cumulative distribution function for each variable and each target statistic; for each variable and for each of the one or more target statistics, segment a unit interval of the cumulative distribution function into the second predetermined number of strata and a support of the cumulative distribution function into a plurality of bins such that each bin of the plurality of bins corresponds to one of the strata, count a quantity of values in each bin of the plurality of bins, and determine an initial discrepancy score based upon a difference between the quantity of values in each bin and the quantity of the initial simulations divided by the second predetermined number of the strata for the variable or target statistic; determine an initial sum of the initial discrepancy scores; remove at least one of the plurality of the initial simulation results based upon a determination that the initial sum of the initial discrepancy scores is not within an optimization threshold; add at least one other simulation to a remaining one or more initial simulations; for each variable and target statistic, decrement the quantity of values in one or more bins corresponding to the at least one of the plurality of the initial simulation results, increment the quantity of values in the one or more bins corresponding to the at least one other simulation result, and use the quantity of the values in the one or more bins corresponding to the at least one of the plurality of the initial simulation results and the quantity of the values in the one or more bins corresponding to the at least one other simulation result to generate an updated discrepancy score; determine an updated sum of the updated discrepancy scores; and output a plurality of representative simulations that represent the cumulative distribution function across the strata based upon the updated sum of the updated discrepancy scores. A potential technical advantage of such a configuration is that a representative sequence of simulation results are selected from a pool of Monte Carlo simulation data.

According to one aspect of the present disclosure, a computing system, is provided, including a processor configured to receive, for a plurality of correlated random variables, a simulation sample including a plurality of simulations. Each simulation may include a plurality of simulation results. The processor may be further configured to generate a surrogate cumulative distribution model at least in part by estimating a plurality of surrogate model parameters based at least in part on the plurality of simulation results. Based at least in part on the surrogate cumulative distribution model with the surrogate model parameters, the processor may be further configured to select one or more subsets of the plurality of simulations. In each of one or more resampling iterations, until a sum of one or more respective discrepancy scores of the one or more subsets is determined to meet an optimization threshold, the processor may be further configured to compute the one or more discrepancy scores of the one or more subsets. In each of the one or more resampling iterations, based at least in part on the sum of the one or more discrepancy scores, the processor may be further configured to sample one or more resampled simulations for the plurality of correlated random variables from among the plurality of simulations that are included in the simulation sample and not already included in the one or more subsets. In each of the one or more resampling iterations, the processor may be further configured to replace one or more simulations included in the one or more subsets with the one or more resampled simulations. The processor may be further configured to output the simulations included in the one or more subsets subsequently to performing the one or more resampling iterations. A potential technical advantage of such a configuration is that the one or more subsets may be compressed relative to the simulation sample, thereby allowing a Monte Carlo algorithm to be performed more efficiently when the one or more subsets are used as input.

According to this aspect, for a plurality of quantiles of the plurality of simulation results, the processor may be further configured to compute a plurality of strata of the surrogate cumulative distribution model. The processor may be further configured to select the one or more subsets of simulations such that the simulation results included in the simulations included in the one or more subsets are distributed equally among the plurality of strata. A potential technical advantage of such a configuration is that the distribution of the correlated random variables in sparse regions of the range of the simulation results may be accurately represented with a reduced number of simulations.

According to this aspect, the processor may be configured to replace the one or more simulations with the one or more resampled simulations at least in part by performing a quantum-inspired algorithm. A potential technical advantage of such a configuration is that the sum of the one or more discrepancy scores may be reduced in a manner that may quickly converge to a value below the optimization threshold.

According to this aspect, the processor may be configured to generate the plurality of simulation results for the plurality of correlated random variables at least in part by executing an Iman-Conover algorithm. A potential technical advantage of such a configuration is that the event simulation module may efficiently generate the simulation results.

According to this aspect, the processor may be configured to sample the one or more resampled simulations at least in part by executing an Iman-Conover algorithm. A potential technical advantage of such a configuration is that the processor may efficiently resample the resampled simulations.

According to this aspect, the surrogate cumulative distribution model may be a mixed Erlang model including a plurality of Erlang distributions. A potential technical advantage of such a configuration is that the surrogate cumulative distribution model may accurately model the cumulative distribution function with a small number of parameters.

According to this aspect, the surrogate cumulative distribution model may further include one or more substitute tail region distributions configured to replace one or more respective tail regions of one or more of the plurality of Erlang distributions. The one or more substitute tail region distributions may differ from the one or more Erlang distributions within the one or more respective tail regions. A potential technical advantage of such a configuration is that the surrogate cumulative distribution model may model heavy-tailed or light-tailed distributions more accurately.

According to this aspect, the surrogate cumulative distribution model may be an empirical model for which the processor may be configured to estimate the surrogate model parameters based at least in part on empirical data included in the plurality of simulations. A potential technical advantage of such a configuration is that the surrogate cumulative distribution model may accurately model empirical data.

According to this aspect, the processor may be configured to estimate the plurality of surrogate model parameters at least in part by performing iterative expectation maximization. A potential technical advantage of such a configuration is that the processor may set the values of the surrogate model parameters such that the surrogate cumulative distribution model accurately models the cumulative distribution function.

According to this aspect, the plurality of simulation results may include a plurality of aggregate values, minimum values, or maximum values over the plurality of correlated random variables. A potential technical advantage of such a configuration is that quantities that are likely to be of interesting in areas such as energy production, inventory management, and insurance may be modeled.

According to this aspect, the processor may be further configured to generate the surrogate cumulative distribution model in response to receiving a surrogate model type selection at a graphical user interface (GUI). The processor may be further configured to generate the one or more subsets of the plurality of simulations in response to receiving simulation generating instructions at the GUI. The processor may be further configured to output the one or more subsets of the simulations to the GUI. A potential technical advantage of such a configuration is that the GUI may allow the user to specify properties of the surrogate cumulative distribution model and the pone or more subsets, and to view the one or more subsets.

According to another aspect of the present disclosure, a method for use with a computing system is provided. The method may include receiving, for a plurality of correlated random variables, a simulation sample including a plurality of simulations. Each simulation may include a plurality of simulation results. The method may further include generating a surrogate cumulative distribution model at least in part by estimating a plurality of surrogate model parameters based at least in part on the plurality of simulation results. Based at least in part on the surrogate cumulative distribution model with the surrogate model parameters, the method may further include selecting one or more subsets of the plurality of simulations. The method may further include, in each of one or more resampling iterations, until a sum of one or more respective discrepancy scores of the one or more subsets is determined to meet an optimization threshold, computing the one or more discrepancy scores of the one or more subsets. In each of the one or more resampling iterations, the method may further include, based at least in part on the sum of the one or more discrepancy scores, sampling one or more resampled simulations for the plurality of correlated random variables from among the plurality of simulations that are included in the simulation sample and not already included in the one or more subsets. The method may further include, in each of the one or more resampling iterations, replacing one or more simulations included in the one or more subsets with the one or more resampled simulations. The method may further include outputting the simulations included in the one or more subsets subsequently to performing the one or more resampling iterations. A potential technical advantage of such a configuration is that the one or more subsets may be compressed relative to the simulation sample, thereby allowing a Monte Carlo algorithm to be performed more efficiently when the one or more subsets are used as input.

According to this aspect, method may further include, for a plurality of quantiles of the plurality of simulation results, computing a plurality of strata of the surrogate cumulative distribution model. The method may further include selecting the one or more subsets of simulations such that the simulation results included in the simulations included in the one or more subsets are distributed equally among the plurality of strata. A potential technical advantage of such a configuration is that the distribution of the correlated random variables in sparse regions of the range of the simulation results may be accurately represented with a reduced number of simulations.

According to this aspect, replacing the one or more simulations with the one or more resampled simulations may include performing a quantum-inspired algorithm. A potential technical advantage of such a configuration is that the sum of the one or more discrepancy scores may be reduced in a manner that may quickly converge to a value below the optimization threshold.

According to this aspect, sampling the one or more resampled simulations may further include executing an Iman-Conover algorithm. A potential technical advantage of such a configuration is that the resampled simulations may be resampled efficiently.

According to this aspect, the surrogate cumulative distribution model may be a mixed Erlang model including a plurality of Erlang distributions. A potential technical advantage of such a configuration is that the surrogate cumulative distribution model may accurately model the cumulative distribution function with a small number of parameters.

According to this aspect, the surrogate cumulative distribution model may be an empirical model for which the surrogate model parameters are estimated based at least in part on empirical data included in the plurality of simulations. A potential technical advantage of such a configuration is that the surrogate cumulative distribution model may accurately model empirical data.

According to this aspect, estimating the plurality of surrogate model parameters may include performing iterative expectation maximization. A potential technical advantage of such a configuration is that the processor may set the values of the surrogate model parameters such that the surrogate cumulative distribution model accurately models the cumulative distribution function.

According to this aspect, the plurality of simulation results may include a plurality of aggregate values, minimum values, or maximum values over the plurality of correlated random variables. A potential technical advantage of such a configuration is that quantities that are likely to be of interest in areas such as energy production, inventory management, and insurance may be modeled.

According to another aspect of the present disclosure, a computing system is provided, including a processor configured to receive, for a plurality of correlated random variables, a simulation sample including a plurality of simulations. Each simulation may include a plurality of simulation results. Based at least in part on the plurality of simulation results, the processor may be further configured to generate a surrogate cumulative distribution model. Based at least in part on the surrogate cumulative distribution model, the processor may be further configured to select a compressed subset of the plurality of simulations. In each of one or more resampling iterations, until a discrepancy score of the compressed subset is determined to be below a predetermined discrepancy threshold, the processor may be further configured to compute the discrepancy score of the compressed subset. In each of the one or more resampling iterations, based at least in part on the discrepancy score, the processor may be further configured to sample one or more resampled simulations for the plurality of correlated random variables from among the plurality of simulations that are included in the simulation sample and not already included in the subset. In each of the one or more resampling iterations, the processor may be further configured to replace one or more simulations included in the compressed subset with the one or more resampled simulations. The processor may be further configured to output the simulations included in the compressed subset subsequently to performing the one or more resampling iterations. A potential technical advantage of such a configuration is that the one or more subsets may be compressed relative to the simulation sample, thereby allowing a Monte Carlo algorithm to be performed more efficiently when the one or more subsets are used as input.

Another aspect provides a computing system, comprising: a processor configured to, receive, a plurality of simulations, wherein each simulation includes a plurality of simulation results, a discrete distribution function, one or more cumulative distribution models; generate one or more conditional cumulative distribution models based at least in part on the discrete distribution function and the one or more cumulative distribution models; stratify a range of the one or more cumulative distribution models and one or more conditional cumulative distribution models into a number of strata; compute a sum of discrepancy scores for the plurality of simulations based at least in part on the cumulative distribution models and conditional cumulative distribution models; in each of one or more resampling iterations, until the sum of one or more respective discrepancy scores is determined to meet an optimization threshold: generate one or more resampled simulations based at least in part on the one or more cumulative distribution models; replace one or more simulations of the plurality of simulations with the one or more resampled simulations based on a policy, and generate an updated sum of discrepancy scores for the plurality of simulations with the one or more simulations replaced by the one or more resampled simulations; and output the plurality of simulations subsequent to performing the one or more resampling iterations. A potential technical advantage of such a configuration is that a set of modified simulation results is generated that is more representative of the one or more cumulative distribution models and one or more conditional cumulative distribution models than the initial simulation results.

Further to this aspect, in some examples, the discrete distribution function is additionally or alternatively computed based upon the quantity of simulation results contained in each simulation. A potential technical advantage of such a configuration is that a representative sample of Monte Carlo simulations is generated that is more representative of the conditional marginal distribution than the initial simulation results.

Further to this aspect, in some examples, the discrete distribution function additionally or alternatively forms a Poisson distribution. A potential technical advantage of such a configuration is that the Poisson distribution represents a distribution of discrete quantities of events contained in each simulation.

Further to this aspect, in some examples, the conditional marginal distribution for each of the plurality of the target statistics is additionally or alternatively conditional upon a predetermined quantity of simulation results. A potential technical advantage of such a configuration is that the conditional marginal distribution reflects target statistics that are based upon the predetermined quantity of the events.

Further to this aspect, in some examples, the processor is additionally or alternatively configured to approximate the conditional marginal distribution using a Fourier transform, a Monte Carlo method, or a Fourier transform based upon Monte Carlo simulation data. A potential technical advantage of such a configuration is that accurate conditional marginal distributions may be rapidly computed for target statistics.

Further to this aspect, in some examples, the other simulation result is additionally or alternatively derived from a precomputed simulation. A potential technical advantage of such a configuration is that the statistical properties of an aggregate of all the precomputed simulation results may be estimated upfront.

Further to this aspect, in some examples, the accept/reject policy is additionally or alternatively implemented at a Markov Chain Monte Carlo agent. A potential technical advantage of such a configuration is that the updated sum of the discrepancy scores may be optimized.

Further to this aspect, in some examples, the resampling iterations are additionally or alternatively defined by a quantum-inspired algorithm. A potential technical advantage of such a configuration is that a solution surface may be explored more efficiently than through classical annealing and may prevent the modified simulation results from becoming trapped in a local minimum.

Further to this aspect, in some examples, the quantum-inspired algorithm additionally or alternatively includes a Quantum Monte Carlo, Substochastic Monte Carlo, Population Annealing, or Parallel Tempering algorithm. A potential technical advantage of such a configuration is that a solution surface may be explored more efficiently than through classical annealing and may prevent the modified simulation results from becoming trapped in a local minimum.

Further to this aspect, in some examples, the processor is additionally or alternatively configured to apply the policy to minimize the one or more respective discrepancy scores. A potential technical advantage of such a configuration is that a set of simulations is generated that closely approximates the conditional cumulative distribution models.

Another aspect provides, at a computing system, a method comprising: receiving, a plurality of simulations, wherein each simulation includes a plurality of simulation results, a discrete distribution function, and one or more cumulative distribution models; generating one or more conditional cumulative distribution models based at least in part on the discrete distribution function and the one or more cumulative distribution models; stratifying a range of the one or more cumulative distribution models and one or more conditional cumulative distribution models into a number of strata; computing a sum of discrepancy scores for the plurality of simulations based at least in part on the cumulative distribution models and conditional cumulative distribution models; in each of one or more resampling iterations, until the sum of one or more respective discrepancy scores is determined to meet an optimization threshold, generating one or more resampled simulations based at least in part on the one or more cumulative distribution models, replacing one or more simulations of the plurality of simulations with the one or more resampled simulations based on a policy, and generating an updated sum of discrepancy scores for the plurality of simulations with the one or more simulations replaced by the one or more resampled simulations; and outputting the plurality of simulations subsequent to performing the one or more resampling iterations. A potential technical advantage of such a configuration is that a set of modified simulation results is generated that is more representative of the one or more cumulative distribution models and one or more conditional cumulative distribution models than the initial simulation results.

Further to this aspect, in some examples, the method additionally or alternatively includes computing the discrete distribution function based upon the quantity of simulation results contained in each simulation. A potential technical advantage of such a configuration is that a representative sample of Monte Carlo simulations is generated that is more representative of the conditional marginal distribution than the initial simulation results.

Further to this aspect, in some examples, the discrete distribution function additionally or alternatively forms a Poisson distribution. A potential technical advantage of such a configuration is that the Poisson distribution represents a distribution of discrete quantities of events contained in each simulation.

Further to this aspect, in some examples, the conditional cumulative distribution model is additionally or alternatively conditional upon a predetermined quantity of simulation results. A potential technical advantage of such a configuration is that the conditional marginal distribution reflects target statistics that are based upon the predetermined quantity of the events.

Further to this aspect, in some examples, the method additionally or alternatively includes approximating the conditional cumulative distribution model using a Fourier transform, a Monte Carlo method, or a Fourier transform based upon Monte Carlo simulation data. A potential technical advantage of such a configuration is that accurate conditional marginal distributions may be rapidly computed for target statistics.

Further to this aspect, in some examples, the method additionally or alternatively includes deriving the resampled simulation result from a precomputed simulation. A potential technical advantage of such a configuration is that the statistical properties of an aggregate of all the precomputed simulation results may be estimated upfront.

Further to this aspect, in some examples, the method additionally or alternatively includes implementing the policy at a Markov Chain Monte Carlo agent. A potential technical advantage of such a configuration is that the updated sum of the discrepancy scores may be optimized.

Further to this aspect, in some examples, the resampling iterations are additionally or alternatively defined by a quantum-inspired algorithm. A potential technical advantage of such a configuration is that a solution surface may be explored more efficiently than through classical annealing and may prevent the modified simulation results from becoming trapped in a local minimum.

Further to this aspect, in some examples, the quantum-inspired algorithm additionally or alternatively includes a Quantum Monte Carlo, Substochastic Monte Carlo, Population Annealing, or Parallel Tempering algorithm. A potential technical advantage of such a configuration is that a solution surface may be explored more efficiently than through classical annealing and may prevent the modified simulation results from becoming trapped in a local minimum.

Another aspect provides a computing system, comprising: a processor configured to receive, a plurality of simulations, wherein each simulation includes a plurality of simulation results, a discrete distribution function, one or more cumulative distribution models; generate one or more conditional cumulative distribution models based at least in part on the discrete distribution function and the one or more cumulative distribution models; stratify a range of the one or more cumulative distribution models and one or more conditional cumulative distribution models into a number of strata; compute a sum of discrepancy scores for the plurality of simulations based at least in part on the cumulative distribution models and conditional cumulative distribution models; in each of one or more resampling iterations defined by a quantum-inspired algorithm, until the sum of one or more respective discrepancy scores is determined to meet an optimization threshold; generate one or more resampled simulations based at least in part on the one or more cumulative distribution models; replace one or more simulations of the plurality of simulations with the one or more resampled simulations based on a policy configured to minimize the one or more respective discrepancy scores, and generate an updated sum of discrepancy scores for the plurality of simulations with the one or more simulations replaced by the one or more resampled simulations; and output the plurality of simulations subsequent to performing the one or more resampling iterations. A potential technical advantage of such a configuration is that a set of modified simulation results is generated that is more representative of the one or more cumulative distribution models and one or more conditional cumulative distribution models than the initial simulation results.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the system may have corresponding features definable with respect to the method(s), and vice versa, and these embodiments are specifically envisaged.

"And/or" as used herein is defined as the inclusive or v, as specified by the following truth table:

| A | B | $A \vee B$ |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

The invention claimed is:

1. A computing system, comprising:

a processor configured to receive, for a plurality of correlated variables, a first predetermined number of simulations from a Monte-Carlo simulation sample, each simulation including a plurality of initial simulation results for the plurality of the variables, one or more target statistics, a second predetermined number of strata for each variable and each target statistic, and a cumulative distribution function for each variable and each target statistic;

for each variable and for each of the one or more target statistics, segment a unit interval of the cumulative distribution function into the second predetermined number of strata and a support of the cumulative distribution function into a plurality of bins such that each bin of the plurality of bins corresponds to one of the strata, determine an initial discrepancy score based upon a quantity of values in each bin, the first predetermined number of the simulations, and the second predetermined number of the strata for the variable;

determine an initial sum of the initial discrepancy scores;

remove at least one of the plurality of the initial simulations based upon a determination that the initial sum of the initial discrepancy scores is not within an optimization threshold to decrease a sampling error;

add at least one other simulation to a remaining one or more initial simulations based on a policy to minimize the initial discrepancy score;

for each variable and for each of the one or more target statistics, use the quantity of the values in one or more bins corresponding to the at least one of the plurality of the initial simulations and the quantity of the values in one or more bins corresponding to the at least one other simulations to generate an updated discrepancy score;

determine an updated sum of the updated discrepancy scores; and output a plurality of representative simulations that represent the cumulative distribution function across the strata based upon the updated sum of the updated discrepancy scores.

2. The computing system of claim 1, wherein the processor is further configured to accept or reject the at least one other simulation based upon the updated sum of the updated discrepancy scores.

3. The computing system of claim 1, wherein the processor is further configured to, for each variable and for each of the one or more target statistics, determine a stratum of a value for each initial simulation result and place the value into one of the plurality of bins based upon the stratum.

4. The computing system of claim 1, wherein the at least one other simulation includes a precomputed simulation.

5. The computing system of claim 1, wherein the processor is further configured to determine an initial bin-wise discrepancy metric for each bin of the plurality of bins.

6. The computing system of claim 5, wherein the initial bin-wise discrepancy metric for a selected bin includes a difference between the quantity of values in the selected bin and the first predetermined number of simulations divided by the second predetermined number of the strata for the variable or target statistic.

7. The computing system of claim 5, wherein the initial discrepancy score comprises a maximum bin-wise discrepancy metric or a sum of the initial bin-wise discrepancy metrics for the plurality of bins.

8. The computing system of claim 5, wherein the processor is further configured to weight the initial bin-wise discrepancy metric for each bin of the plurality of bins based upon a proximity of a stratum corresponding to the bin to a tail of the cumulative distribution function.

9. The computing system of claim 5, wherein the processor is further configured to:

determine an updated bin-wise discrepancy metric for the one or more bins corresponding to the at least one of the plurality of the initial simulations and for the one or more bins corresponding to the at least one other simulation; and use the updated bin-wise discrepancy metric for the one or more bins corresponding to the at least one of the plurality of the initial simulations and for the one or more bins corresponding to the at least one other simulation, and the initial bin-wise discrepancy metric for each of the remaining one or more initial simulations, to determine the updated discrepancy score.

10. The computing system of claim 1, wherein the processor is further configured to, for each variable and target statistic:

decrement the quantity of values in the one or more bins corresponding to the at least one of the plurality of the initial simulations; and increment the quantity of values in the one or more bins corresponding to the at least one other simulation.

11. At a computing device, a method comprising:

receiving, for a plurality of correlated variables, a first predetermined number of simulations from a Monte-Carlo simulation sample, each simulation including a plurality of initial simulation results for the plurality of the variables, one or more target statistics, a second predetermined number of strata for each variable and each target statistic, and a cumulative distribution function for each variable and each target statistic;

for each variable and for each of the one or more target statistics, segmenting a unit interval of the cumulative distribution function into the second predetermined number of the strata and a support of the cumulative distribution function into a plurality of bins such that each bin of the plurality of bins corresponds to one of the strata, determining an initial discrepancy score based upon a quantity of values in each bin, the first predetermined number of the simulations, and the second predetermined number of the strata for the variable, determining an initial sum of the initial discrepancy scores;

removing at least one of the plurality of the initial simulations based upon a determination that the initial sum of the initial discrepancy scores is not within an optimization threshold to decrease a sampling error;

adding at least one other simulation to a remaining one or more initial simulation based on a policy to minimize the initial discrepancy score;

for each variable and for each of the one or more target statistics, using the quantity of the values in one or more bins corresponding to the at least one of the plurality of the initial simulation results and the quantity of the values in one or more bins corresponding to the at least one other simulation result to generate an updated discrepancy score;

determining an updated sum of the updated discrepancy scores; and outputting a plurality of representative simulations that represent the cumulative distribution function across the strata based upon the updated sum of the updated discrepancy scores.

12. The method of claim 11, further comprising accepting or rejecting the at least one other simulation based upon the updated sum of the updated discrepancy scores.

13. The method of claim 11, wherein the at least one other simulation includes a precomputed simulation.

14. The method of claim 11, wherein determining the initial discrepancy score includes determining an initial bin-wise discrepancy metric for each bin of the plurality of bins.

15. The method of claim 14, wherein determining the initial bin-wise discrepancy metric for a selected bin includes determining a difference between the quantity of values in the selected bin and the first predetermined number of the simulations divided by the second predetermined number of the strata for the variable or target statistic.

16. The method of claim 14, wherein determining the initial bin-wise discrepancy metric for the selected bin includes determining a maximum bin-wise discrepancy metric or determining a sum of the initial bin-wise discrepancy metrics for the plurality of bins.

17. The method of claim 14, wherein determining the initial discrepancy score includes weighting the initial bin-wise discrepancy metric for each bin of the plurality of bins based upon a proximity of a stratum corresponding to the bin to a tail of the cumulative distribution function.

18. The method of claim 14, wherein generating the updated discrepancy score includes:

determining an updated bin-wise discrepancy metric for the one or more bins corresponding to the at least one of the plurality of the initial simulation results and for the one or more bins corresponding to the at least one other simulation; and using the updated bin-wise discrepancy metric for the one or more bins corresponding to the at least one of the plurality of the initial simulation results and for the one or more bins corresponding to the at least one other simulation result, and the initial bin-wise discrepancy metric for each of the remaining one or more initial simulation results, to determine the updated discrepancy score.

19. The method of claim 11, wherein generating the updated discrepancy score includes:

decrementing the quantity of values in the one or more bins corresponding to the at least one of the plurality of the initial simulations; and incrementing the quantity of values in the one or more bins corresponding to the at least one other simulation.

20. A computing system, comprising:

a processor configured to, receive, for a plurality of correlated variables, a first predetermined number of simulations from a Monte-Carlo simulation sample, each simulation including a plurality of initial simulation results for the plurality of the variables;

one or more target statistics, a second predetermined number of strata for each variable and each target statistic; and a cumulative distribution function for each variable and each target statistic;

for each variable and for each of the one or more target statistics, segment a unit interval of the cumulative distribution function into the second predetermined number of strata and a support of the cumulative distribution function into a plurality of bins such that each bin of the plurality of bins corresponds to one of the strata, count a quantity of values in each bin of the plurality of bins, and determine an initial discrepancy score based upon a difference between the quantity of values in each bin and the quantity of the initial simulations divided by the second predetermined number of the strata for the variable or target statistic;

determine an initial sum of the initial discrepancy scores;

remove at least one of the plurality of the initial simulation results based upon a determination that the initial sum of the initial discrepancy scores is not within an optimization threshold to decrease a sampling error;

add at least one other simulation to a remaining one or more initial simulations based on a policy to minimize the initial discrepancy score;

for each variable and target statistic, decrement the quantity of values in one or more bins corresponding to the at least one of the plurality of the initial simulation results, increment the quantity of values in the one or more bins corresponding to the at least one other simulation result, and use the quantity of the values in the one or more bins corresponding to the at least one of the plurality of the initial simulation results and the quantity of the values in the one or more bins corresponding to the at least one other simulation result to generate an updated discrepancy score;

determine an updated sum of the updated discrepancy scores; and output a plurality of representative simulations that represent the cumulative distribution function across the strata based upon the updated sum of the updated discrepancy scores.

* * * * *